(12) United States Patent
Dilles et al.

(10) Patent No.: US 10,931,461 B2
(45) Date of Patent: Feb. 23, 2021

(54) SYSTEMS AND METHODS FOR CREATING A DIGITAL ID RECORD AND METHODS OF USING THEREOF

(71) Applicant: ACUANT INC., Los Angeles, CA (US)

(72) Inventors: Jacob S. Dilles, Reston, VA (US); Yossi Zekri, Irvine, CA (US); William Russell, Aldie, VA (US); Stephen G. Maloney, Stamford, CT (US)

(73) Assignee: ACUANT INC., Los Angeles, CA (US)

( * ) Notice: Subject to any disclaimer, the term of this patent is extended or adjusted under 35 U.S.C. 154(b) by 0 days.

(21) Appl. No.: 16/625,588

(22) PCT Filed: Sep. 5, 2019

(86) PCT No.: PCT/US2019/049800
§ 371 (c)(1),
(2) Date: Dec. 20, 2019

(87) PCT Pub. No.: WO2020/051365
PCT Pub. Date: Mar. 12, 2020

(65) Prior Publication Data
US 2020/0374129 A1 Nov. 26, 2020

(30) Foreign Application Priority Data
Sep. 6, 2018 (IL) .......................................... 261679

(51) Int. Cl.
*H04L 9/32* (2006.01)

(52) U.S. Cl.
CPC .......... *H04L 9/3247* (2013.01); *H04L 9/3236* (2013.01)

(58) Field of Classification Search
CPC ........................... H04L 9/3247; H04L 9/3236
See application file for complete search history.

(56) References Cited

U.S. PATENT DOCUMENTS

| 2006/0136595 | A1* | 6/2006 | Satyavolu | ............... G06F 21/41 709/229 |
|---|---|---|---|---|
| 2014/0359722 | A1 | 12/2014 | Schultz et al. | |

(Continued)

OTHER PUBLICATIONS

International Search Report; PCT Application No. PCT/US2019/049800; dated Nov. 12, 2019.

(Continued)

*Primary Examiner* — Farid Homayounmehr
*Assistant Examiner* — Suman Debnath
(74) *Attorney, Agent, or Firm* — Dilworth & Barrese, LLP.; Michael J. Musella, Esq.

(57) ABSTRACT

A system and methods for creating a non-reputable digital record of an identification (ID) document (ID-document) of an ID-holder, by a verifier-server. The system includes at least one verifier-server of a verifier and ID-holder-computing-device. The method includes authenticating a captured ID provided by the ID holder and extracting PII fields from the captured ID; cryptographically protecting jointly and severally the extracted-PII-fields, wherein the cryptographically protecting includes individually hashing each one of the PII fields; and transmitting from the verifier-server, to the ID-holder-computing-device, a verification-result comprising PII-hash-pairs, the individually-hashed-PII-fields, and a verifier-server-signature, the verification-result being the non-reputable digital record. Also disclosed are systems and methods for using the digital record for secured interaction between the ID holder and a vendor.

70 Claims, 37 Drawing Sheets

(56) References Cited

U.S. PATENT DOCUMENTS

| | | |
|---|---|---|
| 2015/0213288 A1 | 7/2015 | Bilodeau et al. |
| 2016/0380774 A1 | 12/2016 | Lovelock et al. |
| 2017/0213211 A1 | 7/2017 | Sibert et al. |
| 2017/0286765 A1* | 10/2017 | Rodriguez ......... G06K 9/00469 |
| 2018/0159833 A1* | 6/2018 | Zhang ................... H04L 9/3297 |
| 2019/0052467 A1* | 2/2019 | Bettger ................ H04L 9/0861 |
| 2019/0349371 A1* | 11/2019 | Smith .................... G06F 21/31 |

OTHER PUBLICATIONS

Written Opinion of PCT Application No. PCT(US2019/049800; dated Nov. 12, 2019.

Chen et al. "Checking Questionalbe Entry of Personally Identifiable Information Encrypted by One-Way Hash Transformation" Obtained on Dec. 19, 2019.

* cited by examiner

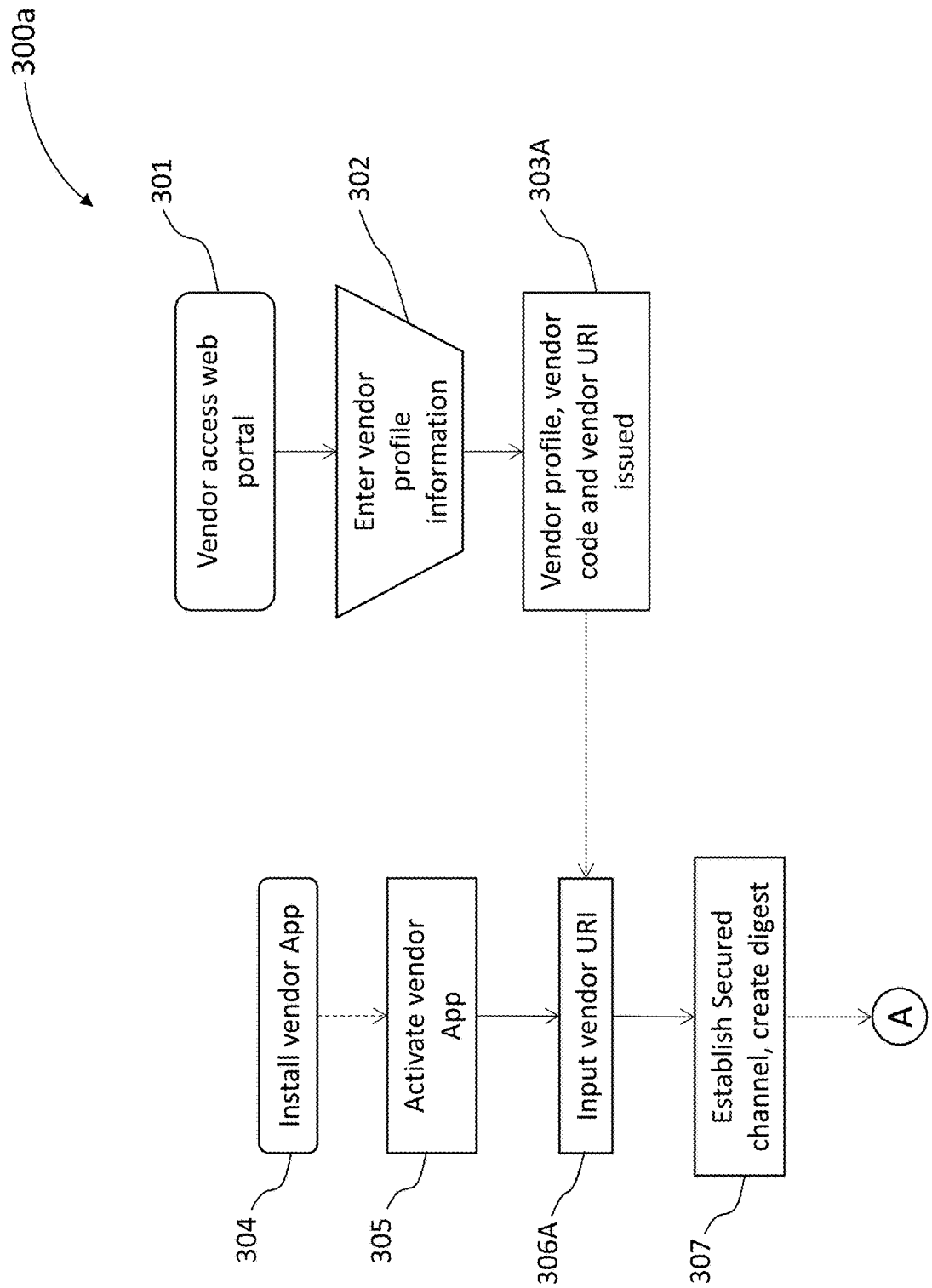
Figure 3A1

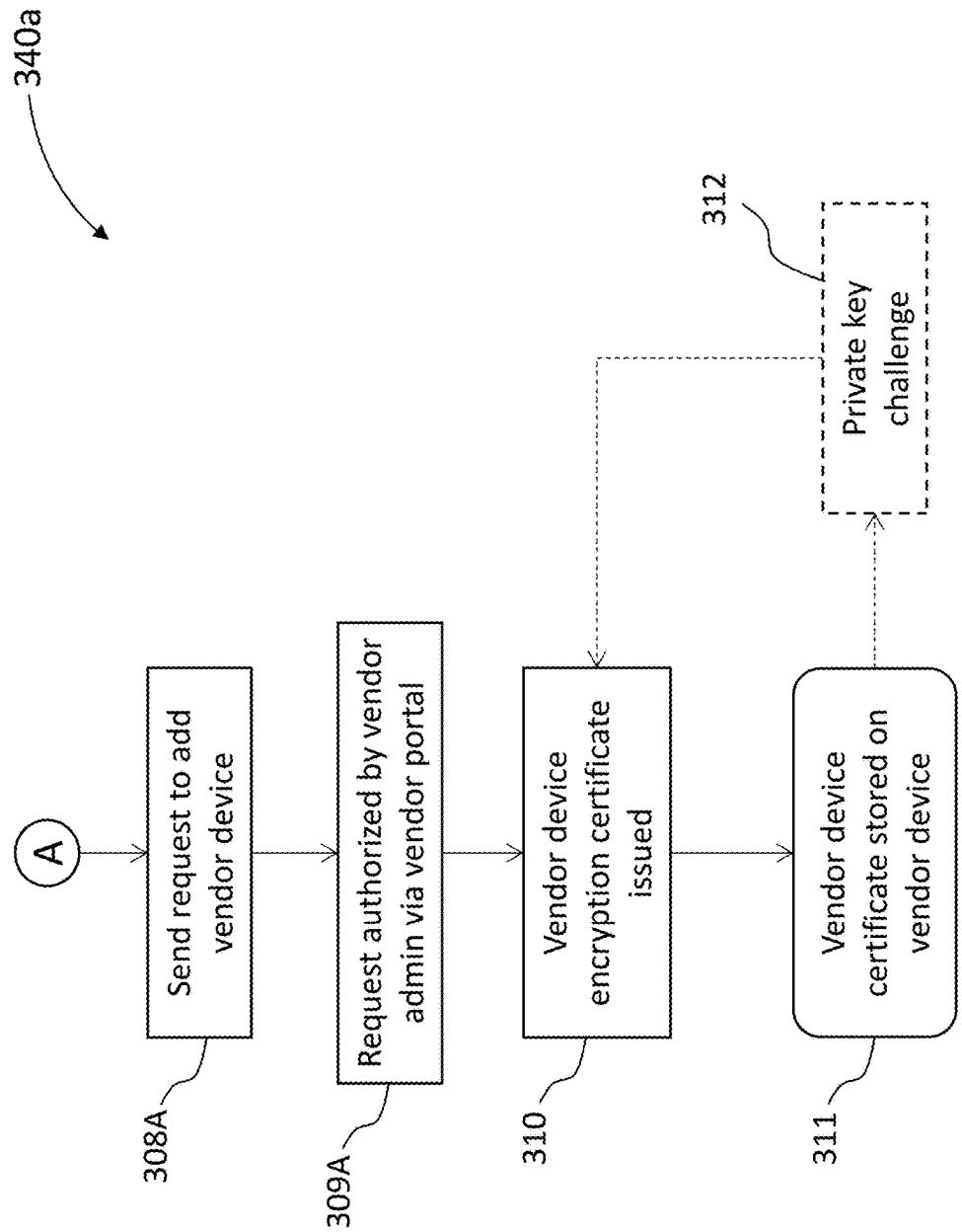
Figure 3A2

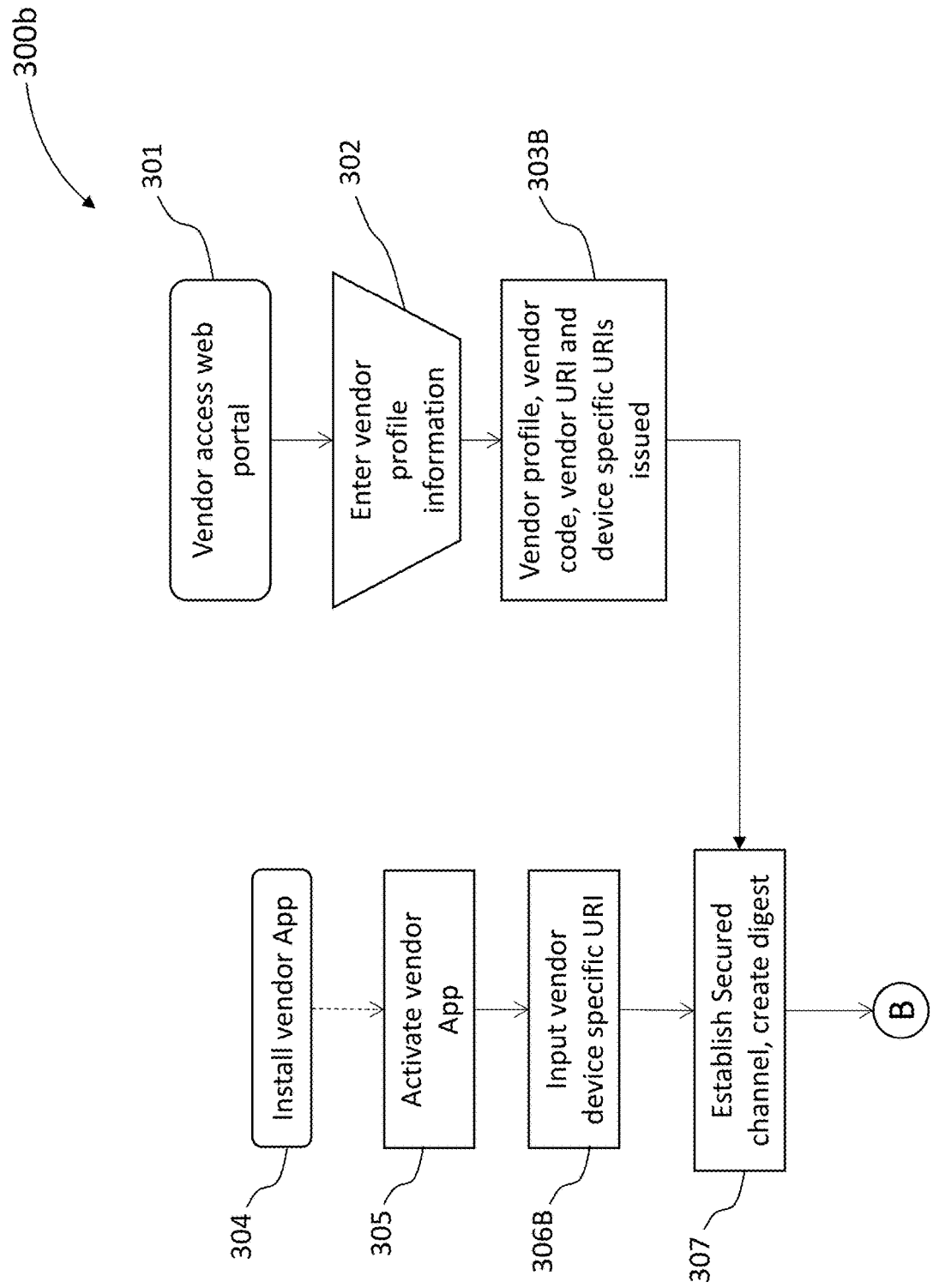
Figure 3B1

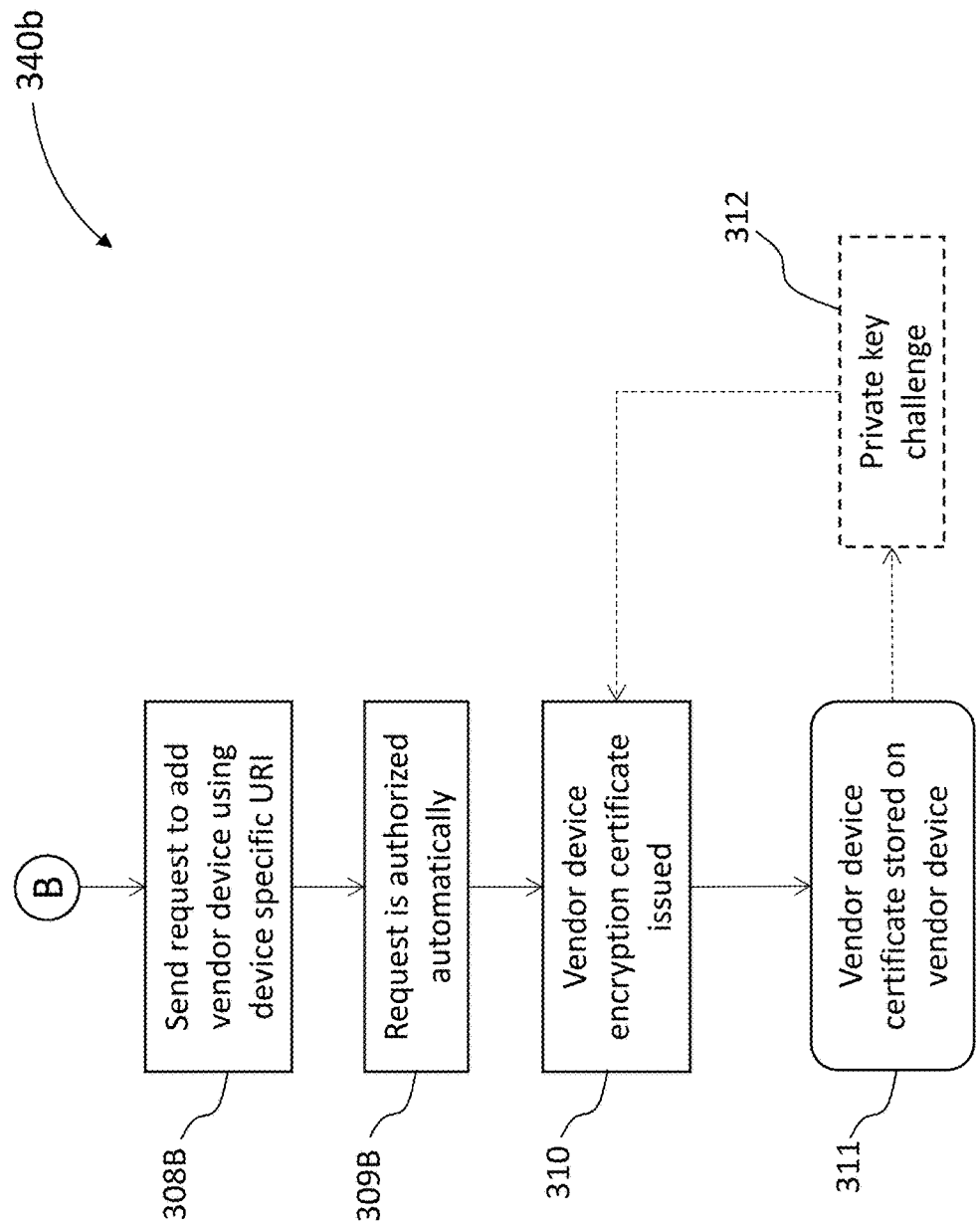
Figure 3B2

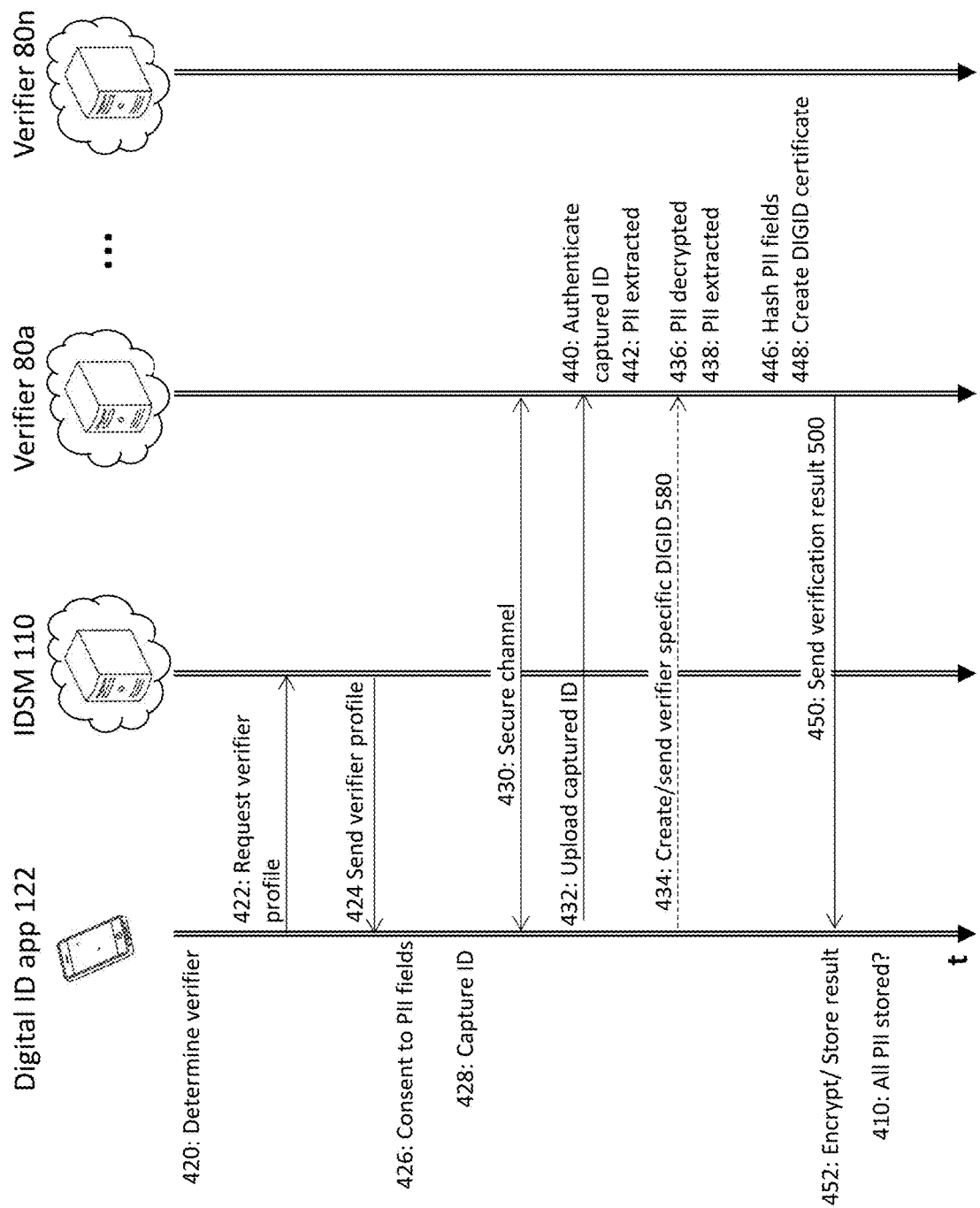

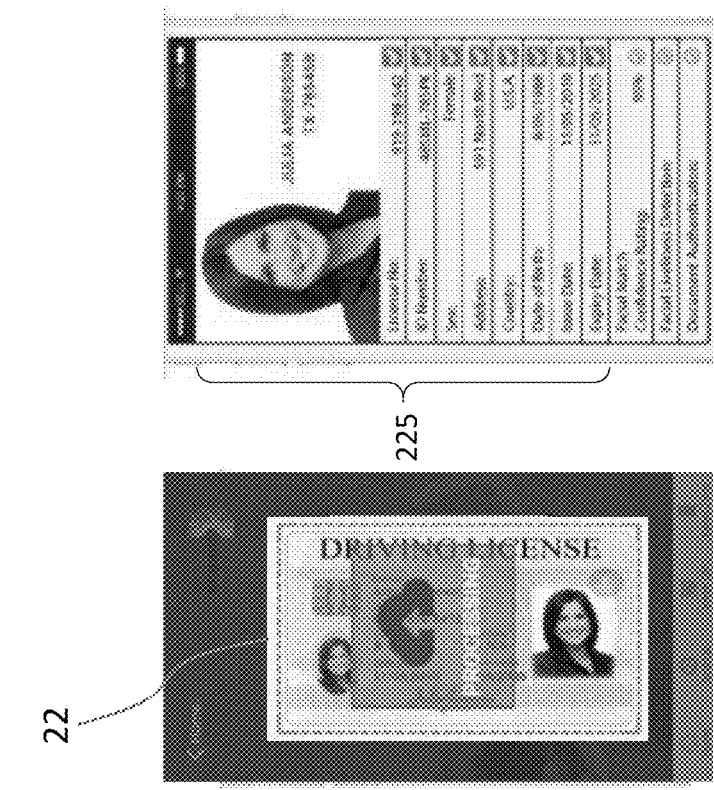
Figure 6D
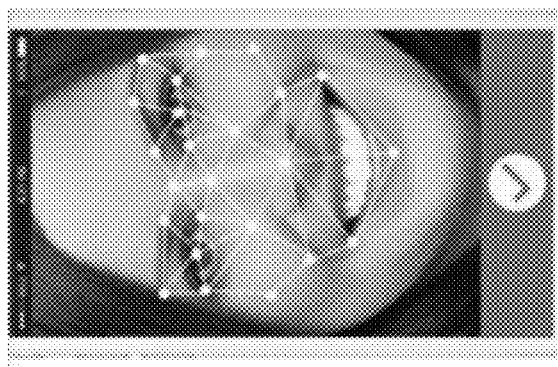
Figure 6C
Figure 6B
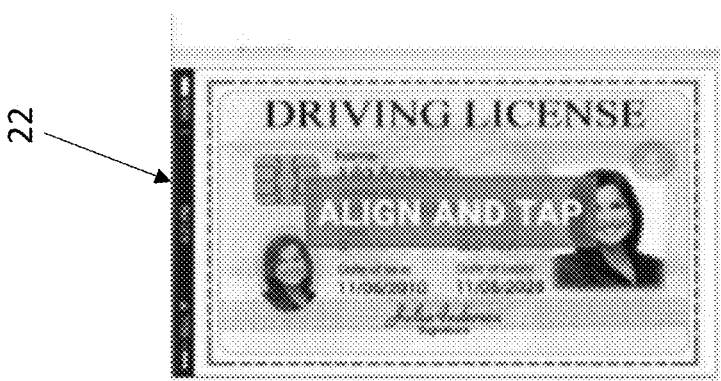
Figure 6A

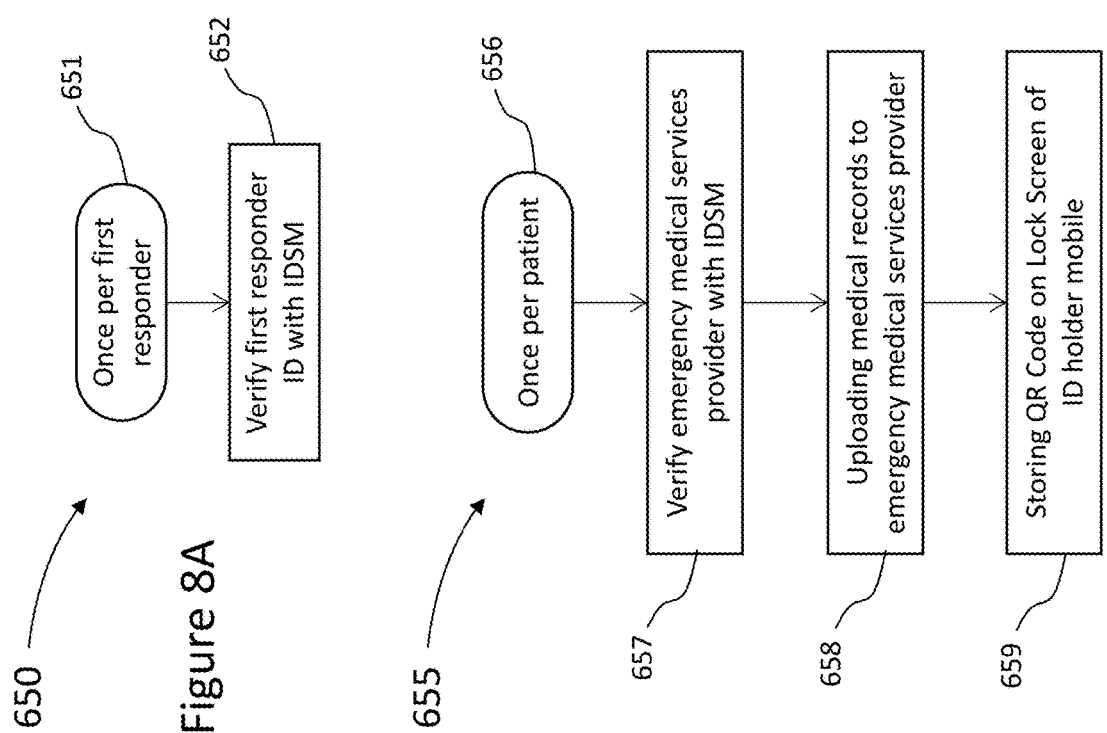

SYSTEMS AND METHODS FOR CREATING A DIGITAL ID RECORD AND METHODS OF USING THEREOF

CROSS REFERENCE TO RELATED APPLICATION

The present application is a national stage entry of PCT/US2019/049800 filed Sep. 5, 2019 which claims priority to and the benefit of IL patent application number 261679 filed on Sep. 6, 2018, the contents of which are hereby incorporated by reference for all purposes in their entirety, as fully set forth herein.

FIELD OF THE INVENTION

The disclosure relates to a system and method for identification management and more specifically, creating of a non-reputable digital record of an ID document of an ID holder, storing the digital ID and sharing the personally identifiable information fields of the document, or parts thereof, with selected parties.

BACKGROUND

With many commercial and government organizations rushing to provide connected services, it has become increasingly difficult for individuals to protect their personal information and identity. Every interaction that an individual has, online and in person, potentially stores information about them in an unknown database at unknown datacenters somewhere around the world. Individuals are also continuously encouraged by mobile apps, retail websites, and social network providers to "update their profile" to share more and more personal information in addition to that already collected.

With so many copies of personal information profiles, and little incentive for the organizations, merchants, and vendors who have collected the profiles to secure them, a regular stream of data breaches compromising the information of hundreds of thousands or even millions of individuals have become a fact of twenty-first century life. Privacy concerns are beginning to generate international regulatory attention, legislation such as GDPR (General Data Protection Regulation, 2016) in the EU declare privacy a fundamental human right and impose harsh penalties for overcollection and mishandling of personal information. Although such regulation is a much-needed step in the right direction, it does not change the fundamentals of the problem:

Presently, knowledge-based authentication is the most prevalent means of ascertaining the identity of an individual, especially during online interactions. In this system, an individual provides a set of personal information fields (name, password, date of birth, etc.) to a vendor, who checks the accuracy of the provided values against a stored record; if all of the fields match, then the identity is said to be confirmed. Stealing the required information is equivalent to stealing an identity which makes central data repositories a high-value target to identity thieves. Data stolen during a breach is sold en masse on the black market—it is as if the contents of a bank vault could be carried away on a thumb drive.

Once a set of personal information fields has been compromised, it is no longer suitable for authentication—the individual providing the values may be the thief. The only way to maintain the same level of identity assurance is to request additional personal information fields, which must be collected and retained for later comparison in increasingly complete centrally-stored repositories. The more complete the repository, the more valuable it is to an attacker, and the more damaging the compromise is to the victims. The cycle is not sustainable: soon, when every piece of personal information for nearly every first-world citizen is available for sale on the dark web, the current knowledge-based single-factor authentication system will be rendered useless.

Methods for strong cryptographic-token and biometric multi-factor authentication were developed over two decades ago in anticipation of this problem. In practice, using multi-factor strong authentication is expensive and inconvenient for enrollment, renewal, and recovery, and has seen limited use outside of government identification used for government consumption—such as e-Passports, military, and European national ID (identification) cards. In the private sector strong authentication is slowly gaining acceptance with recent developments using fingerprint and facial biometrics to unlock phones, text-message based security challenges, and NFC mobile device payment services. However, it has proven difficult to avoid knowledge-based authentication for initial enrollment and recovery, effectively negating the additional assurance that such techniques could offer.

A purported solution to knowledge-based identity authentication is the digital ID (DIGID), which is a digital representation of a government-issued ID document ("captured ID") stored to an addressable memory location of a user mobile device. This approach is clearly a promising method for commercial use: by using an existing mobile device, DIGID eliminates the need to issue hardware and readers, and using an existing identification document sidesteps the expensive infrastructure and inconvenient enrollment process. To the consumer, DIGIDs promise greater ease of use, enhanced privacy, and reduced risk of identity theft. However, like other attempts to mass-market strong authentication, the solutions to date provide only an illusion of security: without proper verification and protection of the underlying document, many digital IDs are hardly better than a photograph, and further, their unsecured usage and transmission can make identity theft even easier than for their physical counterparts. One issue that arises when using digital IDs is their storage in a central storage, particularly when the storage is accessible via an external network. Many solutions publish the contents of digital IDs in respective central storage, which then becomes an attractive target for hacking, and any security breach thereof would prove to be very costly. Solutions that move the ID storage to an addressable memory location of a user device typically do not resolve the risk of exposure of digital ID data at rest, during transmission, or transferring to a new device.

Another issue that arises when using digital IDs is user privacy. By their nature, a government ID is designed and assumed to be one of the strongest forms of identification. Providing a vendor with a complete copy of this identification invites man-in-the-middle and insider attacks—and ID theft of a government document is very difficult and costly to fight.

Attempts have been made to provide more secure digital IDs with user control of the personally identifiable information (PII) fields ("PII fields") that are shared with $3^{rd}$ parties. US20170213211A1 to Sibert et al suggests limiting the ID fields shared in a transaction but can only verify ID documents with embedded electronics and does not provide any assurance to the user that the vendor is authentic. US20160380774 likewise suggests limiting the ID fields to be shared but provides no assurance that the digital ID is genuine and also does not provide assurance to the user that the vendor is authentic. US20160239658 to Loughlin-Mchugh et al. discloses a databased digital identity system for creating a computer stored digital identity. The ID holder stores his/her data items in the secured database, and a third party obtains access means to extract the data items from the secured database. PCT application WO2016128569A1 Francisco Angel Garcia RODRIGUEZ, et al. discloses a method of a digital identity system generating a sharing token for authenticating a bearer to a validator, wherein a data store of the digital identity system holds a plurality of attributes of the bearer, the method including implementing by the digital identity system the following steps: receiving at the digital identity system from a bearer an electronic sharing token request, wherein the token request identifies at least one of the bearer's attributes in the data store selected for sharing with a validator; in response to the electronic token request, generating a sharing token, which is unique to that request, for presentation by the bearer to a validator; associating with the unique sharing token at the digital identity system the identified at least one bearer attribute; and issuing to the bearer the unique sharing token; and wherein later presentation of the unique sharing token to the digital identify system by a validator causes the at least one bearer attribute associated with the sharing token to be rendered available to the validator by the digital identity system.

SUMMARY

There is clearly a need for a system that enables secure management of a verified digital ID with secure methods for sharing of a limited amount of PII fields, with confirmation for both user and vendor of each other's authenticity, and without relying on a $3^{rd}$ party to keep the storage memory location and exchange confidential.

The present disclosure overcomes the drawbacks of the prior art by providing a system and method that enables secure management of a verified digital ID with secure methods for sharing of a limited subset of PII fields, with assurance for both an ID holder and a vendor of each other's authenticity, and without relying on a $3^{rd}$ party to keep the PII field values confidential.

The system of the present disclosure is used and operated by the following main protagonists that form part of the DIGID ecosystem:
  ID holder: an individual with an identification document or information that can be shared to receive services from a vendor;
  vendor: provides services/products to the ID holder;
  verifier: provides DIGID verification services; verifies and converts the identification documents and information from the ID holder into a digital ID (DIGID); and
  digital ID service provider: manages a DIGID system manager (IDSM) that facilitates interaction between ID holders, vendors, and verifiers.

Vendors and verifiers are required to register their services, vendor-PII-requirements and servers/devices with an IDSM before they can be part of the DIGID ecosystem. A vendor's server/device is referred herein, interchangeably, as a "vendor device" or a "vendor-computing-device". Following registration, vendor devices are associated with a unique Universal Resource Identifier (URI) that can be shared with ID holders, as a non-limiting example, in the form of a QR code.

In use, an ID holder uses a digital ID app on his/her computing device, such as but not limited to a smartphone, for storing and using one or more digital IDs. The interaction of an ID holder and a vendor starts with the ID holder acquiring and entering a vendor URI.

In one non-limiting example, where a vendor is a bar and wants to verify that a user, having a DIGID, is over 21 years of age, the bar might display the URI in the form of a barcode at the entrance to the bar or on an electronic invitation sent to the ID holder. The ID holder could then enter the URI by scanning the barcode using the DIGID app installed on the ID holder's computing device and the camera of the ID holder's computing device. In brief, the ID holder/vendor experience may proceed as follows:

After scanning the URI, the ID holder would be presented (by the DIGID app) with a request for consent to share PII fields required by the vendor to allow the ID holder entrance into the bar, such as the ID holder's photograph and birth date.

Following consent of the ID holder to share these PII fields, the ID holder can be directed, via the DIGID app to begin an enrollment process performed by the ID holder opposite one or more verifiers. As part of the enrollment process, the ID holder can send PII, potentially in the form of a captured ID including the required PII fields, as required by the vendor, to the appropriate verifier/s (as identified in the vendor URI) for conversion into a DIGID. In a non-limiting example of creating a captured ID, the ID holder scans their driver's license using the ID holder device camera, and the verifier verifies that the license was genuine and extract the PII fields from the scan. Following enrollment, the DIGID can be transferred from the verifier to the ID holder's device for storage in an addressable memory location as determined by the DIGID app. In some instances, the ID holder may have previously performed an enrollment process and may already have stored a DIGID with PII fields as required by the vendor and as verified with a verifier accepted by the vendor. In such instances, the enrollment process can be bypassed, meaning following consent of the ID holder to share the PII fields, the DIGID app can proceed as follows without directing the ID holder through the enrollment process.

The DIGID app generates a pass that can be scanned or entered into a vendor device in order to transfer the required PII fields to the vendor device. The PII fields are then transferred to the vendor device, such as a device held by a bar employee manning the entrance to the bar. The employee could then admit the ID holder to the bar (or not) based on the information in the PII fields that were shared.

The verification process provides cryptographic protection for the DIGID and as illustrated by the following more detailed description of the ID holder/verifier/vendor interaction.

Vendors register to the IDSM and create a vendor profile and enroll specific vendor devices for use or installation at vendor venues. The vendor profile includes vendor business information such as addresses of venues, the PII fields required from ID holders by the vendor, and information related to how the vendor will use the PII fields. Enrolled vendor devices are issued certificates corresponding to private keys on each vendor device. The IDSM may also allocate a vendor URI that may be encoded in scannable digital image form, such as, without limitations, a QR code, to each vendor. The vendor profile URI can include a vendor code that is a cryptographic digest of the vendor profile.

Verifiers register to the IDSM and create a verifier-profile as well as enroll specific verifier servers for use in creating DIGIDs. A verifier-profile includes verifier business information, the PII fields required from ID holders by the verifier, and preferably, information related to how the verifier will use the PII fields. Enrolled verifier servers are issued certificates corresponding to private keys of each verifier server. The IDSM may also allocate a verifier URI, which uniquely identifies the verifier profile.

The ID holder, captures or otherwise inputs the vendor profile URI to the ID holder's device and uses the vendor URI on the device, to send an anonymous request for the vendor profile to the IDSM. The IDSM, upon receiving the anonymous vendor profile request can then provide the vendor profile to the ID holder's device. The ID holder can then decide whether to share the required PII fields (as listed in the received vendor profile) with the vendor or not, i.e. the ID holder can authenticate the vendor (with their expressed consent supported by cryptography). Each of the requested PII fields can be uniquely identified by a name and the URI of the trusted verifier for enrollment of those fields.

If the ID holder consents to share the requested PII fields, then the DIGID app checks whether these PII fields have already been stored in an addressable memory location on the ID holder computing device. If PII fields are missing, then an enrollment process is initiated with each verifier associated with the missing fields. In some examples, the enrollment process for each verifier can be executed in turn, completing verification with one verifier before enrollment is initiated with another verifier.

The enrollment process begins at the user's device. The DIGID app requests, from the IDSM, a verifier profile for a verifier associated with one or more missing fields. The DIGID app then displays, to the ID holder, a formatted summary of the verifier-profile from the IDSM. The verifier-profile lists the PII fields that the verifier will have access to. The ID holder is then prompted by the DIGID app to agree to share these PII fields with the verifier. The verifier-profile can also include capture instructions to guide the ID holder to provide a captured ID that the verifier can use to extract the required PII fields. As in the examples above, the captured ID may include a scan of an ID document and/or additional information related to the DIGID that is being created. The captured ID may also include PII fields verified by one or more other verifiers. The captured ID is sent from the DIGID app to the verifier over a secure communications channel.

Once the captured ID is received by the verifier, the enrollment process continues at the verifier. The captured ID is verified as authentic by the verifier and the verifier then extracts PII from the captured ID and generates PII fields, based on the extracted PII, each PII field having a field name and a field value. The extracted PII fields are each then individually hashed with a respective nonce in a one-to-one fashion (one nonce to one PII field) to create a field hash value for each PII field. The verifier generates a signature for verifying the field hash values. The verifier then packs the field hash values, the verifier server signature, and the ID holder's public key (corresponding to the private key on the computing device of the ID holder) into a digital-ID-certificate (DIGID certificate). Each PII field, unhashed, is separately paired with each respective nonce, forming an array of PII field-nonce pairs. The DIGID certificate and the array of PII field-nonce pairs is then returned over a secure channel, by the verifier to the ID holder's device. The combination of PII field-nonce pairs and digital-ID-certificate are referred to herein as the "verification result". The array of PII field-nonce pairs are encrypted on the ID holder's device. Thereby, the extracted-PII-fields become cryptographically protected jointly and severally. The encrypted PII-field-nonce pairs and DIGID certificate are stored on the ID holder's device in addressable memory. It should be noted that the verifier erases the extracted information and therefore does not store any of the extracted-PII-fields or nonce values after verification is completed.

It should be noted that a nonce is preferably generated using a cryptographically secure pseudo-random number generator (PRNG). Optionally one nonce is generated and the others are derived using, for example, a hash tree (Merkel tree).

Following the enrollment process with a verifier, the DIGID app again checks whether all of the PII fields required by the vendor have been stored in an addressable memory location on the computing device of the ID holder. If required PII fields are still missing, then an enrollment process is initiated with a further verifier associated with some or all of the missing PII fields. The enrollment process starting with the DIGID app requesting the verifier-profile from the IDSM, repeats until all required fields have been enrolled.

Once all of the vendor required PII fields are stored in an addressable memory location on the ID holder computing device, the digital ID app generates a "vendor-specific digital ID" which includes: the agreed PII-nonce pairs signed by the digital-ID-certificate; the signed fields and certificate encrypted with a symmetric key; and the symmetric key wrapped using the public keys of each vendor device (as received in the vendor profile). The vendor-specific digital ID is uploaded to the IDSM. The IDSM does not have the keys to decrypt the vendor-specific digital ID. Further options are described herein for splitting of the symmetric key to provide enhanced protection for the PII fields.

The IDSM then allocates a vendor-specific digital ID code to the computing device of the ID holder corresponding to the vendor-specific digital ID. The digital ID app then converts this code into a digital ID pass and the digital ID pass is transferred by the ID holder to the vendor, such as, without limitations, displaying a digital ID pass in the form of a QR code for scanning by an authorized vendor device.

Once the vendor's authorized device has received the digital ID pass of the ID holder, the vendor retrieves the vendor-specific digital ID from the IDSM and handles decryption and verification on the vendor device. Using cryptography, the vendor device can determine that the user-provided subset of PII fields are unchanged from when the complete set of PII fields was originally captured and verified, i.e. the vendor can authenticate the ID holder (user). Once decrypted and verified, the vendor device or a vendor user operating the vendor device may determine, based on the values of the PII fields provided, whether or how to interact with the ID holder. Since the symmetric key is wrapped using the vendor device public key, only the vendor devices, selected by the ID Holder device at the time of encryption, can decrypt the agreed PII fields. As above, the IDSM cannot decrypt the PII fields that are stored as opaque data for a limited time and deleted after use.

ID holders benefit from having a secure verified digital ID and enhanced privacy because they can control which PII fields are shared without reliance on a $3^{rd}$ party identity service to store their information confidentially. Vendors benefit from a simplified trustworthy method of reviewing authenticated IDs, increased confidence in identity with multifactor authentication, and reduced risks from not having to process, transmit, or store unrequired sensitive ID holder data. The DIGID service provider benefits by reducing the value of an attack, as no personal information is stored in an addressable memory location of the IDSM.

The terms "identification document" and "ID" are used herein interchangeably. As used herein, identification document may include any of passports, driver's licenses, identity documents and documents of value used to identify a user. An identification document includes (a) ID document field names and values related to the user including but not limited to name, address, date of birth, photograph, as well as encoded biometric information including fingerprints, voice prints, and retinal scans (eyeprints), and so forth, and (b) at least one security feature to allow the authentication of the ID document fields. In addition, other information referred to herein as "info fields values" may be associated with a user such as but not limited to a flight booking number, or a transaction number. These ID document fields and info fields are referred to herein as PII (personally identifiable information) fields. Each PII field includes a field name and the actual field value.

A digital identification document (DIGID) is the (a) digital representation of some or all of the PII fields associated with a user, and (b) a mechanism through which computer systems can authenticate the PII fields. The user associated with the PII fields is referred to herein as an "ID holder".

The term "verifier" as used herein refers to a service provider that provides verification services for one or more types of ID documents, and/or one or more info fields for creation of a DIGID based on these ID document and/or info fields.

The term "vendor" as used herein refers to an authority, a provider of services or a provider of goods that requires that an ID holder to provide a form of identification to the vendor. As such a vendor may be any of a law enforcement department or officer, merchant, service provider and so forth.

The term "app" as used herein refers to a software application running on a computing device such as, without limitations, a mobile device.

The term "private key" as used herein refers to an encryption key that is intended, for the purposes of encryption, to be held in secret. For instance, secrecy of the private key can be maintained by securing the private key on a singular device within a secured system such that the private key is not likely to become known to another party.

The term "public key" as used herein refers to an encryption key that is intended, for the purposes of encryption, to be broadcast (over secure or insecure channels) to other parties.

The term "asymmetric encryption" as used herein refers to a form of encryption that involves using pairs of keys such that each key pair includes a private key and an associated public key. For instance, a sending device and a receiving device can each have a private key kept secret and a public key that is transmitted or otherwise made available to the other device. Using asymmetric encryption, a message can be encrypted by the sending device using the public key of the recipient device then be decrypted using the private key of the recipient device to provide message confidentiality, and encrypted using the private key of the sending device and the public key of the recipient device to protect message integrity. Keys for asymmetric encryption can be generated and exchanged through various processes as are known in the art, including but not limited to Diffie-Hellman, Rivest-Shamir-Adelman (RSA), and Elliptic Curve Cryptography (ECC). Asymmetric encryption can otherwise be facilitated using data structures and/or algorithms known and yet to be developed as would be appreciated and understood by a person of ordinary skill in the art according to the teachings of the present disclosure.

The term "hash" used herein as a noun refers to a data structure and/or message digest algorithm utilized to perform a one-way function for mapping data to a "hash value." The term "hash" and its conjugates used herein as a verb refers to performing the one-way mapping process. The term "hash value" as used herein refers to a data structure that is the result of the data being mapped using the "hash." The "hash value" can be generated in a one-way fashion such that the original data cannot extracted from the "hash value." Hashing can be used as a means for verifying the original data is authentic. For instance, a recipient in possession of the hash can receive data (that is presumed to be the original data) and the hash value, can hash the received data to generate a hash value, and can compare the generated hash vale to the received hash value. If the generated hash value matches the received hash value, the recipient can conclude that the received hash value and received data are unaltered forms of the hash value and the original data. Example hash algorithms known in the art include, but are not limited to MD4, MD5, Security Hashing Algorithm (SHA), RIPEMD, WHIRLPOOL, and TIGER. As used herein, the term "hash" can include, but is not limited to, variations of the hash process such as salting. Hashing can be performed using data structures and/or algorithms known and yet to be developed as would be appreciated and understood by a person of ordinary skill in the art according to the teachings of the present disclosure.

The term "signature" as used herein refers to a data structure generated for the purposes of verifying content of a transmitted message (e.g. a transmitted document). The signature can be generated via a one-way process such as hashing and/or a two-way encryption process. In other words, the signature can include a hash value or other data structure that cannot be used to ascertain the original content of the transmitted message; additionally, or alternatively, the signature can include an encrypted representation of some or all of the content of the transmitted message that can be decrypted to recover the encrypted portion of the content. Signatures can therefore be validated using hashing and/or decryption according to the means by which the signature is generated. Signatures can otherwise be generated and/or validated using data structures and/or algorithms known and yet to be developed as would be appreciated and understood by a person of ordinary skill in the art according to the teachings of the present disclosure.

The term "certificate" as used herein refers to a data structure including verified contents and a public key or identifier thereof associated with a verified entity. The certificate can be associated with and/or contain a signature of an issuing entity that has verified the certificate's contents. The recipient of a certificate can validate the certificate as authentic by validating the signature via hashing, decryption, and/or other means as are appreciated and understood by a person of ordinary skill in the art. The validation of the certificate signature (and potentially the identity of the entity that issued the certificate) can be used as by a recipient to determine whether the contents of the certificate are trusted. The public key can be used by a recipient to verify proof-of-possession of the corresponding private key by the end entity.

Unless otherwise defined, all technical and scientific terms used herein have the same meaning as commonly understood by one of ordinary skill in the art to which this disclosure belongs. The materials, methods, and examples provided herein are illustrative only and not intended to be limiting. The present disclosure can be implemented in the testing or practice with methods and materials equivalent or similar to those described herein.

As used herein, a phrase referring to "at least one of a list of items refers to any combination of those items, including single members. As an example, at least one of: a, b, or c" is intended to cover: a, b, c, a-b, a-c, b-c, and a-b-c.

Implementation of the example methods and systems of the present disclosure can involve performing or completing certain selected tasks or steps manually, automatically, or a combination thereof. Moreover, according to actual instrumentation and equipment of the example methods and systems of the present disclosure, several selected steps could be implemented by hardware and/or by software. Actual instrumentation is not hardware or firmware specific and can be realized by using operating systems, firmware, and combinations thereof as would be appreciated and understood by a person of ordinary skill in the art according to the principles of the present disclosure. For example, as hardware, selected steps of the present disclosure can be implemented as a chip, a circuit, a distributed computing system, or a network of such systems and devices. As software, selected steps of the present disclosure could be implemented as a plurality of software instructions being executed by a computing system, computing device, and/or network thereof using any suitable operating system. In any case, selected steps of the example methods and systems of the present disclosure can be described as being performed by a data processor, such as a computing platform for executing a plurality of instructions.

Although the present disclosure is described with regard to a "computing device", a "computer", or "mobile device", it should be noted that optionally any device featuring a data processor and the ability to execute at least one instruction may be described as a computer, including but not limited to a personal computer (PC), a server, a distributed server, a digital server, a cloud computing platform, a collection of servers, load balanced microservices, or redundant architecture servers, a cellular telephone, an IP telephone, a smartphone, or a PDA (personal digital assistant), and the like. Any two or more of such devices in communication with each other may optionally define a "network" or a "computer network".

The various illustrative logics, logical blocks, module executing on data processors ("processors"), circuits and algorithm steps described in connection with the implementations disclosed herein can be implemented as electronic hardware, computer software, or combinations of both. The interchangeability of hardware and software has been described generally, in terms of functionality, and illustrated in the various illustrative components, blocks, module executing on a processors, circuits and steps described above. Whether such functionality is implemented in hardware or software depends upon the particular application and design constraints imposed on the overall system.

The hardware and data processing apparatus used to implement the various illustrative logics, logical blocks, module executing on a processors and circuits described in connection with the aspects disclosed herein can be implemented or performed with a single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor may be a microprocessor, or, any processor, controller, microcontroller, or state machine. A processor also may be implemented as a combination of electronic devices, such as a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, e.g., one or more module executing on a processors of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module executing on a processor which may reside on a computer-readable medium. Computer-readable media can include computer storage media and/or communication media including any medium that can be enabled to transfer a computer program from one place to another. Storage media can be media that can be accessed by a computer. Storage media can include volatile and non-volatile, removable and non-removable tangible, physical media implemented in technology for storage of information, such as computer readable instructions, data structures, program modules, or other data. By way of example, and not limitation, such non-transitory computer-readable media can include random access memory (RAM), read-only memory (ROM), electronically erasable programmable ROM (EEPROM), compact disc ROM (CD-ROM), digital versatile disks (DVD) or other optical disk storage, magnetic disk storage or other magnetic storage devices, or any other tangible, physical medium that can be used to store desired program code in the form of instructions, information, or data structures and that can be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

According to the teachings of the present disclosure there is provided a method for creating of a verification-result that is a non-reputable digital record of an identification (ID) document (ID-document) of an ID-holder, by a verifier-server, the method including the steps of:
  a. securely receiving, at the verifier-server, from an ID-holder-computing-device of the ID-holder, a captured-ID of the ID document;

b. authenticating the captured-ID, by the verifier-server;
c. generating personally identifiable information (PII) fields, by the verifier-server, each PII-field respectively being a computer-readable representative of PII in the captured-ID;
d. generating PII-hash-pairs, by the verifier-server;
e. by pairing each one of the extracted-PII-fields, forming PII-field with a respective hash, wherein each respective hash can be salted with a nonce;
f. generating individually-hashed-PII-fields, by the verifier-server, by individually hashing each PII-field;
g. generating a verifier-server-signature, by the verifier-server, the verifier-server-signature being a cryptographic signature over individually-hashed-PII-fields;
h. transmitting from the verifier-server, to the ID-holder-computing-device, a verification-result including the PII-hash-pairs, the individually-hashed-PII-fields, and the verifier-server-signature; and
i. deleting, from the verifier-server, the PII-hash-pairs, the verification-result upon transmission of the verification-result.

Optionally, the generating of the verifier-server-signature includes: (a) receiving, at the verifier-server, an ID-holder-public-key being part of an asymmetric key pair including an ID-holder-private-key on the ID-holder-computing-device; and encrypting, by the verifier-server, the plurality of the individually-hashed-PII-fields through asymmetric encryption using a verifier-server-private-key and the ID-holder-public-key.

Optionally, the method for creating of a verification-result further includes: (a) verifiably encapsulating, at the verifier-server, the individually-hashed-PII-fields, with the verifier-server-signature using an asymmetric key encryption, by the verifier-server, forming individually-signed-PII-fields; (b) combining, at the verifier-server, the individually-signed-PII-fields. thereby forming a digital-ID-certificate; and (c) generating, at the verifier-server, the verification result including the digital-ID-certificate, and the PII-hash-pairs.

According to further teachings of the present disclosure there is provided a method for or generating and transmitting a vendor-specific-DIGID using an IDSM. In the registration stage, the verifier-server generates the verification-result, as above, wherein the verification-result is received at the ID-holder-computing-device.

In a configuration stage, upon the ID-holder encountering a vendor, the ID-holder-computing-device requests from the IDSM, a vendor-profile for that vendor wherein the vendor-profile includes a list of required-PII-fields-names. The vendor-profile is then received at the ID-holder-computing-device. The ID-holder-computing-device then displays the list of required-PII-field-names. A user-interface is provided, on the ID-holder-computing-device, wherein that user-interface is configured to allow the ID-holder to provide consent to share, with the vendor, a subset of the PII-fields associated with the list of required-PII-field-names.

It should be noted that the receiving of the vendor-profile can further include receiving the vendor-profile such that the vendor-profile further includes verifier-names, each associated with a respective required-PII-field-name of the list of required-PII-field-names, and wherein each verifier-name is associated with a respective verifier-server.

In a DIGID response generation and transfer stage, upon the ID-holder consenting to share the required-PII-fields with the vendor, the following steps are performed:
a. selecting, by the ID-holder-computing-device, a subset of the PII-hash-pairs including the subset of PII-fields associated with the list of required-PII-field-names;
b. generating an ID-holder-signature, by the ID-holder-computing-device, the ID-holder-signature being a cryptographic signature configured for verification of the subset of the PII-hash-pans;
c. generating a vendor-DIGID-response, by the ID-holder-computing-device, the vendor-DIGID-response including the subset of PII-hash-pairs, the ID-holder-signature, the plurality of individually-hashed-PII-fields, and the verifier-server-signature;
d. generating the vendor-specific-DIGID, by the ID-holder-computing-device, the vendor-specific-DIGID including the vendor-DIGID-response; and
e. transmitting, from the ID-holder-computing-device, the vendor-specific DIGID to the vendor-computing-device.

The IDSM can include at least one verifier-server.

According to aspects of the present disclosure there is provided a method for verifying and displaying the vendor-specific-DIGID on a vendor-computing-device, wherein, in a DIGID transfer stage, the vendor-specific-DIGID is generated and transmitted described above. The vendor-specific-DIGID is then received at the vendor-computing-device of the vendor.

In a DIGID validation stage, the subset of PII-hash-pans with the ID-holder-signature is validated on the vendor-computing-device. Then, the plurality of the individually-hashed-PII-fields is validated on the vendor-computing-device, with the verifier-server-signature. Then, on the vendor-computing-device, each PII-field in the subset of PII-hash-pans is validated by hashing each PII-field in the subset with a respective hash in a respective PII-hash-pair and comparing results from the hashing with the individually-hashed-PII fields. Then, the status of validation and a summary of PII-field names and values in the subset of PII-hash-pairs, are displayed by the vendor-computing-device.

The generation of the vendor-specific-DIGID, that includes the vendor-DIGID-response, can further include the steps of:
a. encrypting, by the ID-holder-computing-device, with a symmetric-key, the vendor-ID-response;
b. receiving, at the ID-holder-computing-device, a vendor-computing-device-public-key being part of an asymmetric key pair including a vendor-computing-device-private-key on the vendor-computing-device;
c. generating a wrapped-key, by the ID-holder-computing-device, by encrypting the symmetric-key with the vendor-computing-device-public-key and the ID-holder-private-key;
d. generating the vendor-specific-DIGID, by the ID-holder-computing-device, such that the vendor-specific-DIGID includes the vendor-ID-response only as encrypted with the symmetric-key; and
e. generating the vendor-specific-DIGID, by the ID-holder-computing-device, such that the vendor-specific-DIGID further includes the wrapped-key.

The requesting and receiving of the vendor-profile may be performed only if the vendor-profile is not known to the ID-holder-computing-device.

The requesting a vendor-profile for the vendor can include: (a) acquiring a vendor-URI associated with the vendor by the DIGID-app on the ID-holder-computing-device; and (b) requesting the vendor-profile associated with the vendor-URI from the IDSM.

The transmitting of the vendor-specific DIGID, by the ID-holder-computing-device, to the vendor-computing-device, includes anonymously transmitting the vendor-specific DIGID to the IDSM.

The DIGID generation and transfer stage can be performed immediately after the configuration stage.

According to aspects of the present disclosure there is provided a method for generating and transmitting a vendor-specific-DIGID-pass including the steps of:

a. generating and transmitting the vendor-specific-DIGID as above;
b. receiving, at the IDSM, vendor-specific-DIGID;
c. generating, by the IDSM, a vendor-specific-DIGID-pass based at least in part on the vendor-specific-DIGID;
d. transferring the vendor-specific-DIGID-pass from the IDSM to the ID-holder-computing-device
e. providing the vendor-specific-DIGID-pass, to the vendor-computing-device, by the ID-holder-computing-device, wherein the vendor-specific digital ID pass can be provided in the form of a digital ID pass URI; and
f. requesting and receiving the vendor-specific-DIGID, from the IDSM, by the vendor-computing-device.

Generating of the vendor-specific-DIGID-pass can include (a) transferring, from the IDSM, to the ID-holder-computing-device, a vendor-specific-DIGID-code including an IDSM-address, the vendor-specific-DIGID-code corresponding to the vendor-specific-DIGID; and (b) combining the vendor-specific-DIGID-code and the IDSM address to form the vendor-specific-DIGID-pass. The vendor-specific-DIGID-pass can be provided in the form of a digital ID pass URI (Universal Resource Identifier).

The request of the vendor-specific-DIGID from the IDSM can include:

a. extracting the vendor-specific-DIGID-code from the vendor-specific-DIGID-pass; and
b. requesting the corresponding vendor-specific-DIGID from the IDSM by the vendor-computing-device.

The vendor-specific-DIGID-code can be a cryptographic digest of the vendor-specific-DIGID, wherein the IDSM can retain a mapping of the vendor-specific-DIGID-code to the vendor-specific-DIGID.

The vendor may be an authority, a provider of services or a provider of goods that requires that the ID-holder provides a form of identification to the vendor.

The captured-ID may include ID data selected from the group including:

a. a scan of an ID document associated with the ID-holder;
b. digital elements of an ID document associated with the ID-holder;
c. geolocation of the ID-holder;
d. a liveness test of the ID-holder;
e. verifier-specific-PII-fields; and
f. PII fields that are entered by the ID-holder.

The authenticating of the captured-ID can include the step of detecting security features of the captured-ID to determine that the ID document is genuine.

The method for generating and transmitting a vendor-specific-DIGID can further include steps performed by the ID-holder-computing-device as follows:

a. checking whether the subset of PII-hash-pairs including the subset of PII-fields, associated with the list of required-PII-field-names, is stored in an addressable memory location on the ID-holder-computing-device;
b. when at least one PII-hash-pair in the subset of PII-hash-pans is not stored in an addressable memory location on the ID-holder-computing-device, determining, based on at least in part on the list of required-PII-field-names, at least one missing PII field and a verifier-name associated with the at least one missing-PII-field;
c. requesting from the IDSM, a verifier-profile of a verifier identifiable by the verifier-name;
d. receiving the verifier-profile including verifier-PII-requirements and PII-field-capture-instructions, and wherein the verifier-PII-requirements includes a list of verifier-required-PII-field-names required to be shared by the ID-holder with the verifier for the purpose of verification;
e. when the ID-holder consents to share PII associated with the list of verifier-required-PII-field-names, forming a second-captured-ID according to the PII field-capture-instructions; and
f. transmitting the second-captured-ID to a second-verifier-server of the verifier;
g. receiving, from the second-verifier-server, a second-verification-result including second-PII-hash-pairs, second-individually-hashed-PII-fields, and second-verifier-server-signature; and
h. following the receiving of the second-verification-result, repeating steps a-g until, at step a, each PII-hash-pair, associated with every required-PII-field-name of the list of required-PII-field-names, is stored in an addressable memory location on the ID-holder-computing-device.

The generating of the vendor-specific-DIGID can include the step of signing a combination of the PII field-nonce value pairs and at least one digital-ID-certificate using a symmetric key, having a first part and a second part, generated by a digital-ID-app on the ID-holder-computing-device.

The generating of the vendor-specific-DIGID can further include: (a) unwrapping the symmetric key by the vendor-computing-device using the private key of the vendor-computing-device; and (b) decrypting the combination of the PII field-nonce value pairs and the at least one digital-ID-certificate using the symmetric key.

The symmetric key can be wrapped using the public key of the vendor-computing-device, wherein the public key corresponds to a private key of the vendor-computing-device.

The generating of the vendor-specific-DIGID can further include: (a) wrapping the first part of the symmetric key using the public key of the vendor-computing-device, wherein the public key corresponds to a private key of the vendor-computing-device; and (b) providing a digital-ID-pass in the form of a digital-ID-pass-URI, wherein the second part of the symmetric key included in the digital-ID-pass-URI. The generating of the vendor-specific-DIGID can then further include: (c) unwrapping the first part of the symmetric key by the vendor-computing-device using the private key of the vendor-computing-device; (d) extracting the second part of the symmetric key by the vendor-computing-device from the digital-ID-pass-URI; (e) combining the first and second parts of the symmetric key to form the symmetric key; and (f) decrypting the combination of the signed PII field-nonce value pairs and the at least one digital-ID-certificate using the symmetric key.

According to further teachings of the present disclosure there is provided a system for creating of a verification-result that is a non-reputable digital record of an identification (ID) document (ID-document) of an ID-holder, by a verifier-server, the system including: (a) an ID-holder-computing-device associated with the ID-holder; and (b) at least one trusted verifier-server, wherein the ID-holder-computing-device includes an ID-holder-processor and non-transitory computer-readable medium in communication with the ID-holder-processor and including ID-holder-device-instructions stored thereon, that when executed by the ID-holder-processor, cause the ID-holder-computing-device to securely transmit, a captured-ID of the ID document and a public key to the verifier-server; and wherein the verifier-server includes a verifier-processor and non-transitory computer-readable medium in communication with the verifier-processor and including verifier-instructions stored thereon, that when executed by the verifier-processor, cause the verifier-server to:
  a. authenticate the captured-ID received from the ID-holder-computing-device;
  b. generate personally identifiable information (PII) fields, each PII-field respectively being a computer-readable representative of PII in the captured-ID;
  c. generate PII-hash-pairs, wherein by pairing each one of the extracted-PII-fields, forming PII-field with a respective hash, wherein each respective hash can be salted with a nonce;
  d. generate individually-hashed-PII-fields, by the verifier-server, by individually hashing each PII-field;
  e. generate a verifier-server-signature, by the verifier-server, the verifier-server-signature being a cryptographic signature over individually-hashed-PII-fields;
  f. transmit to the ID-holder-computing-device a verification-result including the PII-hash-pairs, the individually-hashed-PII-fields, and the verifier-server-signature; and
  g. delete, the PII-hash-pairs, the verification-result upon transmission of the verification-result.

Optionally, the verifier-instructions, when executed by the verifier-processor, further cause the verifier-server to verifiably encapsulate of the individually-hashed-PII-fields with a signature using an asymmetric-private-key encryption.

Optionally, the verifier-instructions, when executed by the verifier-processor, further cause the verifier-server to verifiably encapsulate of the individually-hashed-PII-fields with a signature, jointly and severally, using an asymmetric key encryption.

According to aspects of the present disclosure there is provided a system for facilitating secure interaction between the ID-holder and a vendor, wherein the system is configured to create the non-reputable digital record of the ID document of the ID-holder by the verifier-server, as described above, wherein the ID-holder-device-instructions, when executed by the ID-holder-device-processor, further cause the ID-holder-computing-device to transfer a mutually agreed subset of the individually-hashed-PII-fields to a vendor-computing-device associated with the vendor.

The system for facilitating secure interaction between the ID-holder and a vendor further includes (a) a digital ID (DIGID) system manager (IDSM); and (b) the vendor-computing-device, wherein the ID-holder-device-instructions, when executed by the ID-holder-processor, further cause the ID-holder-computing-device to: (a) receive consent from the-ID holder to share required PII fields with the vendor; (b) upon receiving consent, request a vendor-profile for the vendor from the IDSM; (c) receive the vendor-profile, from the IDSM, at the ID-holder-computing-device, wherein the vendor-profile includes:
  i. a list of required-PII-fields required to be shared with the vendor, in order to interact therewith; and
  ii. at least one public key of a vendor-computing-device associated with the vendor;

(d) upon receiving consent, generate and send a vendor-specific-DIGID to the IDSM, wherein the vendor-specific-DIGID includes:
  i. a subset of the individually-hashed-PII-fields encrypted with the private key of the ID-holder-computing-device, wherein the subset of the individually-hashed-PII-fields is respectively compatible with the required-PII-fields; and
  ii. the DIGID-certificate encrypted with the at least one public key of the vendor-computing-device; and
(e) transfer the vendor-specific-DIGID to the vendor-computing-device, wherein the vendor-computing-device includes a vendor-processor and non-transitory computer-readable medium in communication with the vendor-processor including vendor-instructions thereon, that when executed by the vendor-processor, cause the vendor-computing-device to:
  i. extract the subset of individually-hashed-PII-fields from the vendor-specific-DIGID, to form a temporary subset of individually-hashed-PII-fields; and
  ii. validate the selected subset of extracted PII-fields using the individually-hashed-PII-fields extracted from the DIGID-certificate and the temporary subset of individually-hashed-PII-fields, to thereby facilitate secure interaction between the ID-holder and the vendor.

The ID-holder-device-instructions, when executed by the ID-holder-processor, further cause the ID-holder-computing-device to request and receive the vendor-profile only if the vendor-profile is not known to the DIGID-app.

The ID-holder-device-instructions, when executed by the ID-holder-processor, further cause the ID-holder-computing-device to transfer the mutually agreed subset of the individually-hashed-PII-fields to the vendor as follows:
  a. request a vendor-profile for the vendor from the IDSM;
  b. receive the vendor-profile, from the IDSM, wherein the vendor-profile includes a list of the subset of the PII fields required to be shared with the vendor;
  c. upon receiving consent, generate a vendor-specific-DIGID including the subset of individually-hashed-PII-fields;
  d. transmit the vendor-specific-DOGID to the IDSM;
  e. receive, from the IDSM, a digital-ID-pass corresponding to the vendor-specific-DIGID;
  f. provide the digital-ID-pass to the vendor-computing-device, wherein the vendor-instructions, when executed by the vendor-processor, further cause the vendor-computing-device to:
    i. request the vendor-specific-DIGID corresponding to the digital-ID-pass from the IDSM;
    ii. receive the vendor-specific-DIGID from the IDSM; and
    iii. extract the subset of individually-hashed-PII-fields from the vendor-specific-DIGID.

The vendor-specific-DIGID includes (a) PII field-nonce value pairs, each including one of the PII fields and a nonce value; and (b) at least one the digital-ID-certificate including the individually-hashed-PII-fields, each including a hash value of one of the PII field-nonce value pair.

The vendor-instructions, when executed by the vendor-processor, can further cause the vendor-computing-device to calculate hash values of the PII field-nonce value pairs and compare each calculated hash value with each of the cryptographically certified hash values to thereby validate the subset of cryptographically protected PII fields.

The verifier-instructions, when executed by the verifier-processor, can further cause the verifier-server to cryptographically protect by generating a different nonce value for association with each of the PII fields to form the PII field-nonce value pairs.

The verifier-instructions, when executed by the verifier-processor, can further cause the verifier-server to authenticate the captured-ID by detecting security features of the captured-ID to determine that the ID document is genuine.

The list of the subset of cryptographically protected PII fields in the vendor-profile may further include a verifier-name associated with each PII field, wherein each verifier-name is associated with a respective verifier, wherein the ID-holder-device-instructions, when executed by the ID-holder-processor, can further cause the ID-holder-computing-device to:
- a. check whether the subset of individually-hashed-PII-fields is stored in an addressable memory location on the ID-holder-computing-device;
- b. when at least one of the individually-hashed-PII-fields is not stored on the ID-holder-computing-device, define at least one missing PII field and determine the verifier-name associated with the at least one missing PII field;
- c. request a verifier-profile for the determined verifier-name associated with the at least one missing PII field from the IDSM, wherein the verifier-profile includes verifier-PII-requirements and PII fields capture instructions, and wherein the verifier-PII-requirements includes a list of verifier-required-PII-fields required to be shared by the ID-holder with the respective verifier;
- d. when the ID-holder consents to share the verifier-required-PII-fields, form a captured-ID according to the PII fields capture instructions;
- e. transmit the captured-ID to the verifier-server for the authenticating, extraction, and cryptographic protection of the verifier-required-PII-fields; and
- f. following the transferring the cryptographically protected PII fields to the ID-holder-computing-device, repeat steps a-f until all required PII fields are authenticated, extracted, and cryptographically protected.

The ID-holder-device-instructions, when executed by the ID-holder-processor, can further cause the ID-holder-computing-device to request the vendor-profile to: (a) acquiring a vendor URI associated with the vendor by the digital-ID-app; and (b) request the vendor-profile associated with the vendor URI from the IDSM.

The ID-holder-device-instructions, when executed by the ID-holder-processor, can further cause the ID-holder-computing-device to: (a) receive a vendor-specific-DIGID-code corresponding to the vendor-specific-DIGID from the IDSM; and (b) create and providing the-digital-ID-pass to the vendor, wherein the digital-ID-pass corresponds to the vendor-specific-DIGID-code, wherein the digital-ID-pass may be provided in the form of a digital-ID-pass URI.

The ID-holder-device-instructions, when executed by the ID-holder-processor, can further cause the ID-holder-computing-device to request the vendor-specific-DIGID following the steps of: (a) extracting the vendor-specific-DIGID-code from the digital-ID-pass; and (b) requesting the corresponding vendor-specific-DIGID from the IDSM by the vendor-computing-device.

The ID-holder-device-instructions, when executed by the ID-holder-processor, further cause the ID-holder-computing-device to generate the vendor-specific-DIGID by further signing a combination of the PII field-nonce value pairs and at least one digital-ID-certificate using a symmetric key, having a first part and a second part, generated by the digital-ID-app.

The symmetric key is wrapped using the public key of the vendor-computing-device wherein the public key corresponds to a private key of the vendor-computing-device.

The first part of the symmetric key is wrapped using the public key of the vendor-computing-device; wherein the public key corresponds to a private key of the vendor-computing-device; wherein the digital-ID-pass is in the form of a digital-ID-pass-URI; wherein the second part of the symmetric key is included in the digital-ID-pass-URI; and wherein the vendor-instructions, when executed by the vendor-processor, can further cause the vendor-computing-device to extract the PII fields following the steps of:
- a. unwrapping the first part of the symmetric key using the private key of the vendor-computing-device;
- b. extracting the second part of the symmetric key from the digital-ID-pass-URI;
- c. combining the first and second parts of the symmetric key to form the symmetric key; and
- d. decrypting the combination of the signed PII field-nonce value pairs and the at least one digital-ID-certificate using the symmetric key.

According to aspects of the present disclosure there is provided an ID-holder-computing-device associated with an ID-holder,
wherein the ID-holder-computing-device is enrolled to a digital ID (DIGID) system manager (IDSM),
wherein the ID-holder-computing-device is configured to interact with a vendor-computing-device,
wherein the ID-holder-computing-device includes an ID-holder-processor and non-transitory computer-readable medium in communication with the ID-holder-processor and including instructions stored thereon, that when executed by the ID-holder-processor, cause the ID-holder-computing-device to:
- a. receive extracted-PII-fields and a digital-ID-certificate from a verifier-server, wherein the extracted-PII-fields and the digital-ID-certificate are generated by a verifier-server performing steps including:
  - i. authenticating a captured ID received from an ID holder, to yield an authenticated-captured-ID;
  - ii. extracting personally identifiable information (PII) fields from the authenticated-captured ID, to yield extracted-PII-fields;
  - iii. cryptographically protecting the extracted-PII-fields, wherein the cryptographically protecting includes the steps of:
    - A. individually hashing each one of the extracted-PII-fields, forming respective individually-hashed-PII-fields; and
    - B. verifiably encapsulating the individually-hashed-PII-fields, along with the ID-holder-public key received from the ID holder, with a signature, forming a digital-ID-certificate; and
- b. securely transferring a digital ID pass to the vendor-computing-device associated with the vendor, whereby the vendor-computing-device can extract the extracted-PII-fields, using the digital ID pass and the IDSM.

According to further aspects of the present disclosure there is provided a verifier-server adapted to create of a non-reputable digital record of an ID document of an ID-holder wherein the verifier-server includes a verifier-processor and non-transitory computer-readable medium in communication with the verifier-processor and including verifier-instructions stored thereon, that when executed by the verifier-processor, cause the verifier-server to:
upon the ID-holder encountering a vendor, a. request, from the IDSM, a vendor-profile for the vendor;
b. receive the vendor-profile including a list of required-PII-fields-names;
c. display the list of required-PII-field-names; and
d. provide a user-interface configured to allow the ID-holder to provide consent to share, with the vendor, a subset of the PII-fields associated with the list of required-PII-field-names, upon the ID-holder consenting to share the required-PII-fields with the vendor,
a. select a subset of the PII-hash-pairs including the subset of PII-fields associated with the list of required-PII-field-names;
b. generate an ID-holder-signature, the ID-holder-signature being a cryptographic signature configured for verification of the subset of the PII-hash-pairs;
c. generate a vendor-DIGID-response, the vendor-DIGID-response including the subset of PII-hash-pairs, the ID-holder-signature, the plurality of individually-hashed-PII-fields, and the verifier-server-signature;
d. generate the vendor-specific-DIGID, the vendor-specific-DIGID including the vendor-DIGID-response; and
e. transmit the vendor-specific-DIGID to the vendor-computing-device.

According to further aspects of the present disclosure there is provided a vendor-computing-device associated with a vendor, wherein the vendor-computing-device is enrolled to a digital ID (DIGID) system manager (IDSM); wherein the vendor-computing-device is configured to interact with a digital-ID-app of an ID-holder; and where the vendor-computing-device includes a vendor-processor and non-transitory computer-readable medium in communication with the vendor-processor and including vendor-instructions thereon, that when executed by the vendor-processor cause the vendor-computing-device to:
a. display a vendor universal resource identifier (URI) associated with the vendor;
b. receive a digital-ID-pass from the ID-holder that agreed to share the subset of personally identifiable information (PII) fields, required to be shared with the vendor, the digital-ID-pass including a vendor-specific-DIGID-code;
c. request a vendor-specific-DIGID from the IDSM, using the vendor-specific-DIGID-code, the vendor-specific-DIGID including a subset of the individually-hashed-PII-fields corresponding to the required PII fields, signed by a symmetric key, having a first part and a second part, generated by the digital-ID-app of the ID-holder;
d. receive the vendor-specific-DIGID from the IDSM;
e. extract the required of PII fields from the individually-hashed-PII-fields to thereby facilitate secure interaction between the vendor and the ID-holder.

The vendor-instructions, when executed by the vendor-processor, can further cause the vendor-computing-device to extract the subset of individually-hashed-PII-fields following the steps of:
a. unwrapping the first part of the symmetric key by using the private key of the vendor-computing-device;
b. extracting the second part of the symmetric key by from the digital-ID-pass-URI;
c. combining the first and second parts of the symmetric key to form the symmetric key; and
d. decrypting the combination of the signed PII field-nonce value pairs and the at least one digital-ID-certificate using the symmetric key.

The disclosed DIGID records, systems and methods may be utilized in a variety of applications. In one such application, the vendor sells alcoholic beverages and the ID-holder is required to authenticate his age to the vendor.

In another application, the ID-holder is a credit card-holder, the vendor is a merchant and the IDSM is an acquiring bank.

In yet another application, the ID-holder bank account holder making a payment, the vendor is a merchant, wherein the account holder wishes to execute the payment transfer to the receiving bank of the merchant, and wherein the account holder generates a vendor-specific-DIGID addressed to the merchant, who can verify that the balance in the account of the account holder is available.

In yet another application, the ID-holder uses a digital wallet, the vendor is a merchant, and the verifier-server is a wallet-verifier-server.

In yet another application, the ID-holder is a healthcare related patient having confidential medical records that are stored in an addressable memory location on the ID-holder-computing-device of the patient, and wherein the patient can securely share, at their will, any of the confidential medical records with a third party.

In yet another application, the ID-holder is a healthcare related patient a first vendor is a doctor, who issues a tamper-proof prescription to the ID-holder-computing-device of the patient; and a second vendor is a pharmacy chosen by the patient, wherein the practice is certified by the healthcare ecosystem.

In yet another application, the ID-holder is a healthcare related patient having a subset of critical medical records stored in an addressable memory location on the ID-holder-computing-device of the patient, wherein the subset of critical medical records is securely archived by a vendor; wherein the patient agrees to supply the vendor with a subset of their medical information for use only in emergencies; and upon an emergency, the subset of critical medical records is provided to a first responder of the vendor via the vendor-specific-DIGID. Optionally, the subset of critical medical records includes blood type and food allergies.

In yet another application, the ID-holder is a ticket holder to an event, and the vendor is the owner of the facility hosting the event.

In yet another application, the ID-document is a passport, the vendor-specific-DIGID is a non-reputable digital record of the passport, wherein the passport control and customs authorities are a first vendor verified by a first verifier server. In this application, the method may further include: (a) generating a second-vendor-specific-DIGID that is a non-reputable digital record of the passport; and (b) providing second-vendor-specific-DIGID to an airline booking system that is a second-vendor verified by a second verifier-server having a verifier-profile different than that of the passport control and customs authorities.

In yet another application, the vendor is a social media company, the ID-holder is a prospective user of the social media and the vendor-specific-DIGID is configured to link the ID-holder-computing-device to their social media account.

BRIEF DESCRIPTION OF THE DRAWINGS

The present disclosure is herein described, by way of non-limiting example, with reference to the accompanying drawings. With specific reference now to the drawings in detail, it is stressed that the particulars shown are by way of example and for purposes of illustrative discussion of the embodiments of the present disclosure only, and are presented in order to provide what is believed to be the most useful and readily understood description of the principles and conceptual aspects of the present disclosure. In this regard, no attempt is made to show structural details of the present disclosure in more detail than is necessary for a fundamental understanding of the present disclosure, the description taken with the drawings making apparent to those skilled in the art how the several forms of the present disclosure may be embodied in practice. In the figures:

FIG. 3A1 is a flow diagram of a vendor enrollment process of a vendor-device to a digital-ID-management system, according to aspects of the present disclosure.

FIG. 3A2 is a flow diagram of a vendor-computing-device certification process for each of the vendor's devices to the authentication services provided by digital-ID-management system, according to aspects of the present disclosure.

FIG. 3B1 is a flow diagram of a vendor enrollment process of a vendor-computing-device to a digital-ID-management system using a device specific URI, according to aspects of the present disclosure.

FIG. 3B2 is a flow diagram of a vendor-computing-device enrollment process of a vendor-computing-device to a digital-ID-management system using a device specific URI, according to aspects of the present disclosure.

FIGS. 4C and 4D show sequence diagrams of a mutual identity verification process between an ID holder and a vendor, using a digital-ID-management system, according to aspects of the present disclosure.

FIG. 6A depicts an example ID, being a driver's license, according to aspects of the present disclosure.

FIG. 6B depicts an example showing a facial analysis, according to aspects of the present disclosure.

FIG. 6C depicts an example of a device screen showing an uploaded captured ID of an ID holder, according to aspects of the present disclosure.

FIG. 6D depicts an example of a device screen showing PII fields extracted from a captured ID of an ID holder, according to aspects of the present disclosure.

FIGS. 8A-8C are flow diagram of a process adapted for an application in which a verified patient requests a prescription from a doctor and receives the prescription from a pharmacy, according to aspects of the present disclosure.

DETAILED DESCRIPTION

Figure 1A:
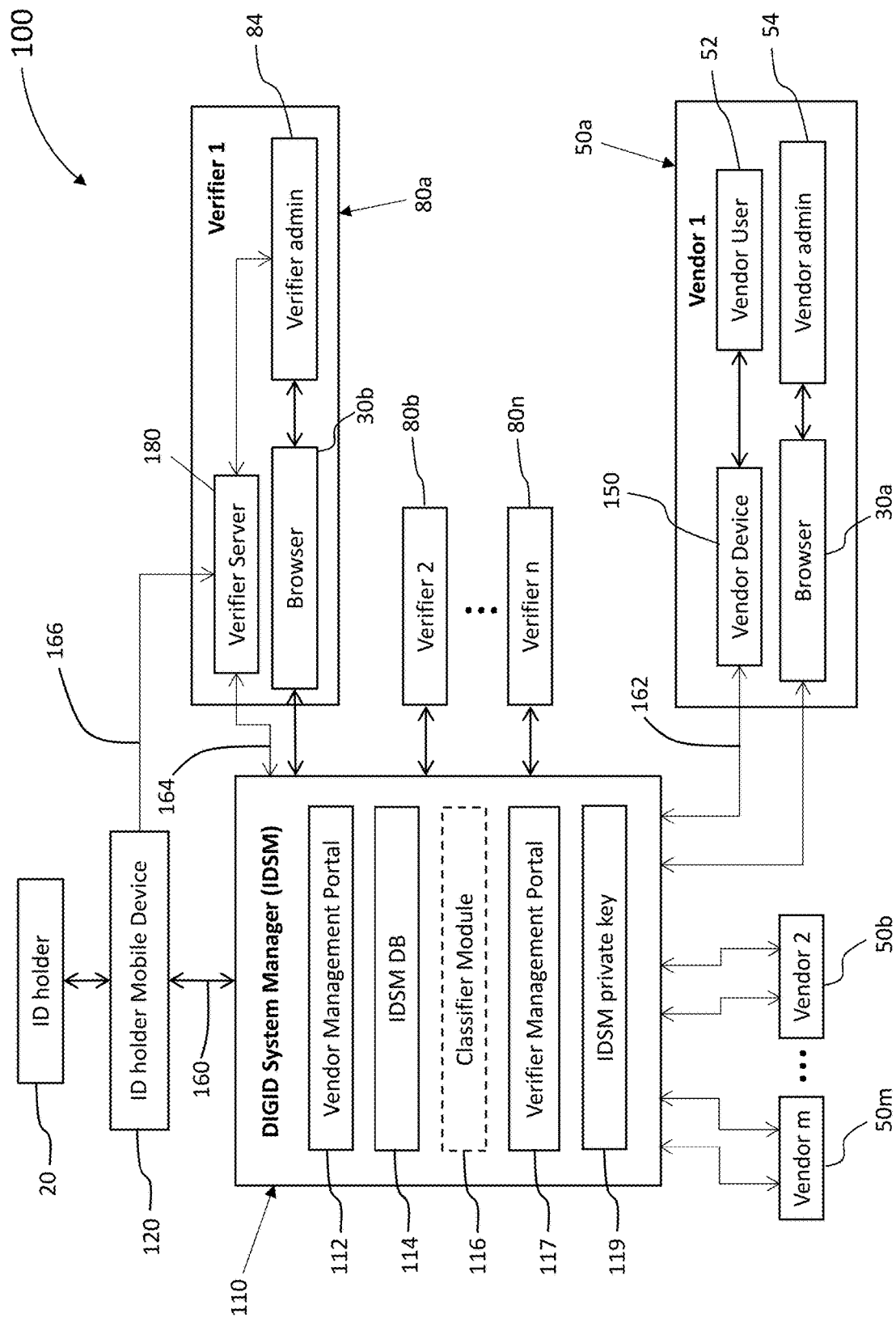
FIG. 1A is a system block diagram of an example digital-ID-management system, according to aspects of the present disclosure.

Hereto forth the following acronyms will be used herein:
CD-ROM Compact Disc ROM
CMS Cryptographic Message Syntax
DB database
DIGID digital ID
DVD digital versatile disks
EEPROM Electronically erasable programmable ROM
ID Identification (e.g. government issued identification card)
IDSM DIGID system manager
PII personally identifiable information
QR code Quick Response Code (two-dimensional barcode)
RAM Random Access Memory
ROM Read-only memory
TLS transport layer security
URI Universal Resource Identifier The present disclosure will now be described more fully hereinafter with reference to the accompanying drawings, in which preferred embodiments of the present disclosure 10 are shown. This disclosure may, however, be embodied in many different forms and should not be construed as limited to the embodiments set forth herein; rather, these embodiments are provided, so that this disclosure will be thorough and complete, and will fully convey the scope of the present disclosure to those of ordinary skill in the art.

An embodiment is an example or implementation of the present disclosures. The various appearances of "one embodiment," "an embodiment" or "some embodiments" do not necessarily all refer to the same embodiment. Although various aspects of the present disclosure may be described in the context of a single embodiment, the aspects may also be provided separately or in any suitable combination. Conversely, although the disclosure may be described herein in the context of separate embodiments for clarity, the present disclosure may also be implemented in a single embodiment.

Reference in the specification to "one embodiment", "an embodiment", "some embodiments" or "other embodiments" means that a particular feature, structure, characteristic, or other aspects described in connection with the embodiments is included in at least one embodiment, but not necessarily all embodiments, of the present disclosure. It is understood that the phraseology and terminology employed herein are not to be construed as limiting and are for descriptive purpose only.

Various modifications to the implementations described in this disclosure may be readily apparent to those of ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, a person having ordinary skill in the art will readily recognize that such operations need not be performed in the particular order shown or in sequential order, or that all illustrated operations be performed, to achieve desirable results. Furthermore, the drawings may schematically depict one or more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The description of embodiments is not intended to be exhaustive or to be limiting to any precise form disclosed herein. While specific embodiments and examples are described for illustrative purposes, various equivalent modifications are possible within the scope of the inventions described herein, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings provided herein can be applied to other systems, not only the systems described herein. The elements and acts of the various embodiments described above can be combined to provide further embodiments.

The present disclosure, in at least some embodiments, is a system and method that enables user management of a digital ID provided to a vendor in a secure digital-ID-management system. Reference is now made to FIGS. 1A-1D. As shown in FIG. 1A, digital-ID-management system 100 can include one or more ID holders 20 each having a respective ID holder device 120, one or more verifiers 80a, 80b, 80n, one or more vendors 50a, 50b, 50m, and a digital ID management system (IDSM) 110. Electronic components of the ecosystem can be realized via hardware and/or software modules.

Figure 1B:
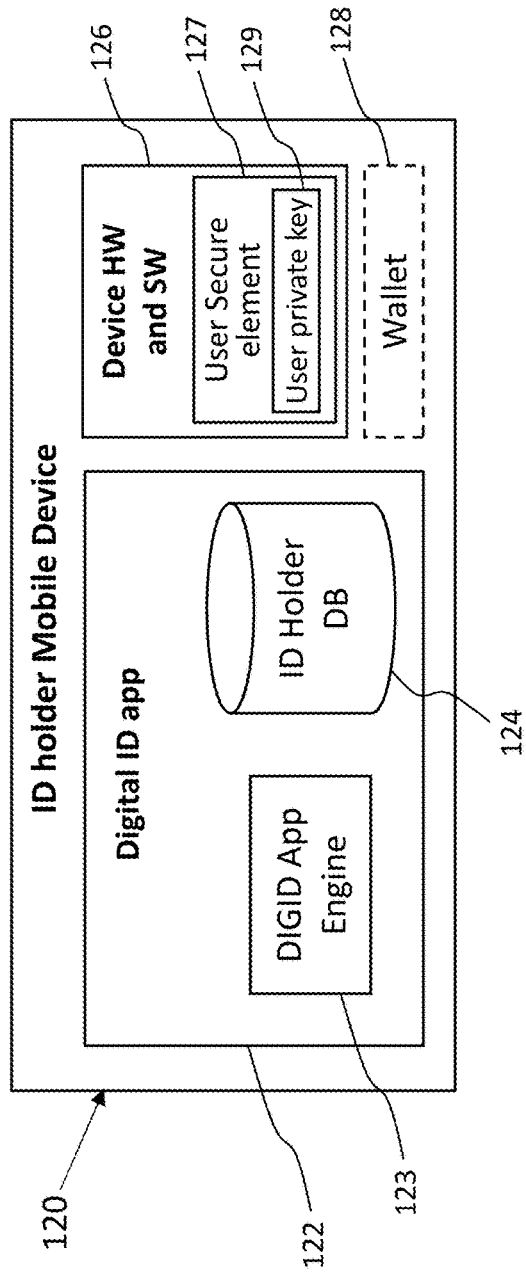
FIG. 1B is a block diagram of an example ID-holder-computing-device, according to aspects of the present disclosure.

Referring collectively to FIGS. 1A and 1B, an ID holder 20 interacts with digital-ID-management system 100 via a digital ID app 122 (as shown in FIG. 1B). Digital ID app 122 can be a software application that typically, without limitations, runs on an ID-holder-computing-device 120 that is associated with ID holder 20. ID-holder-computing-device 120 is a computing device as defined above. Although one ID holder 20 is shown for simplicity it should be appreciated that several ID holders, each using an ID-holder-computing-device 120 running digital ID app 122, may interact with digital-ID-management system 100.

The ID-holder-computing-device 120 can include a DIGID app 122 hardware and software modules 126 accessible by the DIGID app 122, and a wallet 128. The DIGID app 122 can further include a DIGID app engine 123 and an ID holder database (DB) 124.

The DIGID app engine 123 is a software module that directs the operation of DIGID app 122. The DIGID app engine 123 makes use of hardware and software modules 126 provided by ID-holder-computing-device 120, such as location determination, NFC (Near-Field Communication) and other communication means, input devices, camera, GPS, user interface, and so forth as provided by computing devices such as smartphones, tablets, smartwatches, and the like.

Modules 126, accessible by the DIGID app 122, can include a user secure element 127 for programming of secret keys as known in the art, including private key 129. The user secure element 127 can include an integrated circuit, software or external hardware and a combination thereof. Access to the secure element 127 can require the ID holder 20 to authenticate to ID-holder-computing-device 120 using at least one authentication method such as, but not limited to, password entry, passcode entry, fingerprint recognition, or facial recognition, as commonly known in the art. The use of an authentication method links the ID holder 20 who can provide such an authentication with the private key 129 stored in an addressable memory location in secure element 127.

The ID holder database (DB) 124 is configured to store encrypted information related to ID holder 20 using app 122 and other cryptographic related information as needed by DIGID app engine 123.

The wallet application 128 that is optionally used by digital ID app 122.

Digital ID app 122 interacts with an ID System Manager (IDSM) 110, one or more verifier servers 180 and one or more vendor devices 150. Communication between digital ID app 122 and IDSM 110 uses a combination of secured wired and wireless 160 communication protocols.

Figure 1C:
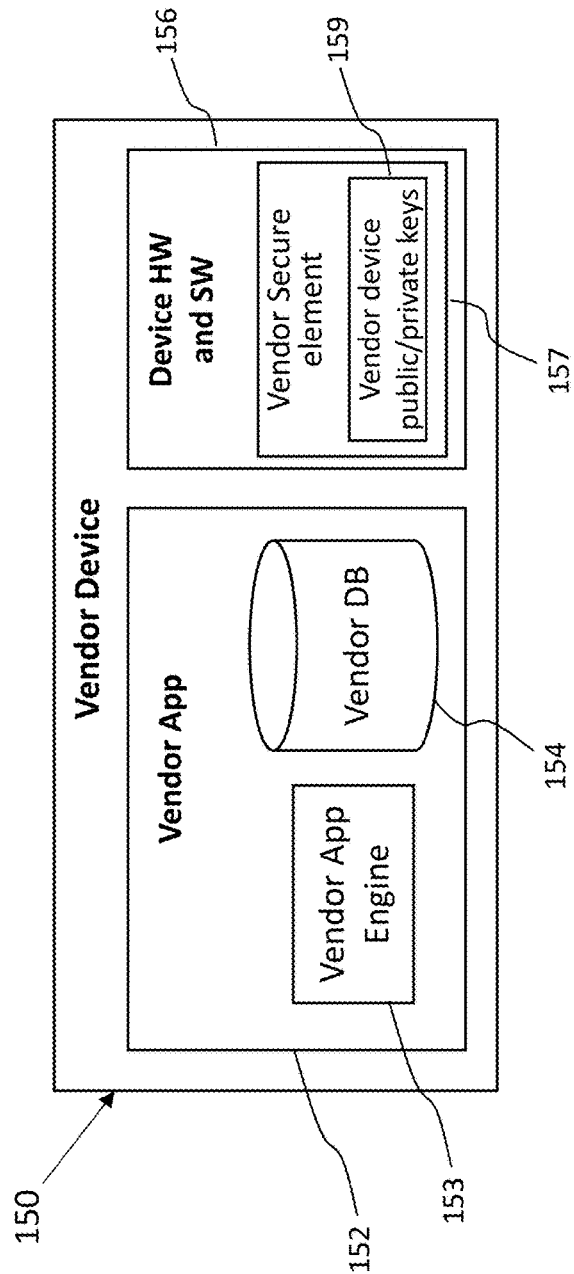
FIG. 1C is a block diagram of an example vendor-computing-device, according to aspects of the present disclosure.

Referring collectively to FIG. 1A and FIG. 1C, vendors 50a, 50b, 50m are each is a vendor as defined above. For simplicity, details of a single vendor 50a is illustrated, and it is to be understood that additional vendors 50b, 50m can have similar functionality. The vendor 50a employs or otherwise uses the services of a vendor user 52 and a vendor administrator 54 (also referred to herein as "vendor admin" 54). Optionally, vendor user 52 and vendor admin 54 are the same user. The vendor user 52 interacts with IDSM 110 via a vendor device 15. The vendor admin 54 interacts with the IDSM 110 via a browser 30a, using a vendor app 152.

The vendor app 152 is a software application that runs on a vendor device 150 and can operate in a browser, such as a progressive web app, or may operate locally via a downloaded app or software downloaded to the device. Vendor device 150 is a computing device as defined above. Vendor device 150 may be any stationary device or any of a mobile device such as, but not limited to, a smartphone or tablet, or alternatively may be an autonomous ID verification device as will be described below. The vendor 50a may utilize several vendor apps 152 each running on a separate vendor device 150. Where vendor 50a utilizes multiple vendor devices 150 these may be mobile devices, an autonomous ID verification device, web servers, mobile applications residing on a mobile device, or a combination of these.

The vendor app 152 includes a vendor app engine 153 and a vendor database (DB) 154. The vendor app engine 153 is a software module that directs the operation of vendor app 152 according to the use of digital-ID-management system 100 as described below. Vendor app engine 153 makes use of hardware and software 156 provided by vendor device 150, such as location determination, input devices, camera, NFC and other communication means, user interface, interface to venue entry systems and so forth. Vendor device 150 includes a vendor secure element 157 for programming of secret keys including private key 159. The vendor secure element 157 can include an integrated circuit, software external hardware and a combination thereof.

The vendor database (DB) 154: stores encrypted information related to vendor 50 and vendor user 52 using vendor app 152 and other information as needed by vendor app engine 153.

The vendor app 152 interacts with the IDSM 110 that controls the operation of digital-ID-management system 100. Additionally, vendor admin 54 connects directly to IDSM 110 such as to a web interface of IDSM 110 using a web browser 30a. Communication between vendor app 152, browser 30a and IDSM 110 uses a combination of secure wired and/or wireless 162 communication protocols.

Figure 1D:
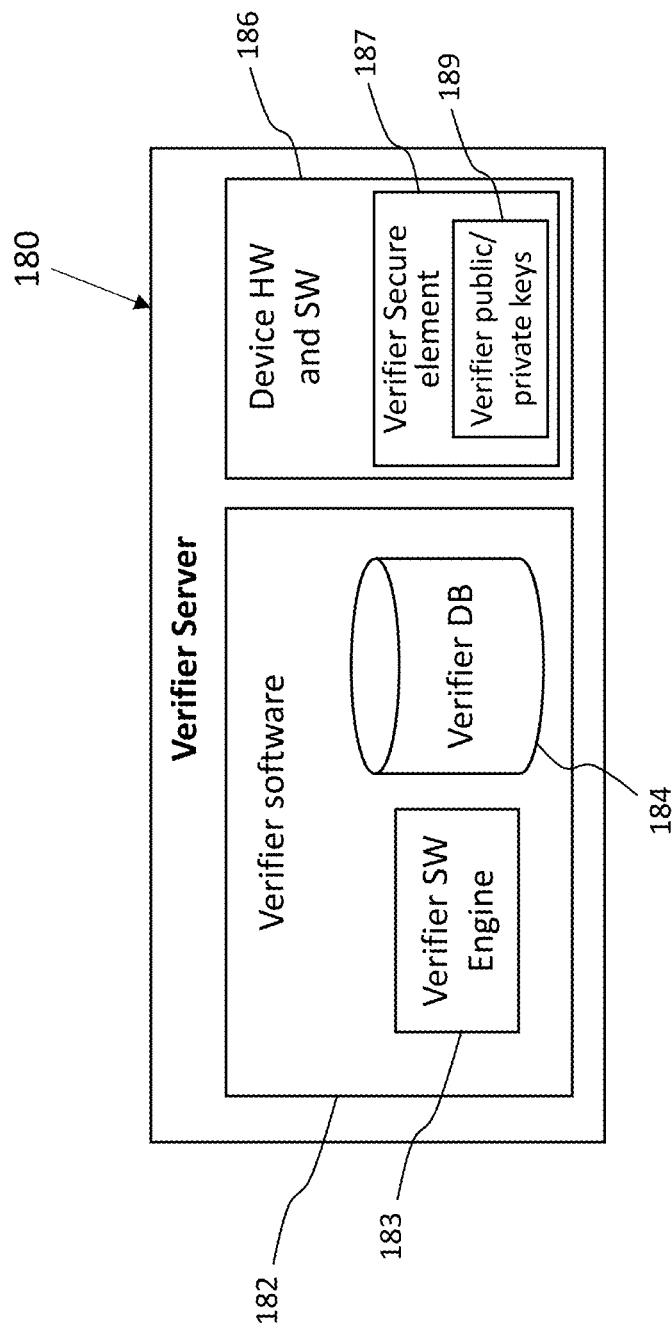
FIG. 1D is a block diagram of an example verifier-server, according to aspects of the present disclosure.

Referring collectively to FIGS. 1A and 1D, verifiers 80a, 80b, 80n are each a verifier as defined above. Multiple verifiers preferably form part of the operation of digital-ID-management system 100. For simplicity, details of a single verifier 80a is illustrated, and it is to be understood that additional verifiers 80b, 80n can have similar functionality. The verifier 80a employs or otherwise uses the services of a verifier administrator 84 (also referred to herein as "verifier admin" 84). The verifier admin 84 interacts with digital-ID-management system 100 via verifier software 182. The verifier software 182 is a software application that runs on a verifier server 180. The verifier server 180 is a computing device as defined above. Three verifiers, 80a, 80b, 80n are shown for simplicity but it should be appreciated that several of verifiers 80, each using their own verifier server 180 running verifier software 182, may interact with IDSM 110. Optionally, each verifier 80a, 80b, 80n may utilize several of verifier servers 180.

Verifier software 182 includes a verifier software (SW) engine 183 and a verifier database (DB) 184. The verifier software (SW) engine 183 is a software module that directs the operation of verifier software 182 according to the operative interaction with digital-ID-management system 100 as described below. The verifier server 180 includes-communication means, a user interface and other features as found in servers as known in the art. The verifier server 180 includes a verifier secure element 187 for programming of secret keys as known in the art, including private key 189. The verifier secure element 187 can include an integrated circuit, software, external hardware and/or a combination thereof.

The verifier database (DB) 184 is configured to store encrypted information related to verifier 80a and verifier admin 84 using verifier software 182 and other information as needed by verifier SW engine 183.

The verifier SW 182 interacts with the IDSM 110 that controls the operation of digital-ID-management system 100. Additionally, verifier admin 84 connects directly to IDSM 110 such as to a web interface of IDSM 110 using a web browser 30b. Communication between verifier SW 182, browser 30b and IDSM 110 uses a combination of secure wired and/or wireless 164 communication protocols. Verifier administrator 84 may connect directly to IDSM 110 using a secure channel and/or a web-browser based channel.

It should be noted that in some embodiments of the present disclosure, a verifier such as the above-described verifier 80a is embodied as part of IDSM 110, in which case one or more external verifiers 80b, 80n may or may not be operatively engaged with digital-ID-management system 100.

The IDSM 110 includes software modules running on a server or a server cluster or other computing device as defined herein. As shown in FIG. 1A, IDSM 110 includes a vendor management portal 112, an IDSM database (IDSM DB) 114, a verifier management portal 117, and an integrated circuit, software or external hardware or a combination thereof, for programming of secret keys as known in the art, including private key 119.

The vendor management portal 112 manages the interaction of each authorized vendor 50 with digital-ID-management system 100 including configuring vendor IDs, defining venues and app keys, and authorizing vendor devices. Vendor management portal 112 includes a web server for providing access to vendor management portal 112 using browser 30a. The IDSM database (IDSM DB) 114 stores encrypted information and other information related to IDSM 110 and digital-ID-management system 100. The verifier management portal 117 manages the interaction of each authorized verifier 80 with digital-ID-management system 100 including providing and receiving verification related services regarding ID related information. Verifier management portal 117 includes a web server for providing access to verifier management portal 117 using browser 30b.

The above parts of digital-ID-management system 100 will be better understood in the usage scenarios as presented below.

Figure 2A:
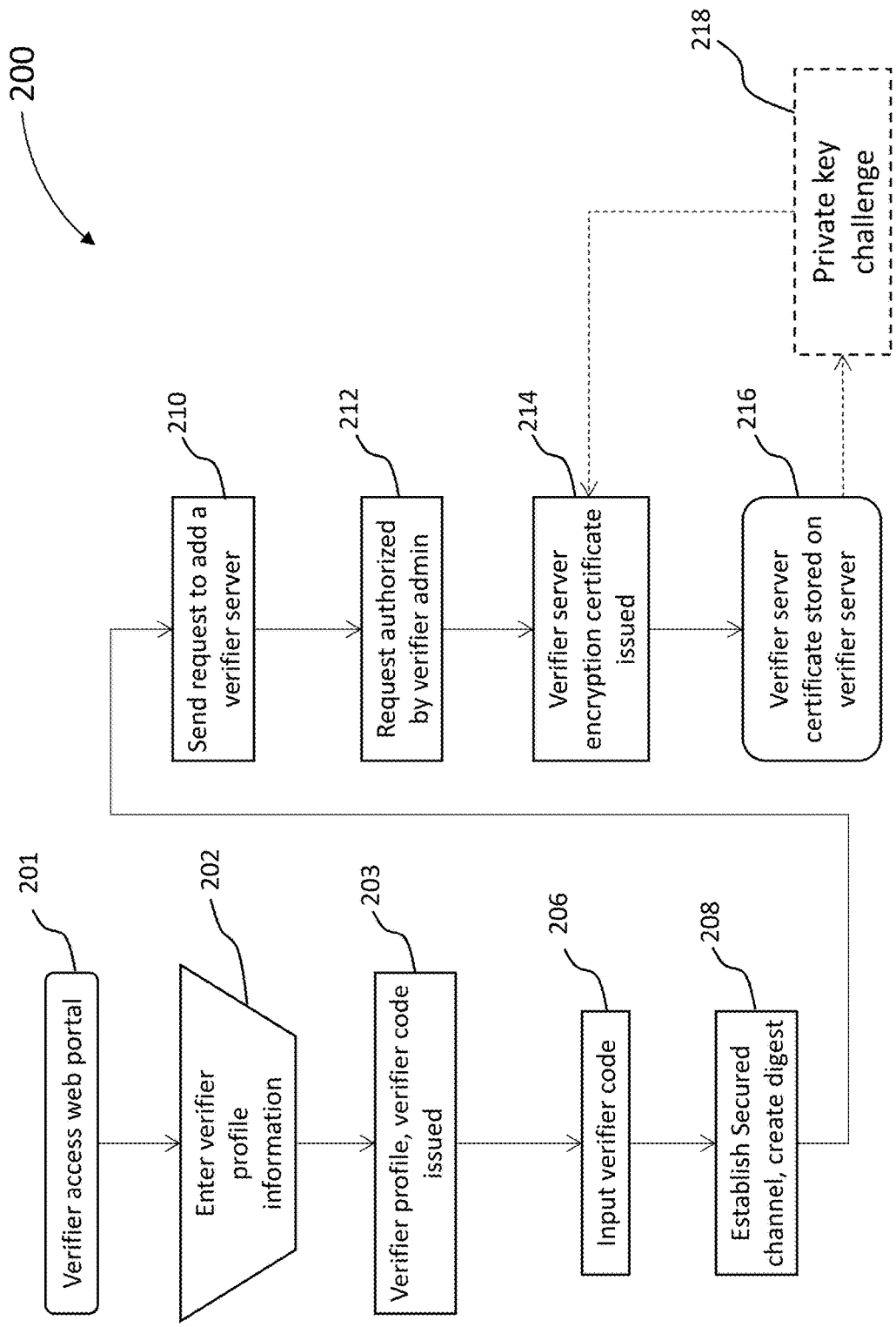
FIG. 2A is a flow diagram of a verifier enrollment process of a verifier to a digital-ID-management system, according to aspects of the present disclosure.
Figure 2B:
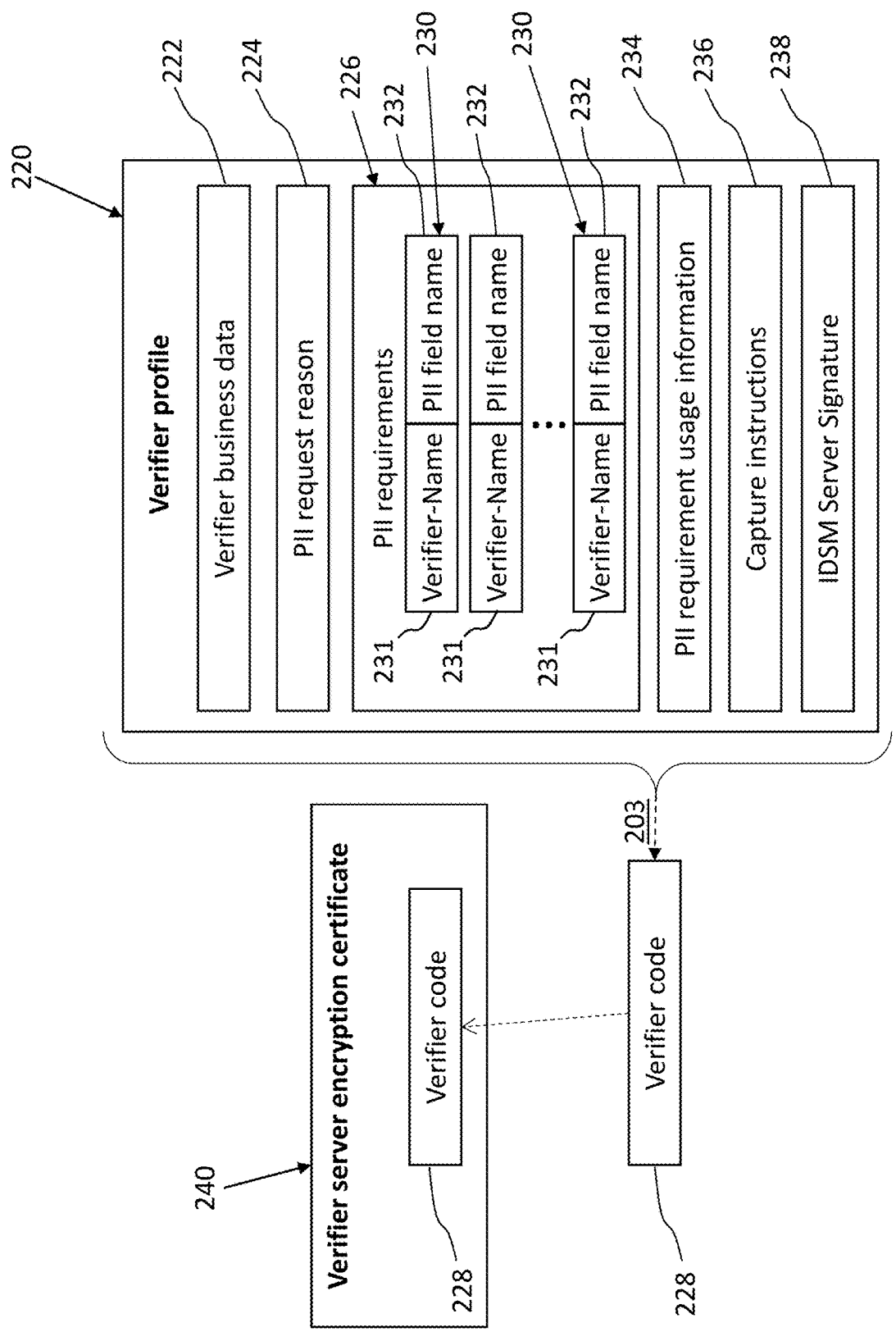
FIG. 2B illustrates an example block diagram of a verifier-profile, according to aspects of the present disclosure.

Reference is now made to FIGS. 2A-2B. FIG. 2A is a flow diagram of a verifier enrollment process 200 of a verifier 80a to digital-ID-management system 100.

As shown in FIG. 2A, in step 201 the verifier admin 84 accesses the web-based verifier management portal 117 of IDSM 110. In step 202, the verifier admin 84 a verifier profile 220 such as illustrated in FIG. 2B including business data 222, a PII request reason 224, the verifier-PII-requirements 226, verifier-PII-requirement-usage-information 234, capture instructions 236, and unique verifier-name 231. Collectively, the information entered during step 202 is known as the verifier-profile 220. Verifier-profile 220 is illustrated in the schematic block diagram of FIG. 2B. Preferably, verifier-profile 220 is digitally signed 238 by IDSM 110.

The verifier admin 84 enters verifier business data 222 related to verifier business such as: verifier business name, verifier address, business type, contact phone, manager name/s and so forth.

The verifier 80a provides a PII request reason 224 indicating why verifier 80a would require an ID from an ID holder 20 as well as the verifier-PII-requirements 226 including PII field names 232 that are required.

Verifier-PII-requirement-usage-information 234 is entered including but not limited to who will use the PII fields provided, why the PII fields will be used (typically, for verification), legal justification for their usage, indication of length of time the PII fields will be retained, indication of other parties that may receive the PII fields, indication about where the PII fields will physically reside, and contact information to lodge complaints.

The verifier 80a provides capture instructions 236 that will be provided to an ID holder 20 for verifying PII fields including the ID documents and/or info-field-containing documents and/or liveness tests that need to be provided/scanned by the ID holder and the PII field names that may be provided, for example, from a previous interaction.

Referring again to FIG. 2A, in step 203, a verifier code 228 is issued by the IDSM 110. The verifier code 228 is optionally a cryptographic digest of the verifier-profile 220.

A verifier server 180 (see FIGS. 1A and 1D) is enrolled after first installing and then running verifier software 182 that generates a public/private key pair 189 and a self-signed certificate that are stored in an addressable memory location in verifier secure element 187 of verifier server 182. In step 206, the verifier code 228 issued in step 203 and the address of IDSM 110 are input into verifier SW 182.

In step 208, a mutually authenticated Transport Layer Security (TLS) secured communication channel 164 (see FIG. 1A) is set up by exchange of the verifier server 180 self-signed certificate and IDSM 110 TLS certificate using the corresponding private keys (119, 189). Optionally, any suitable secured communication protocol may be used. IDSM 110 then creates a verifier server digest which is a cryptographic digest of the verifier server public key 189 from the verifier server 180 self-signed certificate. The verifier server 180 is known to the IDSM 110 by this verifier server digest that is stored in an addressable memory location in IDSM DB 114 of IDSM 110 (see FIG. 1A).

In step 210, IDSM 110 uses the verifier server digest to store an enrollment request in IDSM DB 114 of IDSM 110 for enrollment of verifier server 180 as a verifier server of verifier 80. The enrollment request is preferably authorized in step 212 by verifier admin 84 via verifier management portal 117 for example, by manual selection by verifier admin 84. Following the authorization in step 212, verifier server 180, running verifier SW 182, is then associated with verifier 80 by IDSM 110.

In step 214, IDSM 110 issues a verifier server encryption certificate 240, certifying that the verifier server 180 public key is associated with verifier 80. Verifier server certificate 240 includes verifier code 228 (see FIG. 2B).

In step 216, IDSM 110 transmits verifier server encryption certificate 240 to verifier server 180, where verifier server encryption certificate 240 is stored in an addressable memory location by verifier SW 182. Although the enrollment of one verifier 80 and one verifier server 180 is described above, it should be appreciated that multiple verifiers 80a, 80b, 80n can be enrolled, and each verifier 80a, 80b, 80n may have one or more verifier servers 180 enrolled.

Optionally, the verifier server encryption certificate 240 may be of a limited validity period, so that verifier SW 182, preferably periodically, performs the private key challenge of step 218 ('check in') to prove that verifier 80a retains access to verifier server secure element 187. The limited validity period may be 24 hours, 48 hours, 7 days or may be dynamically set based on one or more parameters, by way of non-limiting examples. IDSM 110 removes expired verifier server encryption certificates 240 that have exceeded the defined validity period.

In step 214 that follows private key challenge 218, a new verifier server encryption certificate 240 is issued with an extended validity period. This cycle is repeated as necessary to ensure that any verifier server 180 in active use has an up-to-date verifier server encryption certificate 240. The private key challenge includes setting up of a secure channel as in step 208.

Figure 3C:
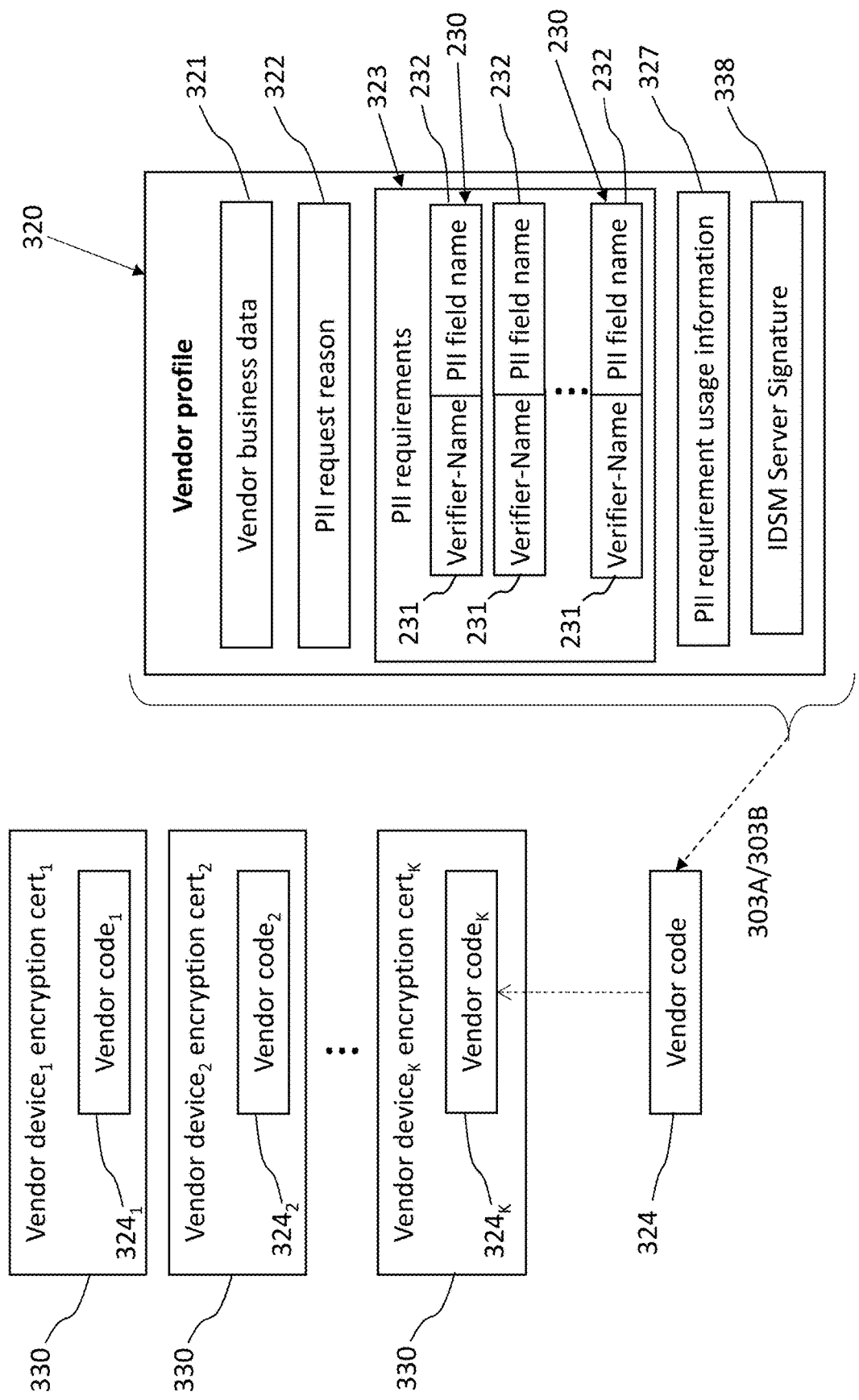
FIG. 3C illustrates an example block diagram of a vendor-profile, according to aspects of the present disclosure.
Figure 3D:
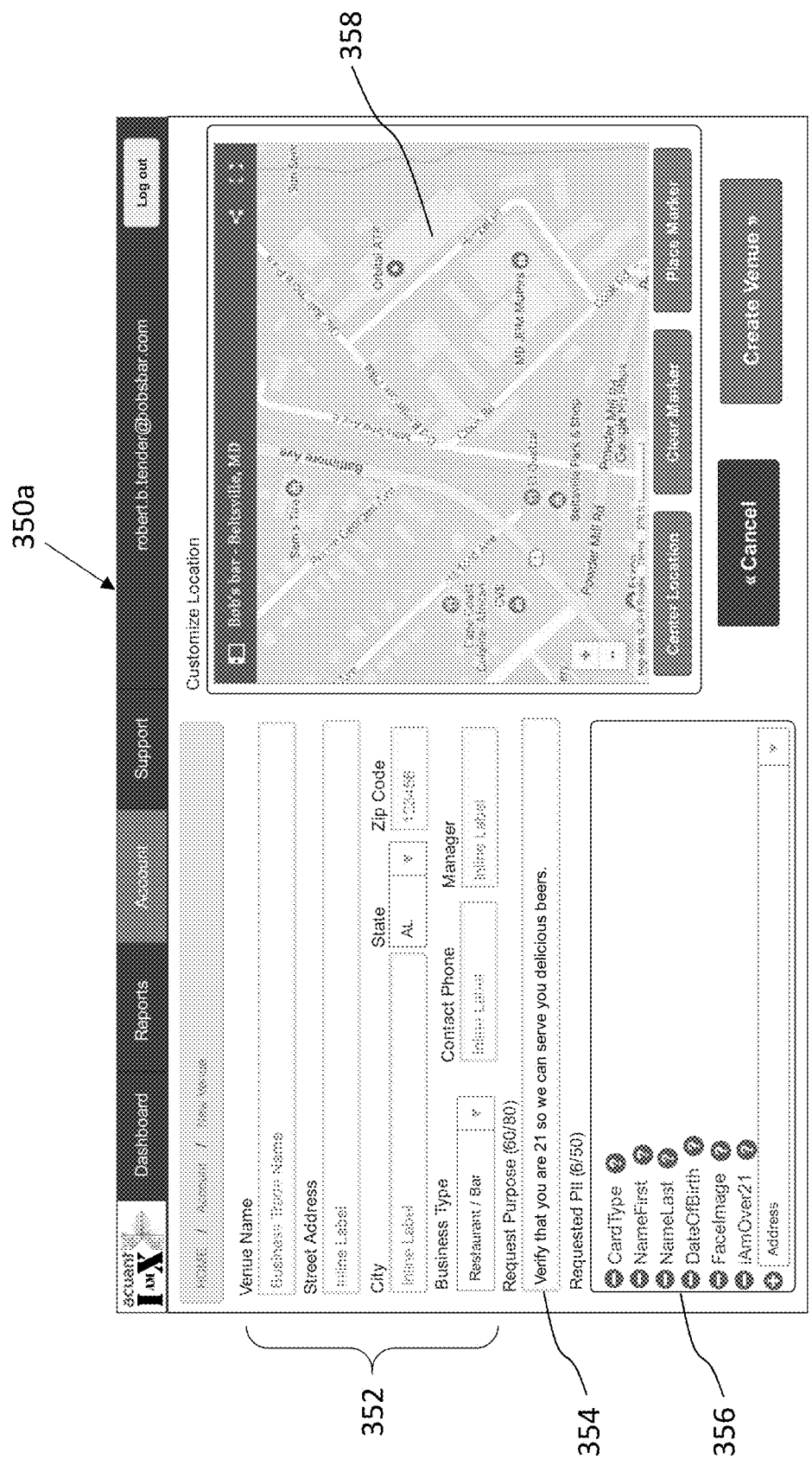
FIG. 3D illustrates an example screenshot of vendor management portal according to aspects of the present disclosure.
Figure 3E:
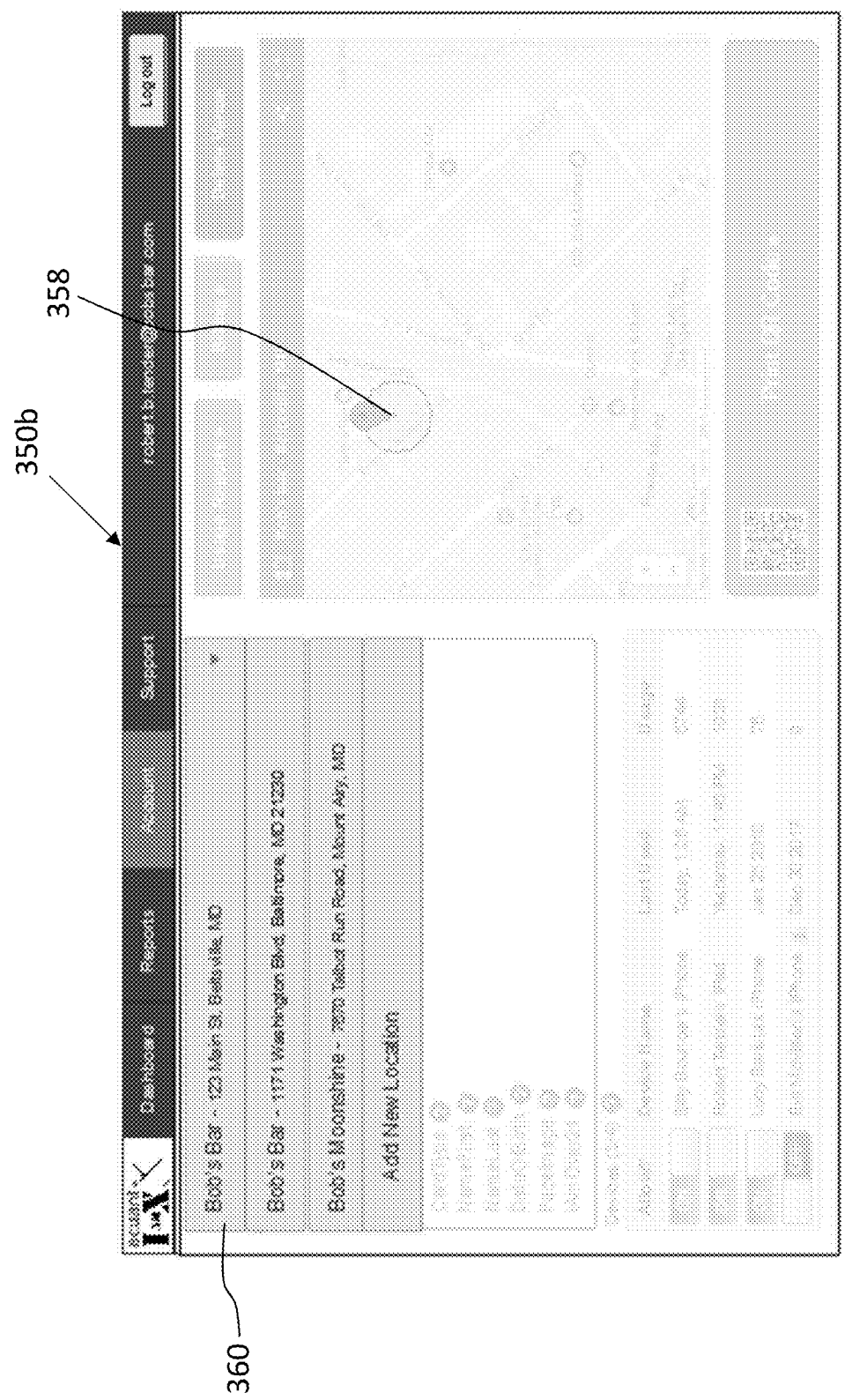
FIG. 3E illustrates an example screenshot for selecting or adding of different venues, where a dropdown menu of defined venues is shown, according to aspects of the present disclosure.
Figure 3G:
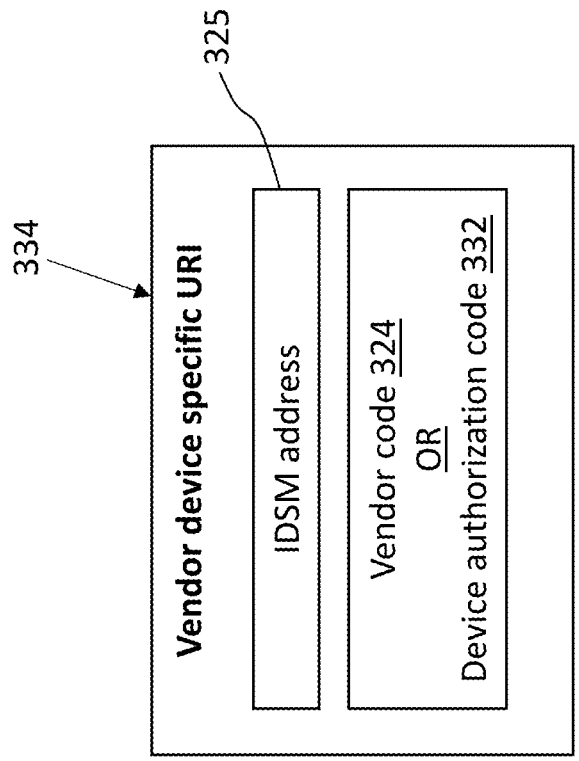
FIG. 3G is a block diagram of a vendor-device-specific URI, according to aspects of the present disclosure.
Figure 3F:
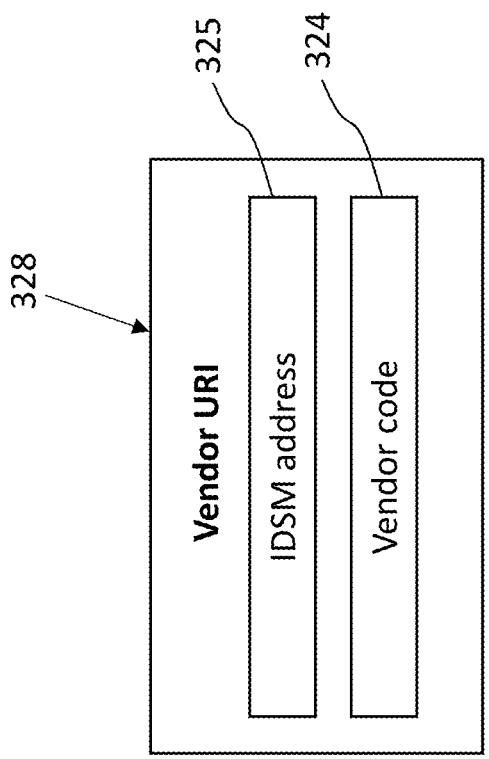
FIG. 3F is a block diagram of a vendor URI, according to aspects of the present disclosure.

Reference is now made to FIGS. 3A1-3E. FIG. 3A1 is a flow diagram of a vendor enrollment process 300 of a vendor 50 and FIG. 3A2 is a flow diagram of the device enrollment process 340 for each of the vendor's devices 150 to the authentication services provided by digital-ID-management system 100. FIG. 3B1 is a flow diagram of a vendor enrollment process 300b of a vendor 50a using a device specific URI and FIG. 3B2 is a flow diagram of the device enrollment process 340b for each of the vendor's devices 150 using a device specific URI to the authentication services provided by digital-ID-management system 100. As shown in FIGS. 3A1, 3A2, 3B1 and 3B2, in step 301 vendor admin 54 accesses web-based vendor management portal 112 on IDSM 110. An illustrative screenshot 350a of vendor management portal 112 is shown in FIG. 3D. The vendor admin 54 enters vendor business data 321 related to vendor business in form 352 such as: vendor name, vendor address, business type, contact phone, manager name/s and so forth.

In addition, vendor 50 provides an ID reason 322 in entry box 354 indicating why they would require ID from an ID holder 20. In box 356 vendor provides vendor-PII-requirement-usage-information 327 and the vendor-PII-requirements 323. Vendor-PII-requirement-usage-information 327 includes but is not limited to who will use the PII fields provided, why the PII fields will be used, legal justification for their usage, indication of length of time the PII fields will be retained, indication of other parties that may receive the PII fields, indication about where the PII fields will physically reside, and contact information to lodge inquiries and complaints.

The vendor-PII-requirements 323 are provided as a list of required PII field names 232 each associated with the verifier-name 231 of the verifier 80a providing verification for that PII field name 232. Multiple entries in list 232 may specify multiple verifier-names 231 in cases where the required PII fields are provided by different verifiers 80a, 80b, 80n. A non-limiting example of such a list entry would take the form: "verifier-name/required PII field name".

Vendor admin 54 can preferably enter multiple venue addresses, and venue names in cases where vendor 50a is situated at multiple venues. Addresses can be entered and/or displayed using a map 358. Selection or adding of different venues is illustrated, by way of example in FIG. 3E where a dropdown menu 360 of defined venues is shown in illustrative screenshot 350b. Venue information is added to the vendor business data 321. Collectively, the information entered during step 302 is known as the vendor profile 320. Vendor profile 320 is illustrated in the block diagram of FIG. 3C. Preferably, the vendor profile 320 is digitally signed 338 by IDSM 110.

Figure 3H:
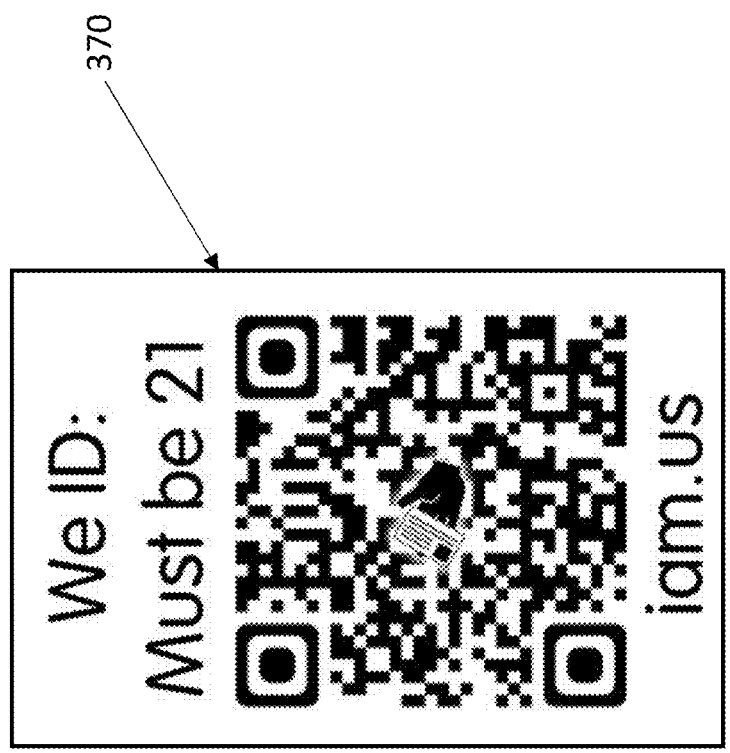
FIG. 3H depicts an example vendor QR code, according to aspects of the present disclosure.

In step 303A (FIG. 3A1) a vendor code 324 is issued by IDSM 110 that uniquely identifies the vendor 50a within digital-ID-management system 100. Vendor code 324 is preferably a cryptographic digest of one or more elements of the vendor profile 320. The vendor code 324, and other data elements described below, are combined to form a URI (Universal Resource Identifier) referred to as the vendor URI 328 (FIG. 3F), which may be represented in text or graphical form, preferably as a vendor QR code 370, but may also be any other transferable representation of vendor URI 328. A non-limiting example of a vendor QR code 370 for a vendor 50a is shown in FIG. 3H.

Optionally, in step 303B (see FIG. 3B1) a unique vendor-device-specific URI 334 (FIG. 3G) is generated by IDSM 110 for enrollment of each specific vendor device 150 where the vendor-device-specific URI 334 contains an additional device authorization code 332 which is used as described further below. Vendor profile 320, vendor code 324 and vendor URI 328 are also issued in step 303B as in step 303A.

In steps 308A-312 and 308B-312 as illustrated in FIGS. 3A2 and 3B2, vendor admin 54 enrolls devices such as vendor device 150 for use by vendor user 52 as will be described below. Although only one vendor device 150 and vendor user 52 are shown, it should be appreciated that several vendor devices and vendor users may be assigned by vendor admin 54, in which case steps 308A-312 or 308B-312 are performed for each vendor device 150.

After a one-time step of installing (step 304) vendor app 152, a vendor device 150 is enrolled by first activating (step 305) vendor app 152 which generates a public/private key 159 pair and a self-signed certificate that are stored in an addressable memory location in vendor secure element 157 of vendor device 150, and then inputting (step 306A) the vendor URI 328 issued in step 303A or inputting (step 306B) the device-specific vendor URI 328 issued in step 303B. The URI 328 can be entered by using a camera (not shown) of vendor device HW and SW 156 to capture a graphical representation of vendor URI 328 such as a vendor QR code 370. Optionally, the vendor URI 328 is obtained from IDSM 110 via a secured communication channel. The vendor URI 328 contains the vendor code 324 for vendor 50a and the IDSM address 325 (see FIGS. 3F and 3G) for communicating requests to the IDSM 110. It should be noted that steps 304 and 305 may take place before or after steps 301-303A or steps 301-303B.

In step 307, a mutually authenticated secured communication channel 162 is set up by exchange of the vendor device 150 self-signed certificate and IDSM 110 certificate using the corresponding private keys (159, 119). Geolocation of vendor device 150 is preferably transferred from vendor device 150 to server 110 through an HTTP header during establishment of the secure channel IDSM 110 then creates a vendor device digest which is a cryptographic digest of the vendor device public key from the vendor device self-signed certificate. The vendor device 150 is known to IDSM 110 by this vendor device digest that is stored in an addressable memory location in IDSM DB 114. The same digest identifies the self-signed respective certificate and all vendor device encryption certificates 330 (see FIG. 3C) issued to device 150, because the vendor devices private key 159 (and thus public key) does not change.

As illustrated in FIG. 3A2, in step 308A, IDSM 110 uses the vendor device digest to store an enrollment request in IDSM DB 114 for enrollment of a vendor device 150 as a device of vendor 50a. The enrollment request is preferably authorized in step 309A by vendor admin 54 via vendor management portal 112, for example, by manual selection by vendor admin 54.

Alternatively, as illustrated in FIG. 3B2, in step 308B, a request to add vendor device 150, using a vendor-device-specific URI 334, is sent to IDSM 110 having vendor device 150 entered vendor-device-specific URI 334 (step 306B), vendor device 150 is automatically authorized in step 309B based on the device authorization code 332 (contained in vendor-device-specific URI 334), and the public key of the requesting vendor device 150 is associated with the authorization code 332.

Following the authorization in either of steps 309A or 309B, vendor device 150 running vendor app 152 is then associated with vendor 50a by IDSM 110. Optionally, vendor device 150 is associated with a specific venue of vendor 50a based on the geolocation shared in step 307.

In step 310, IDSM 110 issues a vendor device encryption certificate 330 (see FIG. 3C), certifying that the respective vendor device 150 public key is associated with vendor 50a. A vendor device encryption certificate 330 includes vendor code 324 and optionally, the geolocation of vendor device 150. Preferably, the geolocation is verified within bounds specified in vendor profile 320 prior to certificate issuance.

In step 311, IDSM 110 transmits vendor device encryption certificate 330 to device 150, where vendor device encryption certificate 330 is stored in an addressable memory location by vendor app 152 in vendor DB 154. Although the enrollment of one vendor device 150 is described above, it should be appreciated that multiple vendor devices 150 can be enrolled and associated with vendor 50a.

Optionally, the vendor device encryption certificate 330 may be of a limited validity period, so that the vendor app 152 preferably periodically performs the private key challenge of step 312 ('check in') to prove that vendor device user 52 retains access to vendor device secure element 157, and optionally to prove that vendor device 150 is physically located within specified geolocation bounds by including the location of vendor device 150 (provided by location services of vendor device 150 or by an external service) in the challenge response. The limited validity period may be 24 hours, by way of non-limiting example.

IDSM 110 prunes (removes) expired vendor device encryption certificates 330 from IDSM database 114 that have exceeded the defined validity period, such that a digital ID app 122 will not receive certificates of devices (as described in step 404 below) that have not checked in recently, and regardless, digital ID app 122 will not use an expired vendor encryption certificate for encryption such as described in step 460 below.

In step 310 that follows private key challenge 312, a new vendor device encryption certificate 330 is issued with an extended validity period. This cycle is repeated as necessary to ensure that any vendor device 150 in active use has an up-to-date vendor device encryption certificate 330. The private key challenge includes setting up of a secure channel as in step 307.

Figure 4A:
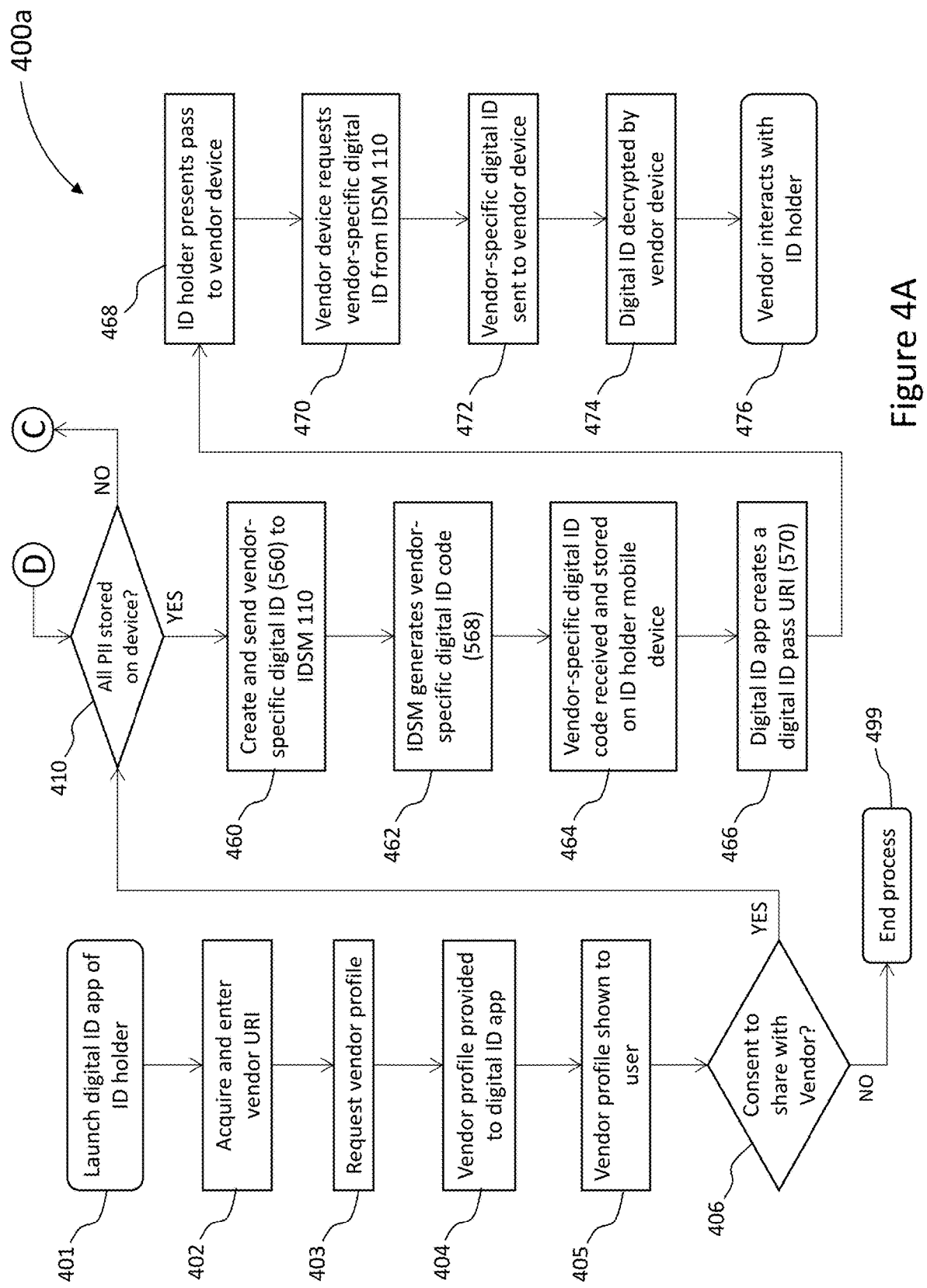
FIGS. 4A and 4B combine to illustrate a flow diagram of a mutual identity verification process between an ID holder and a vendor, using digital-ID-management system, according to aspects of the present disclosure.
Figure 4B:
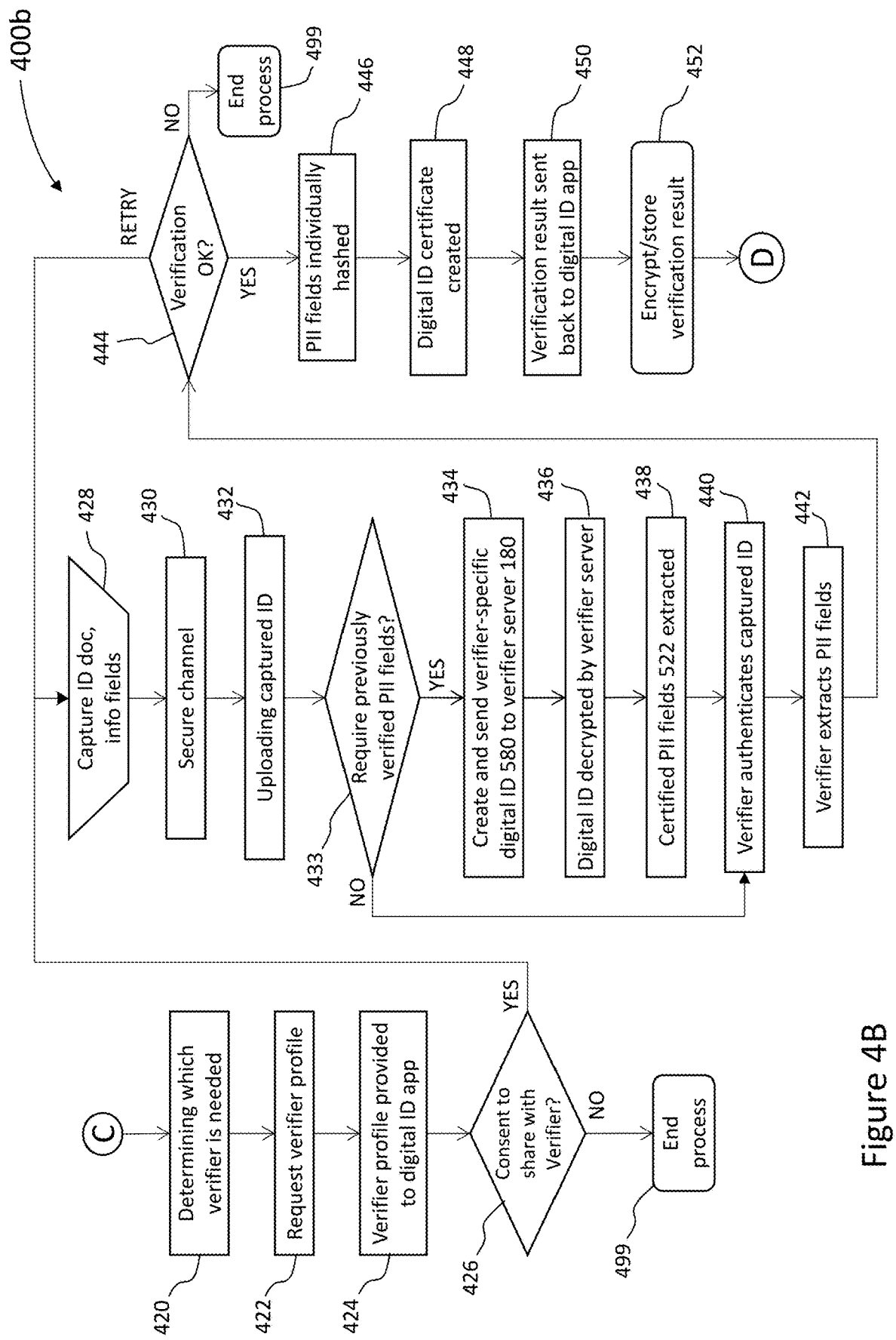
Figure 4C:
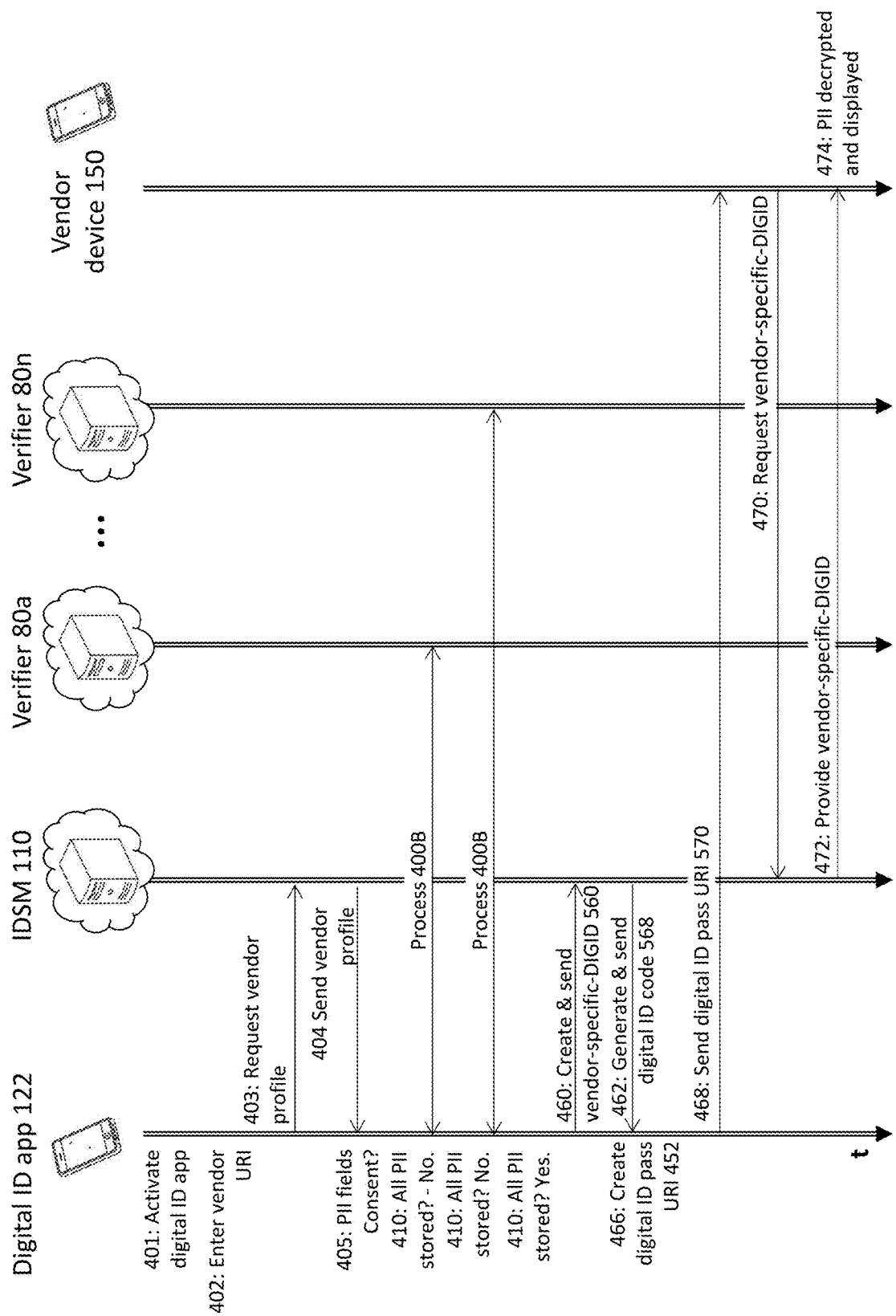

Reference is now made to FIGS. 4A-6H. FIGS. 4A and 4B together are a flow diagram of the mutual identity verification process 400a, 400b between an ID holder 20 and a vendor 50a using digital-ID-management system 100. FIGS. 4C and 4D are a sequence diagram of the mutual identity verification process 400a, 400b between an ID holder 20 and a vendor 50a using digital-ID-management system 100. The digital ID sharing process 400a, 400b is illustrated for one ID holder 20 sharing with one vendor 50a however it should be appreciated that several of ID holders 20 may interact with a single vendor 50a and also that system 100 can support several of vendors 50a, 50b, 50n for interaction with ID holders 20.

As shown in FIG. 4A, in step 401, when an ID holder 20 intends to interact with vendor 50a requiring sharing of the digital ID of ID holder 20, ID holder 20 launches digital ID app 122 on ID-holder-computing-device 120 and in step 402 acquires and enters the vendor URI 328 (such as issued in step 303A or step 303B as described above with reference to FIGS. 3A1 and 3A2). Vendor URI 328 is preferably displayed by the vendor 50a such as at venues of the vendor 50a or alternatively is made available in advance by the vendor 50a for ID holders 20 wishing to interact with vendor 50a (by way of non-limiting example, in an email message). The vendor URI 328 is acquired for example by using a camera (not shown) of ID-holder-computing-device 120, wherein the acquired and entered vendor URI 328 contains the vendor code 324 for vendor 50a. In step 403, digital ID app 122 creates a secure connection to IDSM 110 and sends an anonymous request to IDSM 110 requesting the vendor profile 320 of vendor 50a, as identified by vendor code 324.

In step 404, in response to the request of step 403, IDSM 110 looks up the requested vendor code 324 and provides the vendor profile 320 to digital ID app 122 as well as the respectively associated vendor device certificate 330. Optionally, the vendor profile digital signature 338 may be verified to ensure the integrity of the data contained within. Optionally, vendor device certificates 330 may be filtered (removed or added) by a radius around a geolocation provided by digital ID app 122 corresponding to the current geolocation of ID holder 20.

Figure 6F:
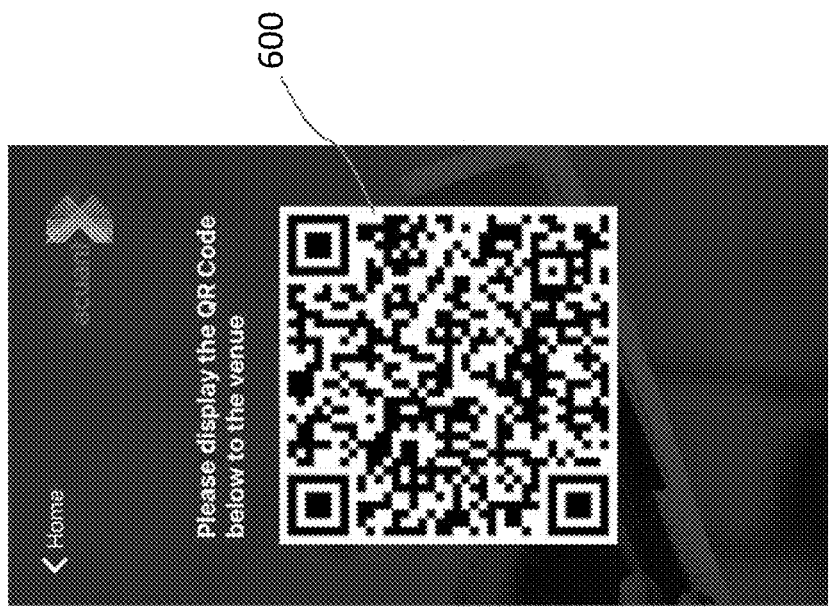
FIG. 6F depicts an example screenshot of the ID-holder-computing-device that displays a QR code to be presented by the ID holder to the vendor, according to aspects of the present disclosure.
Figure 6E:
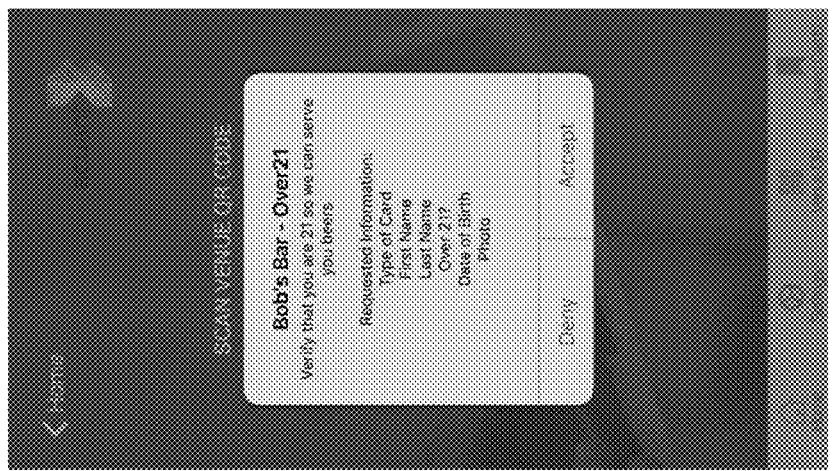
FIG. 6E depicts an example screenshot of a device screen showing choices given to an ID holder to share his/her digital ID including a set of the PII fields requested by a vendor, according to aspects of the present disclosure.

In step 405, digital ID app 122 presents the vendor profile 320 received in step 404 to ID holder 20 via the digital ID app 122 on the ID-holder-computing-device 120 and ID holder 20 is given the choice in step 406 to share his/her digital ID. To aid the user in making the selection the PII field names 326 requested by vendor 50a, can be displayed on the ID-holder-computing-device 120 via the digital ID app 122, as illustrated in the screenshot of FIG. 6E. Optionally, digital ID app 122 displays a map indicating the location of vendor 50a, or of a particular venue of vendor 50a. If the ID holder 20 does not consent, then in step 499 process 400a terminates.

If the ID holder 20 consents to share the requested vendor-PII-requirements 323 with vendor 50a, according to terms of the vendor profile 320, then in step 410 Digital ID app 122 analyzes PII requirements 323 from vendor profile 320 and whether any of the vendor-PII-requirements 323 are already stored in an addressable memory location on ID-holder-computing-device 120—such as where these were previously enrolled. If in step 410 it is determined that all PII requirements are stored in an addressable memory location on ID-holder-computing-device 120, process 400a proceeds to step 460.

It should be noted that upon the ID holder 20 consenting to share the requested PII requirements 323 with vendor 50, the requested PII requirements 323 become a mutually agreed subset of PII fields.

For vendor-PII-requirements 323 that are determined in step 410 to not be stored on ID-holder-computing-device 120, Digital ID app 122 determines, in step 420 (see FIG. 4B), which at least one verifier 80a, 80b, 80n is required for obtaining a part or all these missing vendor-PII-requirements 323 based on the verifier names 231.

In step 422 Digital ID app 122 requests verifier-profile 220 corresponding to verifier-name 231 of vendor-PII-requirements 323 from the IDSM. In step 424 the IDSM 110 looks up the verifier-name 231 and retrieves the associated verifier-profile 220 and sends the verifier-profile 220 to the Digital ID app 122. Optionally, the verifier-profile digital signature 238 may be verified to ensure the integrity of the data contained within.

In step 426, digital ID app 122 presents the verifier-profile 220 received in step 424 to ID holder 20 and ID holder 20 is given the choice to share verifier-PII-requirements 226. If ID holder does not consent, then the process 400b ends with step 499. If ID holder 20 consents, then in step 428 ID holder is presented with capture instructions 236 from verifier-profile 220 to create a captured ID. The captured ID includes one or more of, but is not limited to, the following:

A scan of an ID document (see FIG. 6A) captured such as by using a camera/s (not shown) of or connected to ID-holder-computing-device 120. As above, ID documents include passports, driver's licenses, identity documents and other documents or cards that identify ID holder 20;

Digital elements of the ID document such as, but not limited to, ICAO MRTD LDS data from an ISO/IEC 14443 contactless chip, or EMV AFL data via ISO/IEC 7816 contact chip and so forth that are captured such as by the NFC reader/s or contact card accessories (not shown) of or connected to ID-holder-computing-device 120;

Verifier-specific-PII-fields 516 that were included in the vendor URI 328 entered in step 402;

Geolocation of ID holder 20;

PII fields that are entered into digital ID app 122 by ID holder 20;

A liveness test of the ID holder 20, for example a facial analysis as shown in FIG. 6B, including analysis of real-time captured image/video and/or audio (for example ID holder 20 blinking, or speaking their name), resulting in capture-time minutia, for example but not limited to a "selfie" photograph, or voice-print; and One or more signed-subset of verifier-PII-field-arrays 516 containing previously verified PII fields 510 from other verifier servers encapsulated within a signed vendor digital ID response 562, this being preferably encapsulated within vendor-specific digital ID 560, the verifier acting as a vendor in this instance to affect the transference of verifier-PII-field-arrays 516 (see FIGS. 5A through 5D).

To secure the transmission of the captured ID from digital ID app 122 to verifier server 180, a secure channel 166 is set up in step 430 using mutual authentication. The channel is preferably established using TLS and the private keys (129 and 189) and associated public keys, however the encrypted channel may optionally be established by any other method that uses asymmetric cryptography for mutual authentication (e.g. SSH). Alternatively, the verifier server 180 generates a connection specific key as described further below. TLS refers to the Transport Layer Security standard as proposed by the Internet Engineering Task Force (IETF). In step 432 the captured ID is uploaded to verifier server 180. FIG. 6C shows an example of a screen shown to ID holder upon 20 uploading of the captured ID.

In step 433, it is determined whether previously verified PII fields 510 from at least one other verifier 80b, 80n are to be transferred to verifier 80. If YES, method 400b follows steps 434-438 to transfer the previously verified PII fields 510 from the other verifier(s) 80b, 80n to the verifier 80a. If NO, no previously verified PII fields 510 are required, then steps 434-438 are skipped.

In step 434, digital ID app 122 generates and anonymously sends to verifier server 180 a respective verifier-specific digital ID 580 of each of the other verifiers 80b, 80n associated with previously verified PII fields 510. The digital ID app 122 can generate the verifier-specific digital ID 580 of the other verifiers 80b, 80n by virtue of having received respective verifier server certificates 240 from the other verifiers 80b, 80n through a process such as the process 400a, 400b illustrated in FIGS. 4A and 4B, more specifically at step 424, the verifier server certificates 240 being associated with the previously verified PII fields 510.

Figure 5A:
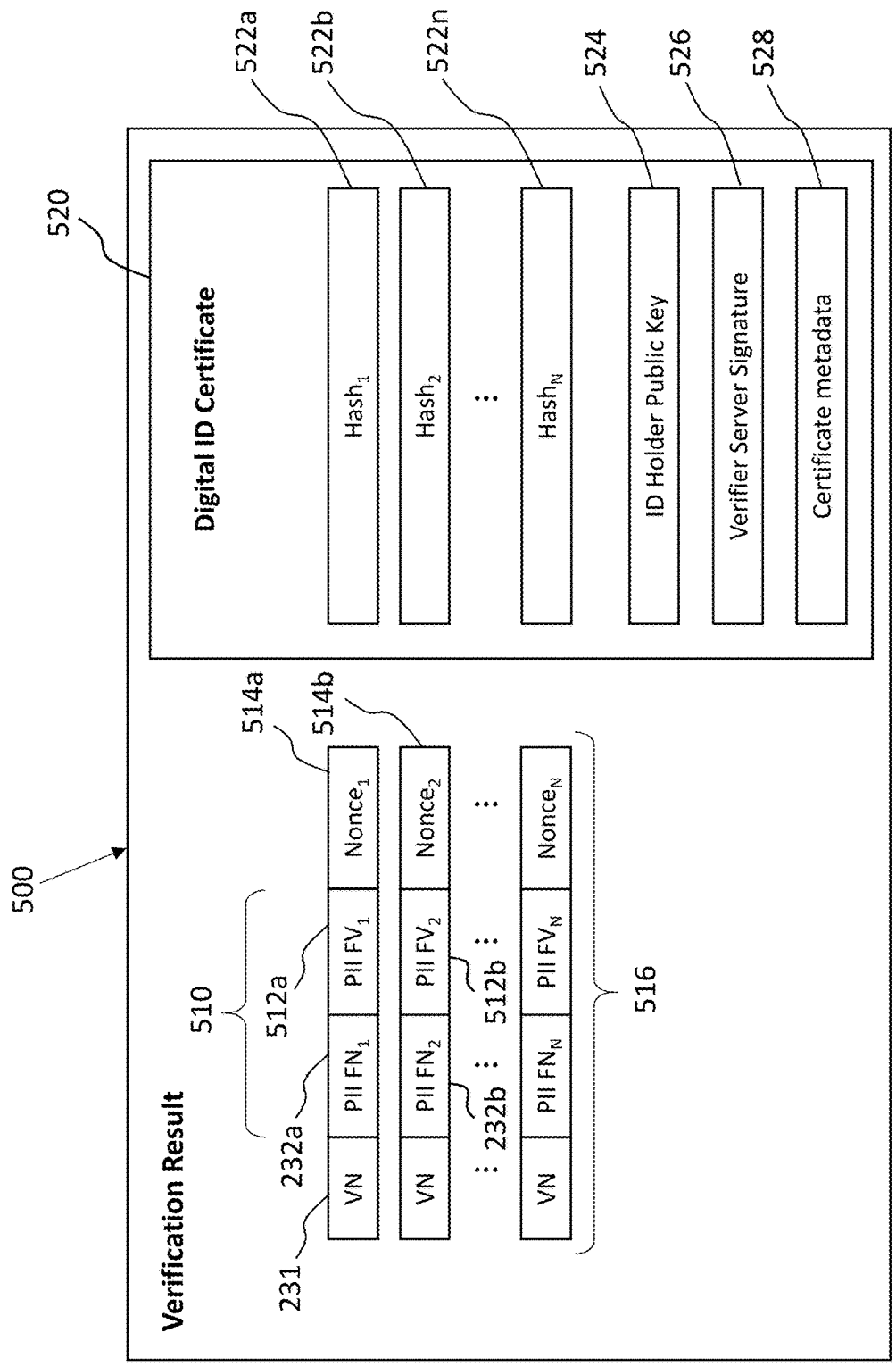
FIG. 5A illustrates an example block diagram of a verification result, according to aspects of the present disclosure.
Figure 5B:
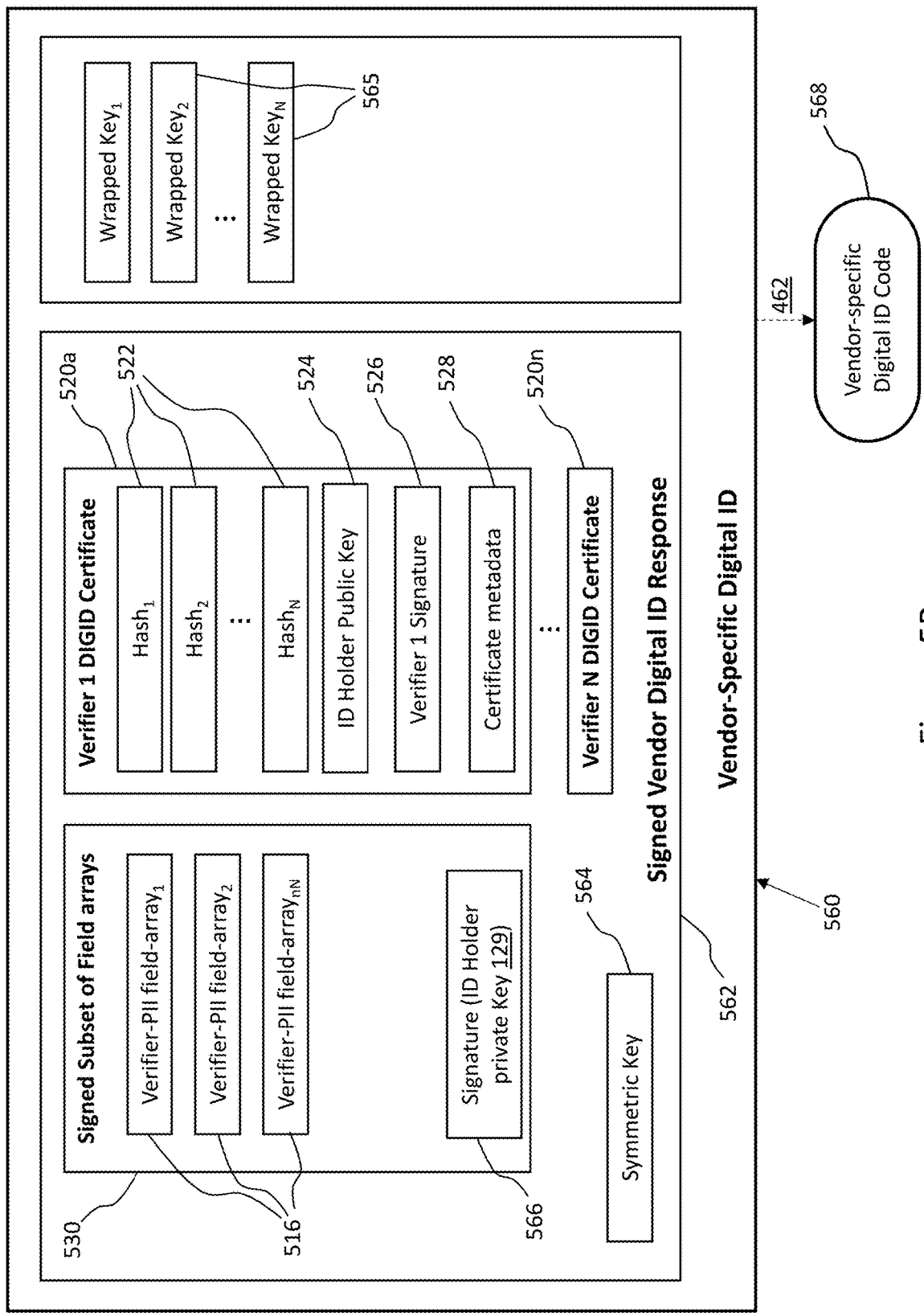
FIG. 5B is a block diagram of a vendor-specific digital ID, according to aspects of the present disclosure.
Figure 5C:
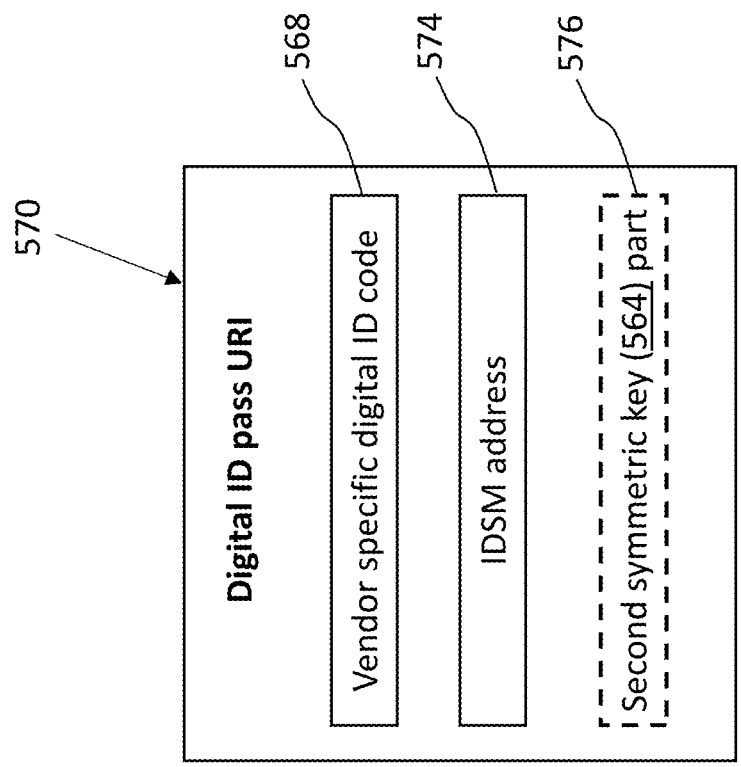
FIG. 5C is a block diagram of a digital ID pass URI, according to aspects of the present disclosure.
Figure 5D:
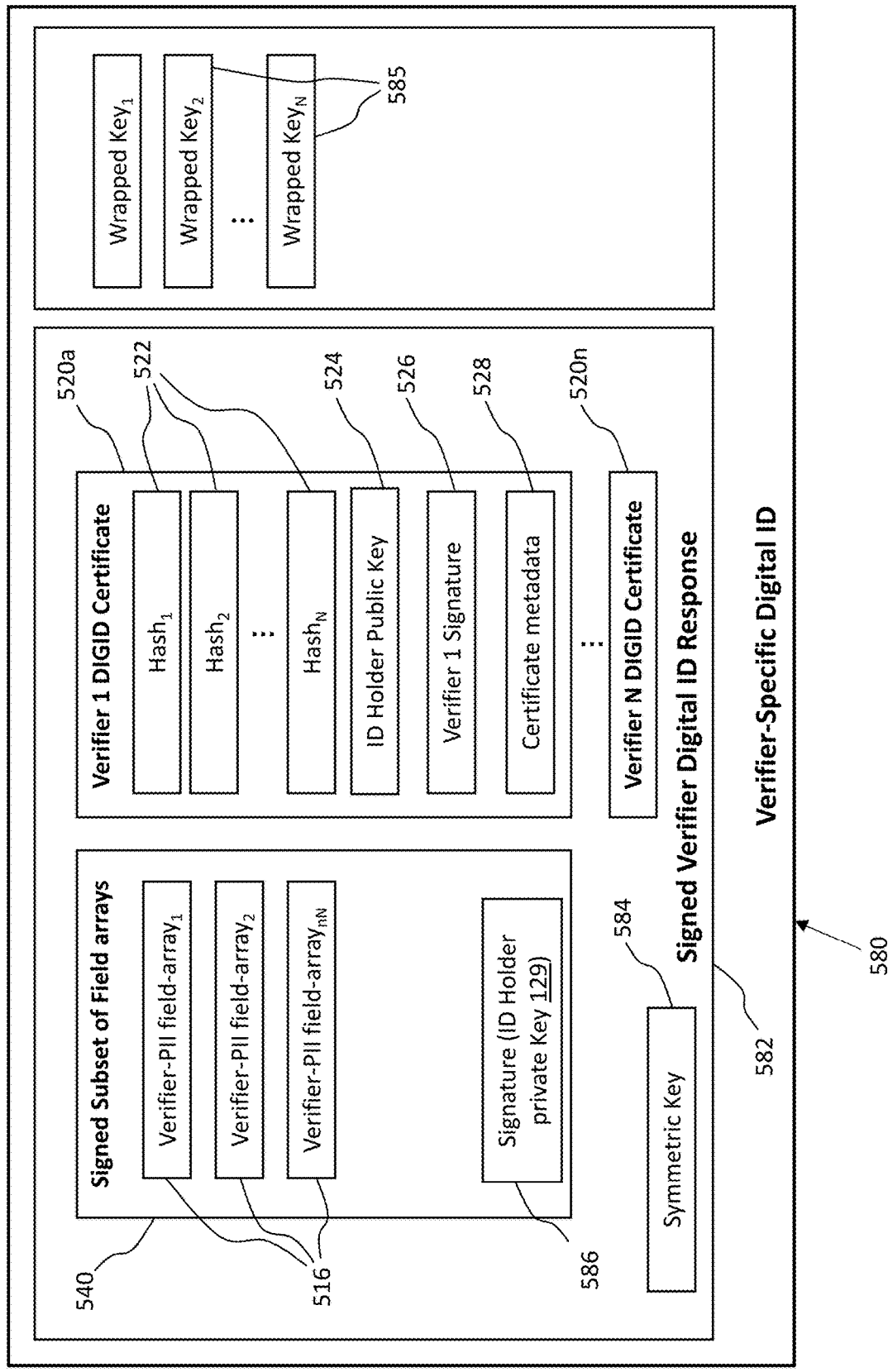
FIG. 5D is a block diagram of a verifier-specific digital ID, according to aspects of the present disclosure.

Referring to FIG. 5D, the verifier-specific digital ID 580 includes an encrypted and signed digital ID response 582, and one or more wrapped keys 585. The signed digital ID response 582 is encrypted with a random digital ID symmetric key 584 generated by digital ID app 122. The digital ID response 582 includes a signed (with signature 586) subset 540 of verifier-PII-field-arrays 516 and a respective digital-ID-certificate 520a. Each verifier-PII-field array 516 includes a verifier name (VN) 231, a PII field name (FN) 232a, a PII field value (FV) 512a, and a nonce 514a such as illustrated in FIG. 5A. Each respective digital-ID-certificate 520n is from a respective verifier 50b, 50n that is associated with one or more previously provided PII fields 510.

The signed subset 540 of verifier-PII-field-arrays 516 correspond to the requested verifier-PII-requirements 226 in the verifier-profile 220. The subset 540 is digitally signed 586, via the Digital ID app 122, with the private key 129 on the ID-holder-device 120. The wrapped keys 585 are each created by encrypting symmetric key 584, using the public key of one of the other verifier servers 180 extracted from the respective verifier server certificates 240 (such as provided in step 424 in a previous verification process 400a, 400b with one of the other verified servers 180). Therefore, a wrapped key 585 is created corresponding to each verifier server certificate 240 provided in step 424 such that only authenticated verifier servers 180 may decrypt their wrapped key 524, using their respective private key 189.

Referring again to FIG. 4B, the certificate attachment, signing and encryption of step 434, uses methods commonly known in the art. Preferably the Cryptographic Message Syntax (CMS) standard is used. It should be appreciated that signed digital ID response 582 represents a cryptographically strong record of consent by ID holder 20 to provide the verifier 80a with the requested PII fields 230 where ID holder 20 has been made aware of the purpose for which the consent was granted. This record of consent also includes the time that consent was granted (signing time of the certificate); and a guarantee of the authenticity of the provided PII fields 510. This record of consent by ID holder 20 may be required by verifier 80*a* in order to comply with local privacy laws.

In step 436, the verifier-specific digital ID 580 is decrypted and validated by verifier server 180 as follows:
1. the correct wrapped key 585 is selected and the symmetric key 584 is unwrapped using the verifier server device private key 189 stored in an addressable memory location in secure element 187;
2. the unwrapped symmetric key 584 is used to decrypt the signed digital ID response 582;
3. the signature 586 is verified and digital-ID-certificates 520*a*, 520*n* are authenticated (issuer, revocation, expiration, path, etc. as is known in the art); and
4. provenance of the PII fields 510 is confirmed by (i) computing the hash values for each provided PII field 510 in the verifier-PII-field-arrays 516 using the PII field 510 and related nonce value 514 and the same hash process as used in step 446, and (ii) ensuring the computed hash value is present in the digital-ID-certificate 520 of the related verifier 80*b*, 80*n* by comparing the computed hash value with hash values 522 of digital-ID-certificates 520*a*, 520*n*. It should be appreciated that comparing the computed hash values with verified signed hash values provides cryptographically strong assurances of authenticity and integrity over an arbitrary (potentially empty) the partial set of the PII fields 510. It should be further appreciated that partial set of the PII fields 510 in the signed subset 530 become cryptographically protected jointly and severally.

As described above, the signed subset of verifier-PII-field-arrays 516 are digitally signed by the mobile device's private key 129 prior to transmission to the verifier in step 434 as described above. The verification of signature 586 proves that the ID holder 20 has possession of the private key 129 used to obtain the verification results 500 (see below, with reference to FIG. 5A), and therefore, due to the nature of secure element 127 (namely, that keys are not extractable and require authentication to access), that the ID holder 20 is in physical possession of ID-holder-computing-device 120 at time of signing. Further the digital-ID-certificates 520 include the hash values 522 that allow, in conjunction with the nonce values 514, verification that the PII fields 510 have not been tampered with since they were issued.

Steps 434 through 438 therefore describe a scenario in which the verifier 80*a* is essentially acting as a vendor to receive and verify PII fields 510 previously verified by other verifiers 80*b*, 80*n*.

The PII fields 510 are extracted in step 438 and are ultimately combined with those PII fields 510 extracted in step 442 as described below.

In step 440, verifier server 180 analyzes the captured ID to extract and authenticate the included information. Additionally, verifier server 180 detects security features in the captured ID to determine if the ID is genuine, counterfeit or has been altered. The ID verification process optionally uses techniques as disclosed by Applicant in granted U.S. Pat. Nos. 7,911,655, 8,610,966, 8,462,395, 8,724,183, 6,785, 405.

In step 442, verifier server 180 extracts PII fields 510, each including PII field names (PII FN) 232*a*, 232*b* and corresponding PII field values (PII FV) 512*a*, 512*b*, wherein PII fields 510 are extracted from alphanumeric text, barcodes, photographs, encoded biometric information including fingerprints, voice prints, and retinal scans (eyeprints), and other types of information in the captured ID. Optionally the extracted information is verified opposite an external database (not shown). Optionally, the liveness test (selfie) image is compared to a photograph on the captured ID and face recognition is used to verify that the liveness image and photograph match. Optionally, a manual (human review) confirms the evaluation. Extracted-PII-fields 510 may optionally be supplemented by meta-ID fields, such as a confidence score that is assigned based on the quality and authenticity of extracted-PII-fields 510, or assertions about values contained in the PII fields 510. Optionally the meta-ID fields include data determined by classifying the type or originator of the captured ID. A non-limiting example of a meta-ID field is an "over 21" field that is based on comparison of the extracted user birth date with date of the extraction to determine whether the user is over 21 years old. As used herein, PII fields 510 include meta-ID fields. If, in step 444, verifier server 180 fails to authenticate the captured ID or if PII fields 510 are determined to be missing, ID holder 20 may optionally retry capture, returning to step 428, or choose to abort, causing process 400*b* to terminate at step 499.

In step 446 the extracted-PII-fields 510 are each individually hashed by verifier server 180 to form hash values 522. Since many of the PII fields 510 are low entropy values, each of PII fields 510 are preferably hashed using HMAC (hash-based message authentication code) wherein the PII field 510 to be hashed is hashed with a respective server-generated nonce value 514 to form a hashed PII field 522. The nonce generation is preferably performed using a cryptographically secure pseudo-random number generator (PRNG). Optionally one nonce is generated and the others are derived using a hash tree (Merkel tree). The hashing is preferably performed using the following HMAC function:

Hash(Hash(nonce XOR outer padding)||Hash(Hash(nonce XOR inner padding)||ID field))), where || denotes concatenation.

Optionally other functions or hashing methods are used as described further below. Optionally, private key encryption (digital signature) is applied to produce the final hash value.

As illustrated in FIG. 5A "Hash$_1$" 522*a* corresponds to the N hashed value of PII FN$_1$ 232*a*, PII FV$_1$ 512*a* with Nonce$_1$ 514*a*); "Hash$_2$" 522*b* corresponds to the hashed value of the PII FN$_2$ 232*b*, PII FV$_2$ 512*b* with Nonce$_2$ 514*b*, and so forth, up to the N$^{th}$ PII field 510 and N$^{th}$ nonce 514*n*.

Referring again to FIG. 4B, in step 448 verifier server 180 assembles the contents for digital-ID-certificate 520 (see FIG. 5A) including: the public key 524 of ID holder 20 known to correspond to the private key 129 stored in an addressable memory location in user secure element 127 on ID-holder-computing-device 120 and hash values 522*a*, 522*b*, 522*n* placed in a certificate extension. Verifier server 180 then digitally signs digital-ID-certificate 520 including the extension using verifier server 180 private key 189. The signed 526 digital-ID-certificate 520 also includes certificate metadata 528 necessary for signature validation including but not limited to issuer name, serial number, validity period, and signature algorithm. The digital-ID-certificate 520 is preferably formatted according to the X.509 profile, an ITU (International Telecommunication Union) and IETF (RFC 5280) standard that defines the format of public key certificates but may alternatively be of any suitable format. It should be appreciated that the extracted-PII-fields 510 become cryptographically protecting jointly and severally.

Verifier server 180 public key signature 526 is created as known in the art using the private key 189 of verifier server 180 and asymmetric encryption of the cryptographic digest of the contents of the certificate 520 before signing (including the concatenated PII field hash values 522).

In step 450 verification result 500 (see FIG. 5A) is sent by verifier server 180 back to digital ID app 122 over the secured mutually authenticated connection set up in step 430. The verification result 500 includes the digitally signed digital-ID-certificate 520, and separately the complete collection of PII fields 510 each with corresponding nonce value 514a, 514b, 514n and the verifier name (VN) 231 of the verifier that verified the PII fields 510 forming verifier-PII-field-arrays 516. Once the verification result 500 has been sent by verifier server 180, verification result 500 is completely erased from verifier server 180. Thus, no PII fields, nonce values or any related data are stored in an addressable memory location on verifier server 180.

In step 452 the verifier-PII field-arrays 516 are encrypted by digital ID app 122 on ID-holder-computing-device 120 and digital-ID-certificate 520 is stored in an addressable memory location on ID-holder-computing-device 120 in ID holder DB 124. Optionally, the verified PII fields 510 are displayed to ID holder 20 by digital ID app 122 such as in FIG. 6D.

Step 410 is now repeated following the steps of 420-452. As before, in step 410, the Digital ID app 122 determines whether all of the vendor-PII-requirements 323 are stored in an addressable memory location on ID-holder-computing-device 120. If additional vendor-PII-requirements 323 are still required, then, in step 420, DIGID app 122 determines a next verifier 80 required for obtaining a part or all these missing vendor-PII-requirements 323 based on the verifier names 231. Steps 422-452 are then repeated until all of the PII fields related to vendor-PII-requirements 323 are stored in an addressable memory location on ID-holder-computing-device 120.

At step 410, when DIGID app 122 determines that all of the vendor-PII-requirements 323 are stored in an addressable memory location on ID-holder-computing-device 120, process 400 continues with step 460. At this stage, it should be appreciated that all PII requirements from vendor profile 320 have been certified by one or more verifier 80 and stored in an addressable memory location on ID-holder-computing-device 120 and that ID holder 20 has in step 406 consented to share required vendor-PII-requirements 323 with vendor 50.

In step 460 digital ID app 122 generates and anonymously sends to IDSM 110 a vendor-specific digital ID 560 (illustrated, by way of example, in the block diagram of FIG. 5B) including:
1. a signed vendor digital ID response 562, encrypted with a random digital ID symmetric key 564 generated by digital ID app 122, wherein the vendor digital ID response 562 includes:
   a. a signed subset 530 of verifier-PII field-arrays 516 corresponding to the requested vendor-PII-requirements 323 in the vendor profile 320, where the subset is digitally signed 566 with the private key 129 of digital ID app 122; and
   b. digital-ID-certificates 520 from each verifier that provided PII fields 510; and
2. one or more wrapped keys 565 which are each created by encrypting symmetric key 564 using the public key of an authorized vendor device 150 extracted from the respective vendor device certificates 330. Therefore, a wrapped key 565 is created corresponding to each vendor device certificate 330 provided in step 404 such that only authenticated users of each corresponding vendor device 150 may decrypt their wrapped key 524, using the respective private key 159.

The certificate attachment, signing and encryption of step 460 uses methods commonly known in the art. Preferably the CMS standard is used. It should be appreciated that signed vendor digital ID response 562 represents a cryptographically strong record of consent by ID holder 20 to provide vendor 50 with the requested PII fields 320 where ID holder 20 has been made aware of the purpose for which the consent was granted. This record of consent also includes the time that consent was granted (signing time of the certificate); and a guarantee of the authenticity of the provided PII fields 510. This record of consent by ID holder 20 may be required by vendor 50 in order to comply with local privacy laws.

In step 462, in response to receiving vendor-specific digital ID 560, IDSM 110 generates a vendor-specific digital ID code 568 (see FIG. 5B), which is a hash representing the vendor-specific digital ID 560 generated in step 460. The vendor-specific digital ID code 568 is preferably a cryptographic digest of the vendor-specific digital ID 560. It should be appreciated that the vendor-specific digital ID code 568 can be generated with no knowledge of the contents of the vendor-specific digital ID 560.

In step 464, the vendor-specific digital ID code 568 is sent to digital ID app 122 for storage in an addressable memory location in ID holder DB 124 or alternatively in device wallet 128. The IDSM 110 or other entity (not shown) retains the mapping of code 568 to vendor-specific digital ID 560. In step 466, the vendor-specific digital ID code 568, and other data elements such as an IDSM address 574 and second symmetric key part 576, are combined by digital ID app 122 to form a URI called the digital ID pass URI 570 (FIG. 5C), which may be represented in text or graphical form, preferably as a QR code 600, but may also be any other transferable representation of digital ID pass URI 570. A non-limiting example of a digital ID pass URI 570, represented as a QR code 600, as displayed to ID holder 20 is shown in FIG. 6F, wherein QR code 600 is to be presented by ID holder 20 to the vendor 50.

Optionally, symmetric key 564 may be split into two parts, a first symmetric key part being included as wrapped keys 565, and a second symmetric key part 576 stored by digital ID app 122 in an addressable memory location in ID holder DB 124. Optionally, the digital ID pass URI 570 may be appended with the second symmetric key part 576 by digital ID app 122 such that an attacker in control of IDSM 110 could not trick digital ID app 122 into disclosing the complete symmetric key, by, for example, installing a rouge certificate in vendor profile 320.

The vendor-specific digital ID code 568 is preferably valid for a limited amount of time such as but not limited to 24 hours, and/or for a specific number of uses, such as but not limited to one use, after which the uploaded vendor-specific digital ID 560 is deleted from the IDSM 110 such that the vendor-specific digital ID code 568 no longer contains useful information.

In step 468, when ID holder 20 desires to present a digital ID to vendor 50, such as but not limited to arrival at the vendor establishment or venue prior to service, the digital ID pass URI 570 is transferred from ID-holder-computing-device 120 to vendor app 152 on vendor device 150, wherein vendor app 152 is activated prior to transfer of digital ID pass URI 570. Optionally, the digital ID pass URI 570 is a represented as a QR code 600 and a camera (not shown) of vendor device 150 is used to scan the digital ID pass URI 570, such as the image frame 600' of QR code 600, as illustrated in FIG. 6G, which shows an illustrative screen of a vendor device 150 in which ID-holder-computing-device 120 is imaged, and wherein vendor device 150 is ready to scan a digital ID pass URI 570. Optionally, the digital ID pass URI 570 is scanned by vendor device 150 using NFC for connecting to ID-holder-computing-device 120. Optionally, the ID-holder-computing-device 120 and vendor device 150 are the same device and the digital ID pass URI 570 is transferred between user app 122 and vendor app 152 via app-to-app transfer. Optionally, the vendor device 150 is a web server and the vendor app 152 is a web service and the digital ID pass URI 570 is transferred by a web API callback.

In step 470, the vendor-specific digital ID code 568 extracted from the digital ID pass URI 570 is presented by vendor app 152 to IDSM 110 so as to receive for download the vendor-specific digital ID 560. The vendor app 152 connects to IDSM 110 through mutually authenticated secure channel by presenting a valid vendor device encryption certificate 330 (such as issued in step 311 described above with reference to FIGS. 3A-3D). IDSM 110 responds in step 472 with the vendor-specific digital ID 560.

In step 474, the vendor-specific digital ID 560 is decrypted and validated by vendor app 152 as follows:
1. the correct wrapped key 565 is selected and the symmetric key 564 is unwrapped using the vendor device private key 159 stored in an addressable memory location in secure element 157;
2. the unwrapped symmetric key 564 is used to decrypt the signed vendor digital ID response 562;
3. the signature 566 is verified and digital-ID-certificates 520 are authenticated (issuer, revocation, expiration, path, etc. as is known in the art); and
4. provenance of the PII fields 510 is confirmed by computing the hash values for each provided PII field 510 in the verifier-PII-field-arrays 516 using the PII field 510 and related nonce value 514 and the same hash process as used in step 446, and ensuring the computed hash value is present in the digital-ID-certificate 520 of the related verifier 80 by comparing the computed hash value with hash values 522 of digital-ID-certificates 520. It should be appreciated that comparing the computed hash values with verified signed hash values provides cryptographically strong assurances of authenticity and integrity over an arbitrary (potentially empty) partial set of the PII fields 510.

As described above, the signed subset of verifier-PII-field-arrays 516 are digitally signed by the mobile device's private key 129 prior to transmission to the vendor in step 460 as described above. The verification (in item #3 of step 474) of signature 566 produced in signing of step 474 proves that the ID holder 20 has possession of the private key 129 used to obtain the verification results 500, and therefore, due to the nature of secure element 127 (namely, that keys are not extractable and require authentication to access), that the ID holder 20 is in physical possession of ID-holder-computing-device 120 at time of signing step 474. Further the digital-ID-certificates 520 include the hash values 522 that allow, in conjunction with the nonce values 514, verification that the PII fields 510 have not been tampered with since they were issued.

Optionally, where symmetric key 564 has been split, the first part is unwrapped using the vendor device 150 private key 159 stored in an addressable memory location in secure element 157 and the second part 576 is extracted from the digital ID pass URI 570 and these two parts are then combined so as to be used to decrypt signed vendor digital ID response 562.

Figure 6H:
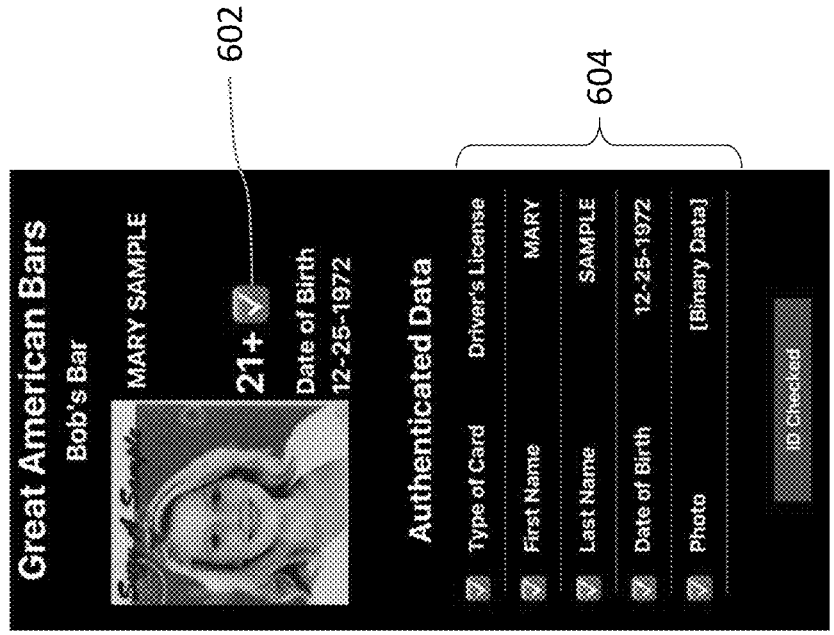
FIG. 6H depicts an example screenshot of the validated PII fields that are displayed by vendor app on the vendor-computing-device, according to aspects of the present disclosure.
Figure 6G:
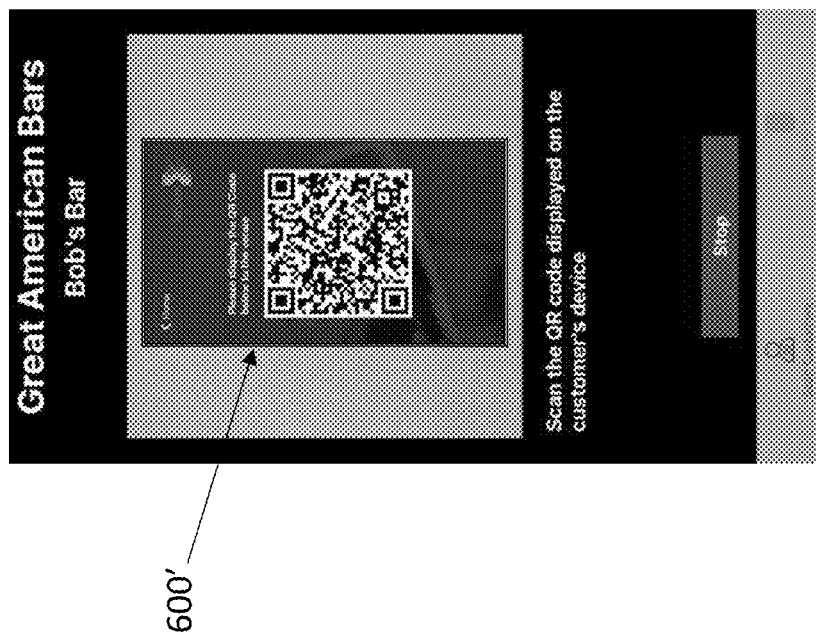
FIG. 6G depicts an example screenshot of vendor-computing-device that is about to capture a QR code to be presented by the ID holder app to the specified vendor-computing-device, according to aspects of the present disclosure.
Figure 7A:
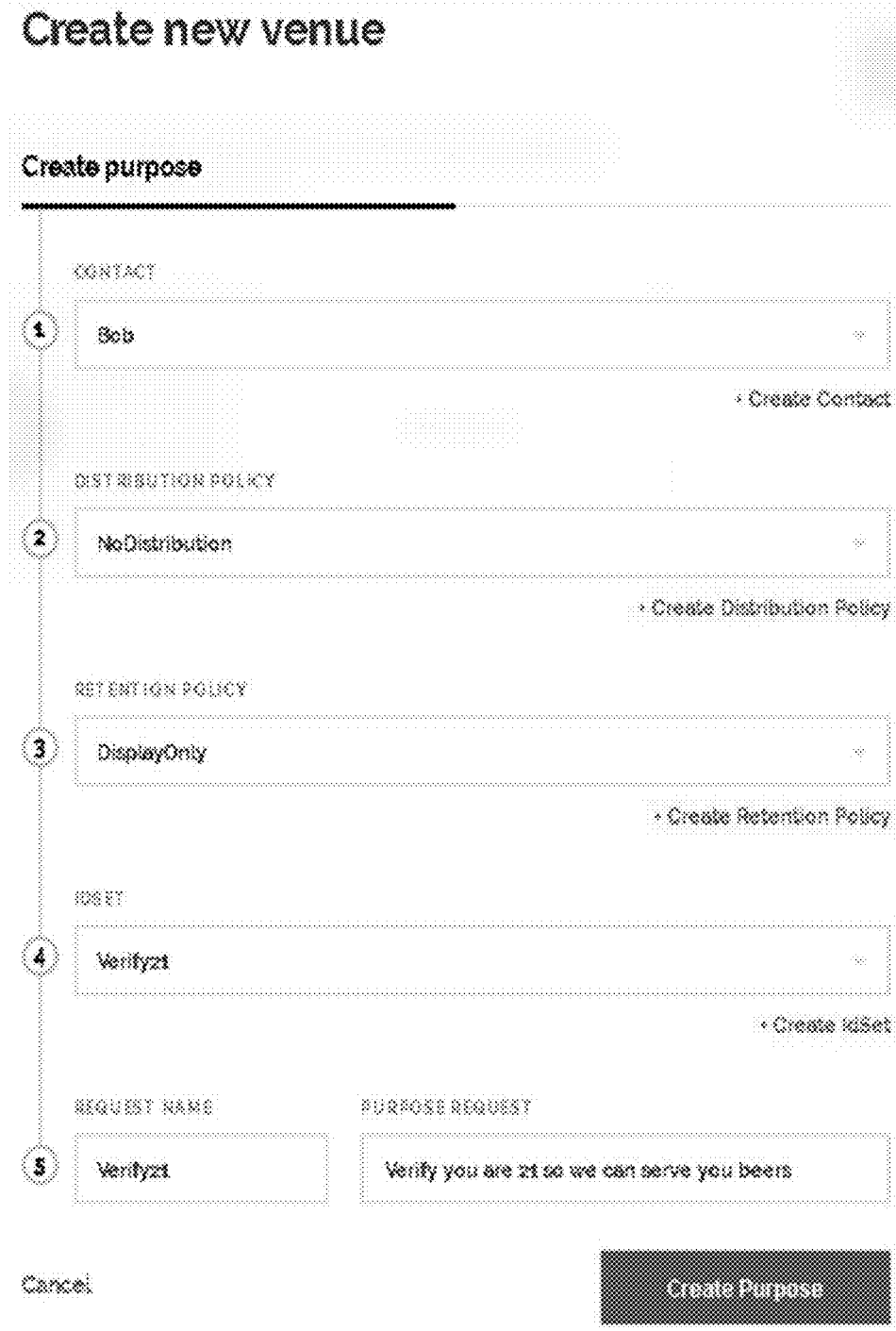
FIGS. 7A-7E example screenshots of use of the digital-ID-management system, according to at least some aspects of the present disclosure.
Figure 7B:
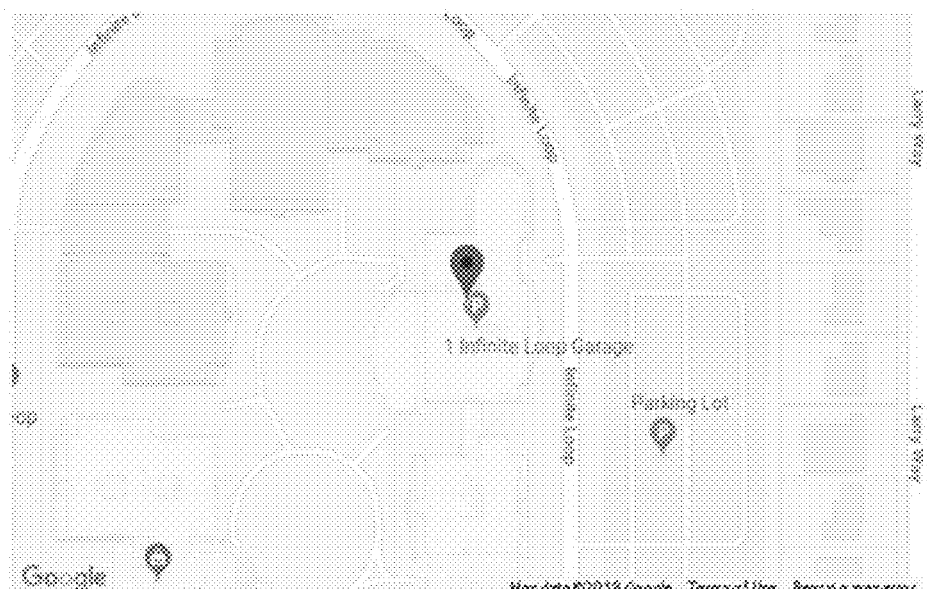
Figure 7C:
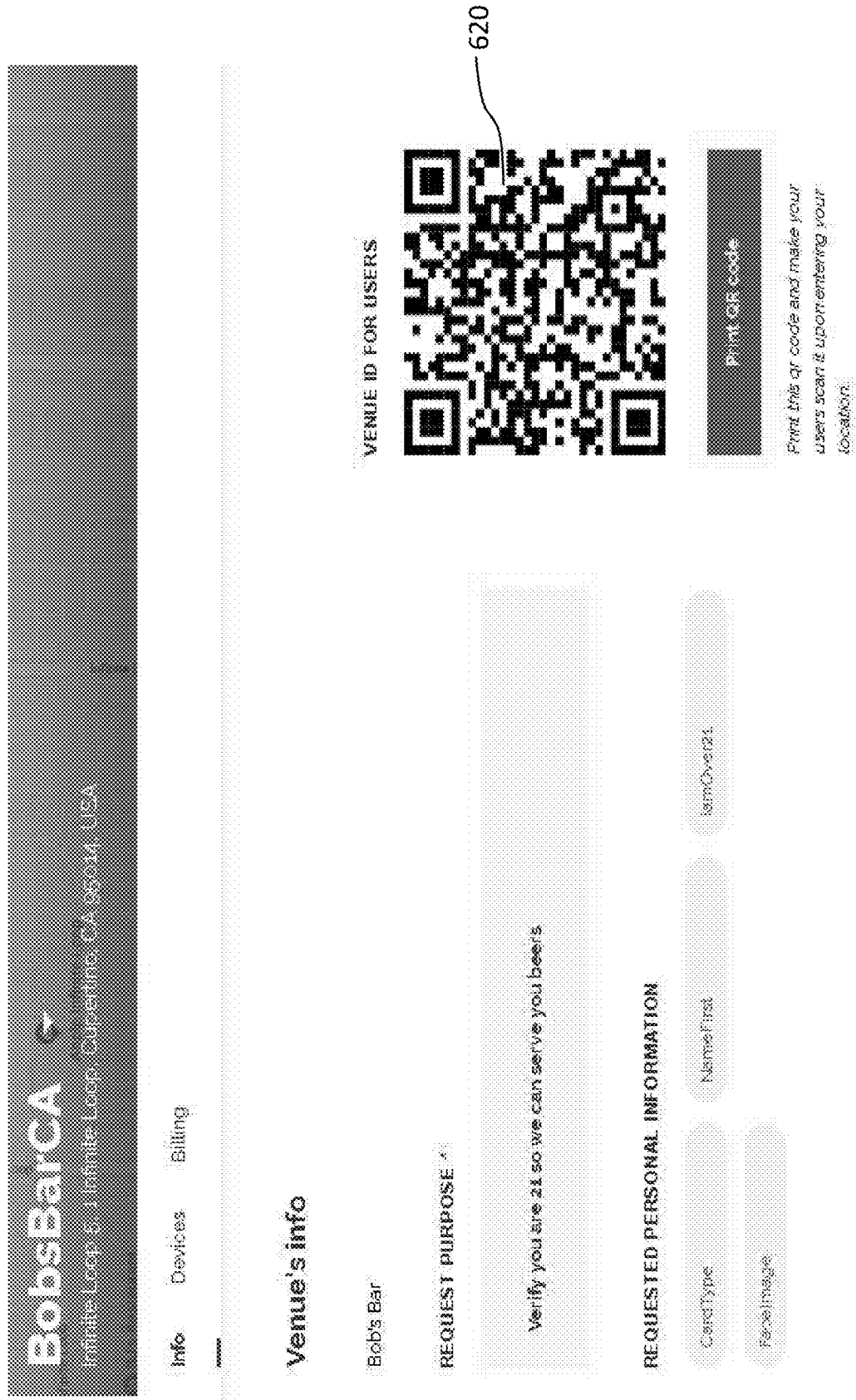
Figure 7E:
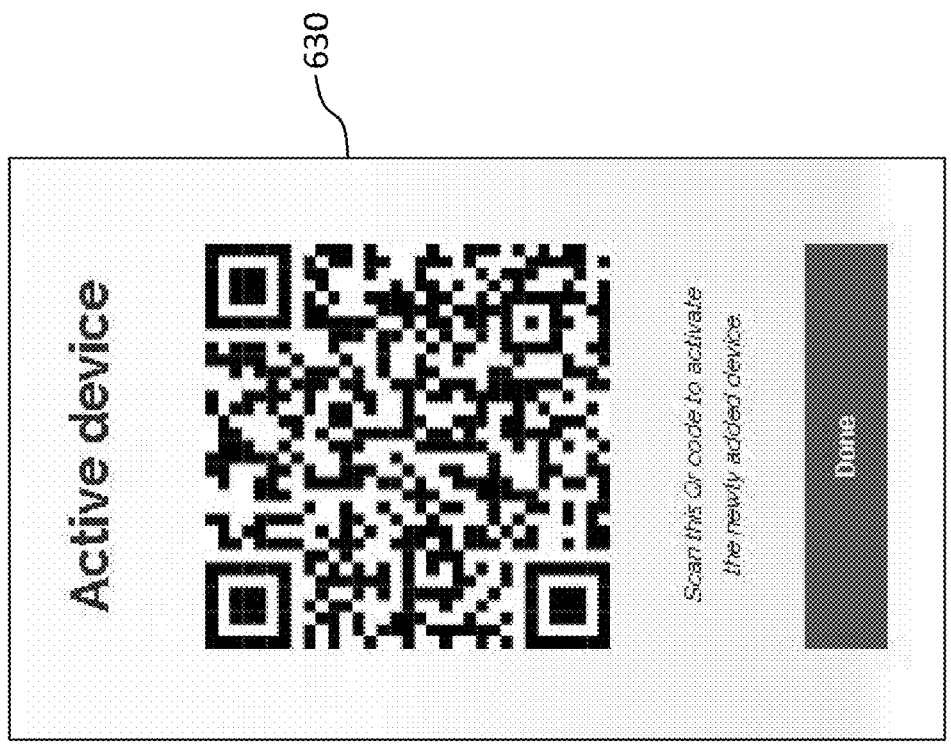
Figure 7D:
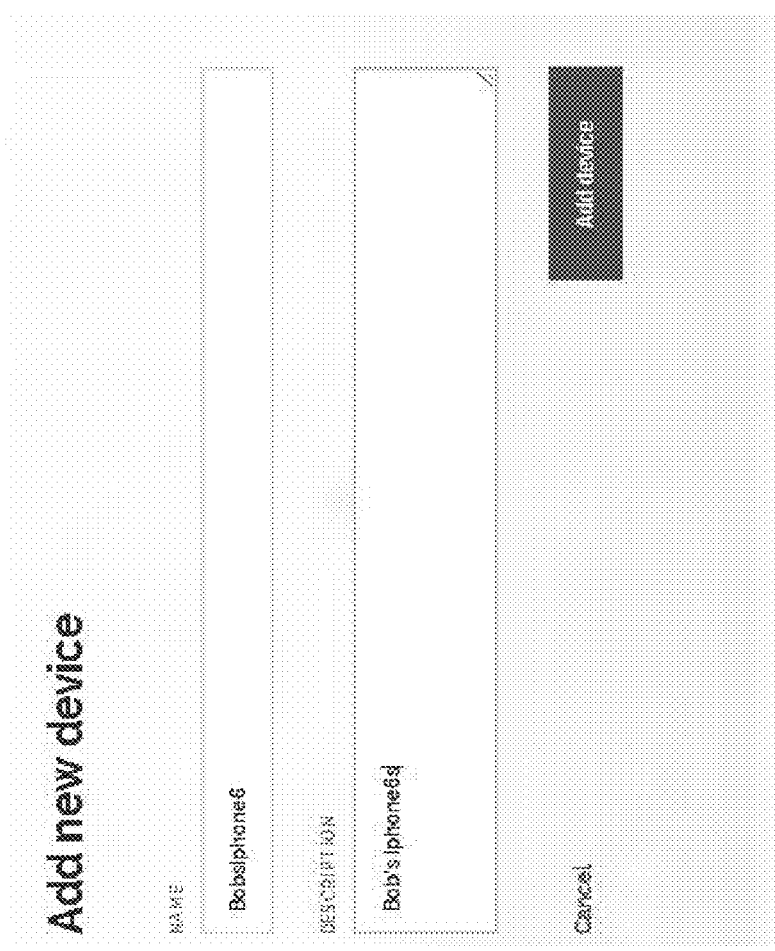

As illustrated in FIG. 6H, the validated PII fields 510 may then be displayed 604 by vendor app 152 on vendor device 150. Following step 474, vendor user 52 can then inspect on vendor app 152 the exposed subset of PII fields 530 and determine whether ID holder 20 can be serviced (step 476).

In the non-limiting example shown in FIG. 6H, vendor user 52 will only allow ID holder 20 into vendor venue if ID holder 20 is over 21 years of age, and this is indicated by checkmark 602.

Optionally, vendor app 152 also displays the number of times that the vendor-specific digital ID 560 has been requested, to ensure that the vendor-specific digital ID 560 is not being reused. Optionally vendor device 150 is an automated device such as but not limited to an automated entry turnstile where ID holder 20 can present their vendor-specific digital ID pass 570 for scanning and that unlocks based on automated analysis of the decrypted PII fields 510. Optionally, vendor device 150 is a web server and vendor app 152 uses provided PII fields 510 to make a decision.

PII fields 510 are erased from vendor device 150 when no longer required according to a time limit as specified in vendor profile 320. For example, for ID verification, the defined time is only while displayed on vendor device 150. For other use cases, more information might be stored in an addressable memory location in accordance with the agreed terms of the vendor profile 320.

In an optional embodiment of process 400, the vendor-specific digital ID is transferred directly from digital ID app 122 to vendor device 150 without being stored in an addressable memory location on IDSM 110. In this optional embodiment step 460 includes only creation of the vendor-specific digital ID 560 by digital ID app 122. Digital ID app then generates the vendor-specific digital ID code 568 of step 462. Digital ID app 122 then generates the vendor-specific digital ID pass URI 570 of step 466. When the vendor device 150 enters the digital ID pass (step 468), the vendor-specific digital ID 560 is transferred directly from the ID-holder-computing-device 120 to the vendor device 150 over a secure communication channel for decryption and therefore, step 470 is also skipped. In this optional process, IDSM 110 therefore does not have access to the vendor-specific digital ID 560 thus providing further protection to PII fields 225 of ID holder 20 and further limiting the exposure of the digital ID service provider 60.

It should be appreciated from the foregoing that the complete set of PII fields 225 of ID holder 20 are only stored in an addressable memory location on the ID-holder-computing-device 120 of ID holder and nowhere else. The vendor-specific digital ID 560 can only be decrypted by the specific vendor device. Preferably, under normal circumstances, IDSM 110 does not have access to decryption keys required to access PII fields 510 contained within vendor-specific digital ID 560. It should be appreciated that when symmetric key 564 is optionally split, as described above, under exceptional circumstances such as in the event of a compromise where an illicit vendor certificate is added to IDSM database 114 by an attacker, the attacker still does not have access to PII fields 510 of the vendor-specific digital ID 560 without also obtaining the second part of symmetric key 564.

Further, where the symmetric key has been split (as described above), the second symmetric key part 576 may be erased from ID-holder-computing-device 120 memory before being added to digital ID pass URI 570, and vendor-specific digital ID 560 will be rendered unusable (even by authorized vendor devices) even if not immediately erased from IDSM 110. If the second symmetric key part 576 has been illicitly captured, such as by extraction from digital ID pass URI 570, and encrypted vendor-specific digital ID 560 retrieved illicitly from IDSM 110, ID holder 20 information is still safe because the first half of the key can only be unwrapped by the private keys 159 stored in an addressable memory location in the secure element 157 of authorized vendor devices 150.

Further, because step 403 and step 422 are conducted anonymously (not recorded by IDSM 110), the only record of the transaction between ID holder 20 and vendor 50 that is recorded by IDSM 110 is when the vendor device 150 requests the encrypted vendor-specific digital ID 560 from the IDSM 110. The server does not know which ID holder's vendor-specific digital ID 560 it is providing, only the PII fields 510 contained therein (since the vendor device is associated with a specific vendor profile which specifies the required PII fields 323). Therefore, there is no way to use captured vendor-specific digital ID 560 to correlate that a specific user patronizes a specific venue. This record is stored in an addressable memory location on the server and used for billing purposes. No user-identifiable information is stored.

The ID-holder-computing-device 120 may store previously accepted vendor profiles 320, and use location data therein to potentially automatically upload fresh encrypted information to the server (if the ID holder 20 has consented to do so), to facilitate the use of digital wallet technology. This does not change the security of the system, since the QR code 600 displayed by the wallet (watch or home screen) still needs to be scanned by the vendor device, and all other encryption steps remain in place.

Example 1

Reference is now made to FIGS. 7A-7E showing example screenshots of use of digital-ID-management system 100, as a non-limiting of the present disclosure. The following example of usage of digital-ID-management system 100 illustrates parts of processes 300a, 300b, 400a, and 400b as described hereinabove. Each stage is in the order of the sequence of events, although some stages might occur simultaneously. The screenshots, codes and tables are provided by way of examples only, to illustrate use of digital-ID-management system 100 and should not be considered limiting.

In the example a customer (referred to hereinabove as an ID holder 20), herein named "John", without limitations, wants to visit a vendor 50, herein called in this example "Bob's Bar", which requires patrons to be over 21 in order to be served alcohol. In brief, based on the disclosure herein, John uses a DIGID presented on a DIGID app 122 to prove to bar employees at the entrance of Bob's Bar that he is over 21 years old, without sharing additional personal information found on his driver's license.

The owner of Bob's Bar (being a vendor 50) is herein referred to as "Bob", without limitations. Bob decides to participate in the DIGID ecosystem of DIGID management system 100 and begins by registering Bob's Bar on an IDSM 110 via a vendor management portal 112. To create vendor and venue profiles, the vendor management portal 112 prompts Bob to create a vendor request purpose and offers multiple available defaults from which Bob picks "Verify customers are 21" (see FIG. 7A). Bob is also prompted by vendor management portal 112 to enter some additional information such as but not limited to: where his bar is located, how customers can contact him, and if he will be sharing the customer's information with anyone else (see FIGS. 7A and 7B).

Once created, Bob returns to the vendor profile screen (see FIG. 7C) where the Vendor ID QR code 620 can be viewed and printed out. The creation of a vendor QR code 620 is described further above with reference to FIG. 3H (step 303). The QR code 620 is then displayed near the bar entrance, and is distributed as part of the marketing of the bar such as on social media or on the website of the bar.

Next, Bob needs to get his bartenders set up to be able to check customer DIGIDs. For each vendor device 150 a vendor app 152 is installed (step 304). Next Bob creates a new device on the "Devices" tab of the vendor management portal 112 (see FIG. 7D), and scans the "Activate Device" QR code 630 that pops up (see FIG. 7E). The vendor app 152 then begins the vendor device enrollment process. The Activate Device QR code 630 encodes the address used to open a connection to the IDSM 110 of digital-ID-management system 100. A connection is opened (step 307) and the process of adding a new device proceeds (steps 308-309).

IDSM 110 creates a new vendor device certificate 330 for Bob's device 150 (step 310), stores it internally, and returns it to Bob's device 150 for storage in an addressable memory location (step 311). This certificate will be, in this example, valid for 24 hours, at which point Bob's device 150 will need to reconnect to get another certificate (such as in step 312). The process is repeated for each vendor device 150 that Bob wants to add. Bob's Bar is now set up to check customers using DIGIDs.

John (a customer/ID holder) is browsing Facebook, for example, and sees an announcement that Bob's Bar is now accepting DIGIDs. John downloads and installs (step 401) the DIGID app 122 on his smartphone and scans (step 402) the QR code 630 that Bob has posted to his social media feed. The text encoded in the QR code is used by John's DIGID app 122 to open a connection to IDSM 110 to request (step 403) the profile information for the encoded vendor ID, which IDSM 110 returns the vendor profile 320, and a list of active device public keys (step 404).

From vendor profile 320, John's DIGID app 122 displays the four fields that will need to be certified from the verifier server 180 a verifier 80 called, for example, "Acuant.net": First name; Last name; Date of Birth; Face Image. DIGID app 122 asks John (step 406) if he wants to share these four pieces of personal information with Bob's Bar, for the purpose of verifying his age (as indicated in the profile). John clicks "Accept" (see an example in FIG. 6E).

This is the first time John is using the DIGID app 122, so he does not have any fields certified by any verifier server 180. Thereby, his DIGID app 122 determines which verifier server 180 is needed (steps 420-426), requests the verifier-profile 220 and displays the request for John's consent to provide the following items to verifier server 180: driver's license; and selfie match (see an example in FIGS. 6A and 6B). John once again presses agree on his DIGID app 122.

With all of the profiles fetched and consents in place, DIGID app 122 moves on to acquire the required image frames (steps 428-438). For the driver's license, verifier server 180 instructs John to take a clear picture of his driver's license, and store the acquired image frame(s). Then DIGID app 122 to captures a selfie image. The selfie image matches the driver's license image, verifier server 180 instructs DIGID app 122 to capture a facial image where the John is blinking, to confirm that he is alive. These images are encapsulated and sent to verifier server 180.

If the verification process (steps 442-450) is successful, the following example verification result 500 (as described with reference to FIG. 5A and summarized in Table 1) is sent from verifier server 180 to John's DIGID app 122:

1. Created a vendor-specific DIGID 560 (step 460) addressed to Bob, encrypted with the certificate corresponding to the private key on Bob's vendor device 150;

TABLE 1

Example of verification result

To: John's DIGID device (public key . . .)
From: aidc.acuant.net

| Index | Verifier name | Field | Value | Nonce |
|---|---|---|---|---|
| 0 | aide. acuant.net/ID/DL | Address | 6080 Center Drive, LA, CA 90045 | 38a5af44 . . . |
| 1 | aide. acuant.net/ID/DL | CardType | DriversLicense.CA | 8d531f00 . . . |
| 2 | aide. acuant.net/ID/DL | City | Los Angeles | e89c3a6a . . . |
| 3 | aide.acuant.net/ID/DL | Class | LV | 9abd357e . . . |
| 4 | acuant.net | Country | USA | 31c37f5e . . . |
| 5 | acuant.net | DateOfBirth4 | Jan. 1, 1997 | 17d94acd . . . |
| 6 | acuant.net | Faceimage | . . . Binary Data . . . | 93433987 . . . |
| 7 | acuant.net | IssueDate | Jan. 1, 2013 | 09ea2fd8 . . . |
| 8 | acuant.net | IssuerName | CADMV | 0c7c4479 . . . |
| 9 | acuant.net | Name | John Smith | d7ec714f . . . |
| 10 | acuant.net | NameFirst | John | c345e8f2 . . . |
| 11 | acuant.net | NameLast | Smith | b1354f97 . . . |
| 12 | acuant.net | State | CA | 90e9cb52 . . . |
| 13 | acuant.net | Zip | 90045 | 0c2057b6 . . . |
| . . . | acuant.net | . . . | . . . | . . . |

| Certificate # | Certificate Info |
|---|---|
| 0 | AIDC Verifier Certificate |
| 1 | John's AssureID Validated Driver's License Cert<br>IAMX HMAC Signature Extension:<br>de90eb6c2b7c918ee13d848c415dcce8faf05c19617c83e37c03517403d3ddde<br>39c03f5b8ad86ea8e9636501fb94bcccf4d9b1c558b6a57c52a484d69f8ff414<br>82a8fae9f02076e907af40e31cd66086df51799fe6802bb3a6cce218f31e4c1a<br>032721a327dc166ea920a4acba27964e317568577b79f8f82cbce413e69c10cd<br>f7d6e065b20a461fbb503b5938b7e38640844a8f6f83e30dceb8e6eba72be30e<br>505cf0b944f5166273642a69d70f71686f8dc282501d2fb7227cfd229507279b<br>5b332d3dc29cd0d39305ac21dbc68a76eae7c656c9af55e186c3f19402768dfa<br>89339325373660badde5c9b1d487a11d9089b0150e350076d510cf59cd26447b<br>8421ea45d22ba42dbe98574237853542d0e755c586454b2950f016b486193b0f<br>85ffaa29bea41cb719308beebe36516defd6a7c2743b6d833eaf5d0db7c91612<br>d26f837fb41188ddd60bda8da5b4fc42448567f53dc21199774e4a79344c0ae3<br>579114120ad557c6f1f0c25255a49843ad7aef090df38dc010833b521190e5a8<br>131d593fe872da53a99c234d251ec336acca9c5cf29009442cb6a111f942cfb0<br>8c1836469dcfa0c78e754abf90aa1ca6f8c616737ed2d7adcd46eb06cf2a9103<br>4b70e688bf63fc4004b57fcfc97273f1b3fcb34f4b562f6a8a7157e1d1847be2 |

Each of the signature values included in the certificate extension are calculated by verifier server 180 for each PII field as follows (this example uses field #0: "address"):

Generate a random nonce/key. In this case: 38a5af44 . . . ; and

Run the RFC2014 HMACwithSHA256 algorithm, on the data (UTF-8 encoded) and the key, to produce the digest: de90eb6c2b7c . . . ;

John's DIGID app 122 encrypts and stores the PII fields (step 452) and the DIGID certificate 520 and John is notified that he is good to go if he ever gets around to visiting the Bob's Bar, since all required PII fields 323 are now stored in an addressable memory location on John's device 120.

When John visits Bob's Bar, he launches the DIGID app 122. Bob opens the vendor app 152 on his vendor device 150. John scans the QR code of the bar posted by the entrance using the DIGID app 122, then the DIGID app 122 displays John's DIGID Pass in the form of a QR code 600 (step 466 such as in FIG. 6F).

Once John has confirmed he is in Bob's bar and wishes to share his DIGID with Bob's vendor device 150, behind the scenes, John's DIGID app 122 has:

2. Uploaded the vendor-specific DIGID 560 to the IDSM 110, and received from the IDSM 110 a vendor-specific DIGID code 568 (step 462); and
3. Encoded that vendor-specific DIGID code 568 as a QR pass URI 570 (step 466), represented as a QR code 600 (see FIG. 6F), and displayed it on the screen of ID-holder-computing-device 120.

Bob scans QR code 600 using his vendor device (step 468) (see FIG. 6F), and (after steps 470-474) John's info pops up on vendor device 150 with a checkmark, such as 602 in FIG. 6H that is shown by way of example. Activities that take place behind the scenes in Bob's vendor device 150, are as follows:

1. Decoding of QR pass 570 scanned from John's device 120;
2. Retrieving the vendor-specific digital ID 560 from the IDSM 110 using the DIGID code 568;
3. Decrypting the vendor-specific DIGID 560 using the private key 159 of Bob's vendor device 150;
4. Validating authenticated DIGID certificate 520;
5. Ensuring that John was 21 based on the "DateOfBirth4" field; and
6. Displaying John's photo, over-21 status and name by Bob's vendor app 152.

The Vendor-Specific digital ID sent by John's DIGID app is shown in Table 2:

TABLE 2

Example of vendor-specific digital ID

To: Bob's vendor device; Bartender device; Bouncer device;
From: John's DIGID app

| Index | Verifier | Field | Value | Nonce |
|---|---|---|---|---|
| 5 | acuant.net | DateOfBirth4 | Jan. 1, 1997 | 17d94acd . . . |
| 6 | acuant.net | Faceimage | . . . Binary Data . . . | 93433987 . . . |
| 10 | acuant.net | NameFirst | John | c345e8f2 . . . |
| 11 | acuant.net | NameLast | Smith | b1354f97 . . . |

| Certificate # | Certificate Info |
|---|---|
| 0 | AIDC Verifier Certificate |
| 1 | John's AssureID Validated Driver's License Cert<br>IAMX HMAC Signature Extension:<br>de90eb6c2b7c918ee13d848c415dcce8faf05c19617c83e37c03517403d3ddde<br>39c03f5b8ad86ea8e9636501fb94bcccf4d9b1c558b6a57c52a484d69f8ff414<br>82a8fae9f02076e907af40e31cd66086df51799fe6802bb3a6cce218f31e4c1a<br>032721a327dc166ea920a4acba27964e317568577b79f8f82cbce413e69c10cd<br>f7d6e065b20a461fbb503b5938b7e38640844a8f6f83e30dceb8e6eba72be30e<br>505cf0b944f5166273642a69d70f71686f8dc282501d2fb7227cfd229507279b<br>5b332d3dc29cd0d39305ac21dbc68a76eae7c656c9af55e186c3f19402768dfa<br>89339325373660badde5c9b1d487a11d9089b0150e350076d510cf59cd26447b<br>8421ea45d22ba42dbe98574237853542d0e755c586454b2950f016b486193b0f<br>85ffaa29bea41cb719308beebe36516defd6a7c2743b6d833eaf5d0db7c91612<br>d26f837fb41188ddd60bda8da5b4fc42448567f53dc21199774e4a79344c0ae3<br>579114120ad557c6f1f0c25255a49843ad7aef090df38dc010833b521190e5a8<br>131d593fe872da53a99c234d251ec336acca9c5cf29009442cb6a111f942cfb0<br>8c1836469dcfa0c78e754abf90aa1ca6f8c616737ed2d7adcd46eb06cf2a9103<br>4b70e688bf63fc4004b57fcfc97273f1b3fcb34f4b562f6a8a7157e1d1847be2 |

Note that, while all of the HMAC values are in the signature extension, only the four requested PII elements are present in this DIGID. The entire DIGID is encrypted to Bob's vendor device 150 (and optionally, also to the other registered vendor devices such as "Bartender device" and "Bouncer device"). Bob's vendor app 152 decrypts the vendor-specific DIGID 560 using the private key 159 stored in an addressable memory location on his device 150. Since Bob's vendor device 150 checked in recently, John had Bob's vendor device certificate and therefore Bob's vendor device public key, so Bob is able to decrypt vendor-specific DIGID 560 using this vendor device 150.

The HMAC of each PII field is recomputed by Bob's vendor device 150 using the same algorithm that John's DIGID app 122 used to prepare the ID—except the HMAC uses the value transmitted in the DIGID. The vendor app 152 verifies that each computed digest is in the certificate extension and if, for each included PII field, a corresponding digest is found in the certificate extension, then the DIGID is said to be authenticated.

Note that, although Bob knows that John has a genuine driver's license, because BOB validated the digital signature on the digital ID certificate, Bob only has access to the four PII fields transmitted by John, unlike other digital ID systems, it is inherently impossible for Bob to reveal or display any additional elements (such as license # or home address) because they are never transmitted. A green checkbox 602 can be displayed by comparing the current date with the DateOfBirth4 field and ensuring that there are at least 21 years difference between them. Bob can now provide service to John (step 476).

End of Example 1

Other non-limiting examples of DIGID records of digital-ID-management system 100, include:

Example 2

A novel use of the disclosed DIGID record, DIGID-management system 100, that is contemplated in the field of credit cards, enables an issuing bank (being a verifier 80a of IDSM 110 in this scenario) to increase confidence in the identity of a credit cardholder (each being an ID holder 20 in this scenario) before approving a transaction, and, for the cardholder to share the minimum necessary subset of personal information with a merchant (being the vendor 50 in this scenario), when submitting payment.

First, the cardholder 20 enrolls their mobile device 120 by verifying payment information (card number, expiration, CVC, etc.) with the Credit Card association (or issuing bank) acting as the verifier server 180. The verifier server 180 may request additional PIIs, such as a verified driver's license, or even a passport, in order to confirm the identity of the cardholder 20. This process need only happen once per cardholder for several of subsequent purchasing transactions.

Next, using the DIGID-management system 100, the cardholder-holder-computing-device 120 verifies the authenticity of the merchant 50 prior to sending payment information. This process need only happen once per cardholder 20 per merchant 50 for several of subsequent purchasing transactions.

During a transaction, the cardholder-holder-computing-device 120 may scan a dynamically displayed QR code (e.g. on a website), click a link with encoded parameters (on a mobile device) to launch an app, or communicate via NFC to the merchant card terminal (physical location), to collect the transaction details. Transaction details include the merchant 50 account, purchase amount, date/time and optionally, a transaction number or callback (routing information).

It should be appreciated that in the process of unlocking the mobile DIGID app 122, the cardholder 20 has already authenticated with the cardholder-holder-computing-device 120. At a minimum, this represents two-factor authentication (possession of device, and knowledge of the PIN/Password), and optionally, adding other factors such as finger, facial and/or voice biometrics. Once the cardholder 20 has confirmed the transaction on their DIGID app 122, the DIGID app 122 can proceed with executing the payment.

There are two options for completing the payment transaction. The preferred method is for the cardholder app 122 to contact the issuing bank and gain an authorization approval code for the amount indicated by the merchant (50). The approval code is then returned to the merchant 50 along with the transaction identifier using the routing information contained in the payment request, or through NFC directly with the terminal in the Point-of Sale (POS) use case. The approval code is not technically sensitive, since it simply represents an authorized transfer between the issuing bank and acquiring bank merchant (50) account, but the DIGID management system 100 may encrypt it in a short-lived vendor-specific DIGID 560 for additional protection.

In cases where routing back to the POS may be difficult (for example, not all physical terminals may have publicly accessible internet addresses), or would require too much new infrastructure, it is also possible to add security over a legacy transaction network transport using an intermediate vendor device. In this option, a vendor-specific DIGID 560 is generated containing the cardholder PIIs provided during the enrollment step by the issuing bank. This may be the original card number, or may be a secret card number only ever stored by the enrolled device and issuing bank. The intermediate vendor device 150 receives the vendor-specific DIGID 560 using the method described in the present disclosure, verifies the issuer's signature, and processes the transaction over the legacy transaction network. Additional confidence is gained by the issuer signature verification, reducing exposure to liability from a CNP (card not present) transaction.

Example 3

Encapsulating payment information within a vendor-specific DIGID also applies to ACH (Automated Clearing House) EFTs (electronic checks), where the merchant 50 may want to prevent collection of fraudulent payment information (routing number, account number, account holder name, institution name, account type, etc.). The customer's bank issues a verification result (potentially after accepting one or more verified fields from another form of ID) with the necessary information. When a merchant 50 requests that the customer 20 submit their payment information as a vendor-specific DIGID, merchant 50 can additionally request one or more fields of the primary ID. By checking the signature on the ID fields (from the IDSM 110) and the payment information (the bank) the merchant 50 is provided with a high assurance that the information is genuine, and the customer 20 is an authorized party on the account.

Furthermore, when the agreed amount is included in the DIGID (as an uncertified field, signed only by the customer 20), the resulting DIGID is a cryptographically protected record of the approved debit. With the participating of two banks, one sending and one receiving, the agreed amount could be certified by the sending bank in the form of a pre-authorization DIGID with the balance being placed on temporary hold (for the duration of validity period of the DIGID). Subsequently, when the account holder 20 wishes to execute the transfer to the receiving bank, the account holder 20 creates a vendor-specific DIGID addressed to the receiver 50, who can verify that the balance is available. This increase in assurance is desirable, for example, in high-value transactions, such as real estate, where it could replace the use of a $3^{rd}$ party escrow accounts (eliminating associated fees and clearing delays). The account holder 20 supplied attributes added to the receiving bank DIGID offer a convenient way to cryptographically associate a funding purpose with a transaction ("down payment on the property at 123 main street . . . "), and naturally, the receiving bank can additionally receive strong identification along with the funds transfer.

Example 4

A further novel use of use of the mechanism of the disclosed DIGID management system 100 is contemplated in the field of cryptocurrency, where the DIGID management system 100 may help bring cryptocurrency transactions into compliance with anti-money-laundering regulation. In this application, the wallet holder 20 sends the 180 a nominal amount of currency (preferably with entropy encoded in the fractional components) through the cryptocurrency network, as an enrollment fee. Separately, the wallet holder 20 initiates a verification request to the wallet verifier server 180, with their wallet ID, the fee transaction details (amount, time, hash) and other previously verified fields (e.g. from a driver's license). The wallet verifier server 180 may perform some checks at this time, such as the on the balance of the wallet 128, previous transaction sources and destinations with the wallet 128 (it might, for example, require starting with a zero balance or only verified deposits), and the strength and algorithm of the wallet key. The wallet verifier server 180 returns a DIGID system wallet-verification result to the wallet holder 20 containing the wallet identifier of the wallet key holder. To perform a KYC-compliant crypto-currency transaction, the wallet-holder 20 sends their verified wallet-ID and the transaction amount to the merchant 50, along with any other necessary certified PII fields (e.g. from a driver's license), which can be verified by the merchant 50 prior to completing the transaction.

In the case of an audit, the wallet verifier server 180 could prove that each certified wallet-identifier is associated with a verified individual. Since it would only have access to the minimum-required-subset of PIIs for each ID holder 20, identity theft would be unlikely in the event of a breach.

Although more than one wallet 128 could be associated with a given ID holder 20, to further increase assurance, some realizations may require the private key of the crypto-currency wallet to be the same as the ID holder 20 private key 129 (thus requiring the supplementary ID e.g. driver's license be verified for each wallet 128).

Example 5

A further novel use of the mechanism of the disclosed DIGID management system 100 is in the field of healthcare. Presently, patients (being the ID holders 20) have very little control over their electronic health records—management thereof is left to healthcare providers. Transferring records between providers is difficult, and in many cases, is performed over unencrypted email or thumb drive, or in cases of complete incompatibility, printing and scanning. The process of obtaining a personal copy of medical records can take weeks at some providers, and even then, may be incomplete. At the same time, healthcare providers need up-to-date insurance information on their patients 20, and specialists would benefit from rapid access to information from other providers. While recent attempts have been made to standardize or even centralize interchange and storage, the results have been sub-optimal and even disastrous.

An application of the DIGID management system 100 to healthcare resolves these issues and gives patients 20 control over their records and information. As discussed elsewhere in this disclosure, the DIGID management system 100 enables certification of personal information extracted from verified identification documents including driver's licenses, passports, and insurance cards. The system can easily be extended, by establishing a healthcare verifier server 180 at each healthcare provider. This verifier server 180 exchanges identifying information (a DIGID with the minimally required subset of PII fields for the patient 20) with digital medical records, which can be stored in an addressable memory location on the patient's mobile device 120. Any other healthcare provider with a healthcare verifier server 180 can subsequently request this information, which will be transferred only if the Patient 20 consents to do so. Furthermore, the transference of healthcare information from the healthcare provider to Patient 20 may be automated based on Patient 20 location, initiated by the Patient's device 120 when entering a boundary specified in the provider's profile. This ensures that information is always up to date.

With the DIGID management system 100, following the approval of a patient 20 (see FIG. 8B, process 655), a subset of critical medical records for each participant patient 20 (such as blood type and food allergies) are securely archived (in step 659) by a vendor 50, which provides first responders with smartphone apps. Referring to FIGS. 8A-8C, vendor 50 is, in the example shown in these figures, an emergency medical services provider. In this case, the patient 20 agrees to supply the vendor 50 with a subset of their medical information for use only in emergencies; and the vendor 50 agrees to only provide access to qualified medical professionals certified to serve as first responders (see FIG. 8A, process 650), and to alert the patient 20 if their information is accessed. In an emergency (see FIG. 8C, process 660), a scannable code is displayed on the lock screen of the patients mobile device 120 (for example, by setting the "background picture" to a QR code with access instructions) would be scanned by the first responder 50 (in step 662), who requests (in step 664, through a secure channel, providing their certified first responder ID, which ID is authenticated by IDSM 110 in step 666) the critical medical records, which are returned in real time over the secure channel (in step 668), allowing the first responders to administer first aid accurately, but without needing to have this information accessible to anyone (as is the current practice by some smartphone manufacturers).

Example 6

A DIGID management system 100 may also secure the distribution of controlled substances. DIGID management system 100 facilitates processes 680 adapted for an application in which a verified patient 20 (step 681) requests (step 682) a prescription from a doctor (50a), as illustrated in the two-dimensional flow diagram of FIG. 9, In such application, the prescribing doctor (50a), using an enhanced vendor/verifier application of DIGID management system 100, issues the prescription to the mobile device 120 of a patient 20. As the prescription is signed by the doctor 50a (who's vendor device 150 is certified by the practice, and the practice is certified by the healthcare ecosystem 110), the patient 20 cannot tamper with the prescription. The patient 20 can then choose a pharmacy (50b) to send (in step 684) the prescription to, using the appropriate vendor ID of vendor device 150 (as done, for example, in step 694). This process may occur electronically, or in person. Once filled (in steps 696-697), the same system 100 can verify (in step 689) that the intended patient 20 or authorized delegate (as seen by the doctor 50a) is picking up the prescription.

This may seem superficially similar to the electronic prescription system used in the US healthcare system (for example), however, the DIGID management system 100 has several advantages:

a. The identity of the patient 20 receiving the prescription is intrinsically verified (by the doctor's verifier server 180, in step 690) prior to issuing any prescription (in either step 693 or step 694). This allows much more robust detection of prescription abuse (for example, by going to multiple doctors with the same complaint) compared to the current US healthcare system.

b. The disclosed DIGID management system 100 allows insurance information to be transmitted with identity, so that the doctor 50a has immediate feedback on if the required medication would be covered, in step 681, and if the brand name was not, if there are generic equivalents.

c. Processes 680 alleviate the need for the doctor's office to maintain a record of all pharmacies, and more importantly protect a patient's choice of pharmacy (by choosing between either step 693 or step 694) from the doctor (who may inappropriately suggest a pharmacy and steer patients towards that particular pharmacy).

Additional non-limiting examples of DIGID records of digital-ID-management system 100 are provided in the following list:

1. A DIGID record for a season ticket (ID Document) holder, such as a baseball season ticket holder (ID holder 20), include a combination of the ID holder personal information, such as from a driver's license verified by a first verifier 180, combined with the baseball season ticket information, such as provided based on the ticket purchase information verified by a second verifier 180. This baseball DIGID could be used to gain entrance to the stadium of the home baseball team (being the vendor 50 in this scenario) and/or be used for other activities such as purchases related to the home baseball team.

2. A travel DIGID record may include a combination of an ID holder (20) passport information, verified by a first verifier 180, combined with the airline booking information, such as provided based on the airline booking verified by a second verifier 180. This travel DIGID could then be used for passport control, customs, aircraft boarding (each one having the role of a vendor 50 in this scenario) as well as other travel related scenarios such as hotel and car rental bookings, where each interaction is based on consent of the ID holder 20 to provide limited PII fields from the travel DIGID, as required by each vendor 50.

3. An emergency-services DIGID record may include a combination of an ID holder (20) personal information, such as from a driver's license verified by a first verifier 180, combined with an ID holder's emergency responder ID, verified by a second verifier 180. This emergency-services DIGID could be used to gain access to a disaster site (the vendor 50 in this scenario).

4. An electronic checking DIGID record may include a combination of ID holder (20) personal information, such as from a driver's license verified by a first verifier 180, combined with an authorized hold amount verified by the ID holder bank acting as a second verifier 180. When such a DIGID record is accepted by a second bank, acting as a vendor 50, a large amount could be securely transferred without the use of a 3$^{rd}$ party escrow.

5. Another application of the DIGID management system 100 of present disclosure relates to the broad field of so called "government e-Services" where an ID Holder 20 interacts with federal, state, or local government agencies 50 through Internet applications. Such interactions include paying taxes, filing civil and criminal documents, renewing registrations, and collecting welfare. In all cases, the present disclosure provides a high assurance of identity to the relying government authority. In addition, a location-enabled mobile device 120, and compatible fitness monitoring wearable, able to transmit a real-time digitally signed geolocation and proof-of-life, could reduce fraud and verification cost in areas including food-stamp redemption, parole check-ins, and social security payments.

6. With compulsory wage withholdings (e.g. in the US since 1943) the majority of taxpayers overpay on each paycheck and are entitled to receive a refund from the government each year. To date, it has been difficult to ensure that the refund is sent to the taxpayer and is not fraudulently intercepted (motivation). Methods of the DIGID management system 100 of the present disclosure can be applied in this situation by having the tax collection authority act as a vendor 50. The taxpayer (ID holder 20) agrees to securely send information items to the tax collection authority tax such as via paperwork (e.g. form 1040 in the US) including checking account information, along with other elements of their government-issued ID as signed by the IDSM 110, as a DIGID. The tax agency then compares various fields (e g name) to fields on the paperwork to ensure they match the respective verified fields from IDSM 110. The tax agency then has a high confidence that the ID holder 20 (and thus the form submitter) is the genuine payment recipient.

7. Most interactions with government entities require paper forms—in many cases, once filled out, the information is entered directly into a computer system. The transitioning of those forms to be self-service online has been a challenge, in part because there has to date been no method for the government to identify an individual submitting his/her own form. With the DIGID message format any form data can be included as User (20) entered; this data is then signed along with verified fields from the IDSM 110 to the government agency (50). This example embodiment provides advantages to both parties:

For the ID holder 20, the DIGID management system 100 of the present disclosure enables a broader range of self-service interactions to avoid long wait lines and handwritten error-prone forms.

The agency receives a high level of assurance of their customers identities, reduce fraud, and increase accuracy by eliminating intermediate transcriptions.

8. Although supplemented by superior technology in every other facet of society, the facsimile ("fax") machine still finds use in many Court systems, where they have the same weight as original hard copy documents. This is understandable, as emails and PDF documents are subject to interception, hacking, and other fraudulent activity (motivation); fax transmissions can be traced back to a phone number, which is associated with a verified identity (the phone company account holder).

The DIGID management system 100 can be used to secure PDF documents for transmission and subsequent verification, providing a long-lived, high assurance authentication mechanism which proves that the document was legitimately produced. In this application, the ID holder 20 places an un-encrypted DIGID within the "attachment" PDF field, and uses their DIGID certificate to digitally sign the PDF. Without the burden of managing a national-scale PKI over long durations, DIGID management system 100 can allow any court, who trusts the IDSM 110, to validate that the PDF signer had an authentic identity document. Both PDF signing and attachments are part of the standard, however the application of a physical document based DIGID to both fields is novel.

9. With an increasing number of jurisdictions requiring employee verification, the burden has fallen to employers to process numerous forms of identification. The invention provides a way to offload and offline that work directly to the employee, such that all verifications can be completed from the comfort of the ID Holder's (20) home—and in fact, prior to the application phase of the hiring process. Once the necessary level of assurance has been reached, the DIGID could be used to submit a resume, or presented and verified at the hiring office. A similar application exists in voter verification, which differs only in the relying party (vendor 50).

10. Outside of the government space, methods of the DIGID management system 100 of the present disclosure are equally applicable to the authentication problems faced by any internet enabled application—from dating services to online auctions, there is a universal need for a service provider to authenticate their customers. As described herein, the DIGID management system 100 of the present disclosure is applicable in any holder-verifier situation, where electronic communication is acceptable.

11. Another private sector application for the DIGID management system 100 of the present disclosure is fake news prevention. In recent years there has been an uptick in awareness at the ease of which internet content, and broadcast media who retransmits it, can be manipulated by a relatively small and low budget corps of bad actors. The DIGID management system 100 of the present disclosure would be of great use to social media companies (vendor 50) in verifying users (20) and advertisers to reduce incidents of abuse. In this case, the platform acts as the vendor 50 and the prospective user as the ID holder 20. A DIGID is prepared that is used to link the user's device 120 to their new social media account. Periodic re-verification (even if silent and automated by sufficient "selfie" volume) may further re-enforces the identity.

Figure 10:
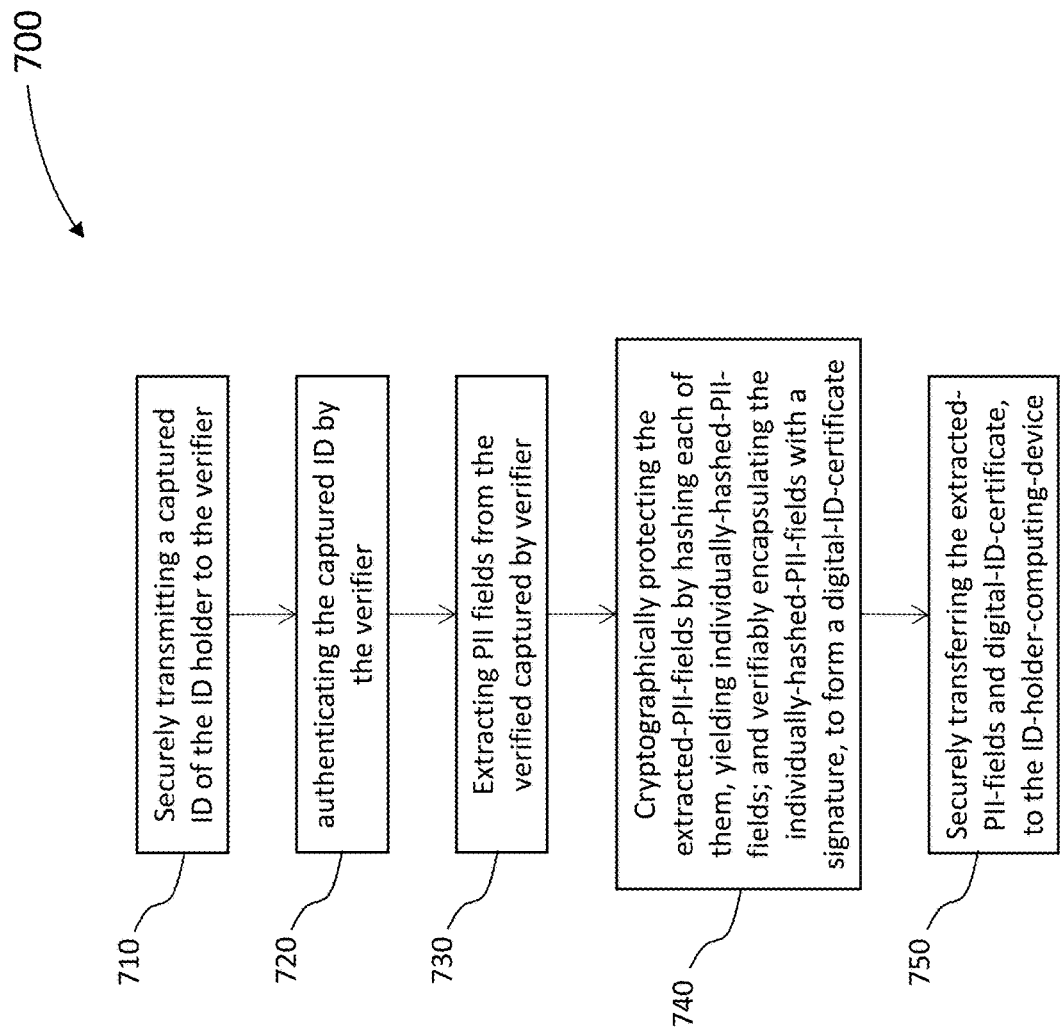
FIG. 10 is a flow diagram of a method for creating of a non-reputable digital record of an ID document of an ID holder, by a verifier server, according to aspects of the present disclosure.

Reference is now made to FIG. 10, illustrating a flow diagram of a process 700 for creating of a non-reputable digital record of an ID document of an ID holder 20, by a verifier server 180 and stored on an ID-holder-computing-device 120 associated with ID holder 20.

In step 710, ID holder 20 sends, via digital ID app 122, to verifier server 180 a captured ID of the ID document, such as captured ID 22.

In step 720, verifier server 180 authenticates the validity of the captured ID, yielding an authenticated-captured-ID.

In step 730, verifier server 180 extracts PII fields from the authenticated-captured ID, to yield extracted-PII-fields 510.

In step 740, verifier-server 180 cryptographically protects the extracted-PII-fields 510 as follows:
a. individually hashing each one of the extracted-PII-fields 510 to form respective individually-hashed-PII-fields; and
b. verifiably encapsulating the individually-hashed-PII-fields, along with an ID-holder-public key, with a signature, to form a digital-ID-certificate 520.

In step 750, verifier-server 180 securely transfers the extracted-PII-fields and the digital-ID-certificate 520 the ID-holder-computing-device 120 of the ID holder 20.

Figure 9:
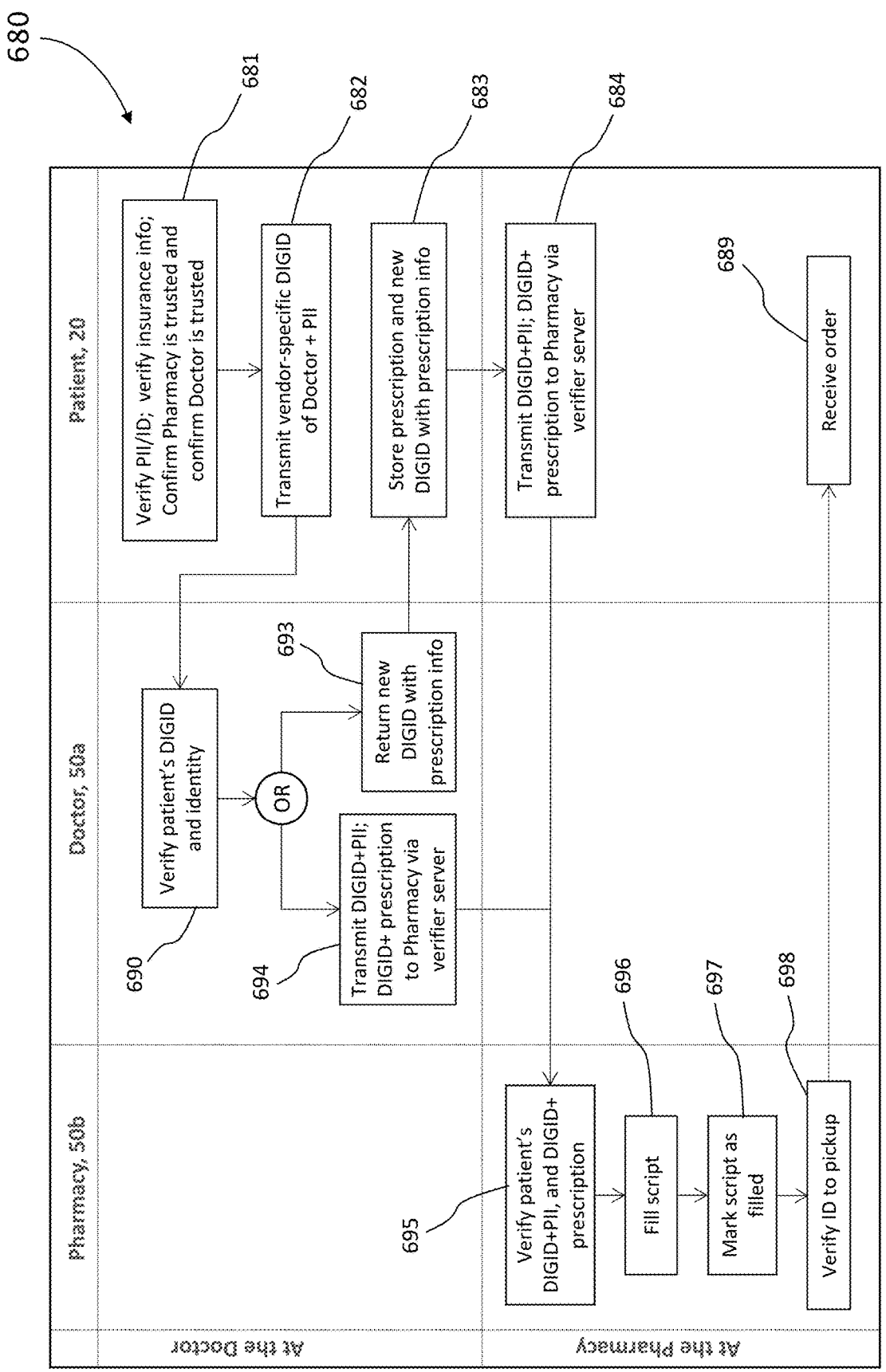
FIG. 9 is a two-dimensional flow diagram the process shown in FIGS. 8A-8C, according to aspects of the present disclosure.
Figure 11:
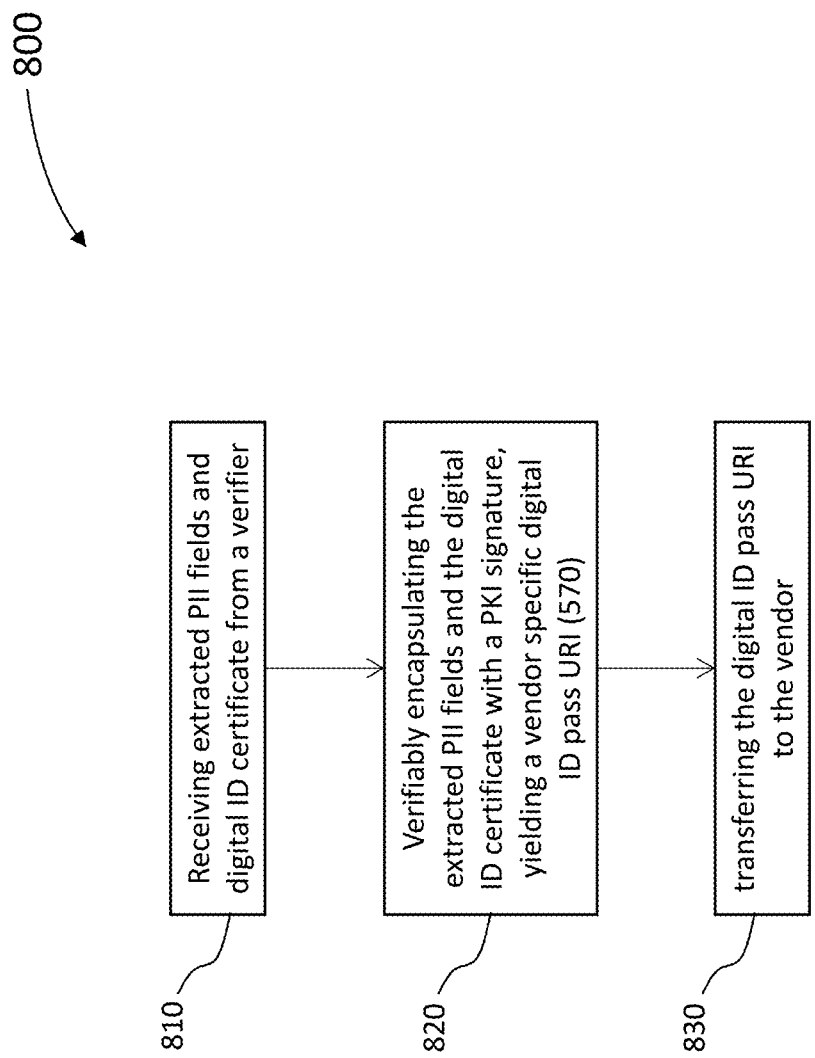
FIG. 11 is a flow diagram of a mutual identity verification and interaction process between an ID holder and a vendor, from the viewpoint of an ID-holder-computing-device that is associated with the ID holder, according to aspects of the present disclosure.

Reference is now made to FIGS. 9-11, showing example flow charts such that each flow charts views the processes of the present disclosure, from a focal point of a selected device/server participating in the processes.

FIG. 11 is a flow diagram of a mutual identity verification and interaction process 800 between an ID holder 20 and a vendor 50, using also digital-ID-management system 100, from the point of view of an ID-holder-computing-device 120 associated with ID holder 20.

In step 810, after ID holder 20, that intends to interact with (requiring sharing of the digital ID of ID holder 20), has launched digital ID app 122 on ID-holder-computing-device 120, ID holder 20 received extract PII fields and a digital-ID-certificate from a respective verifier server 180. This is typically done via IDSM 110 that transfers (step 464) a vendor-specific digital ID code 568 to ID app 122.

In step 820, DIGID app 122 verifiably encapsulating the extract PII fields and the digital-ID-certificate with a PKI signature, yielding a digital ID pass 570, which digital ID pass 570 is transferred to vendor 50 in step 830.

Figure 12:
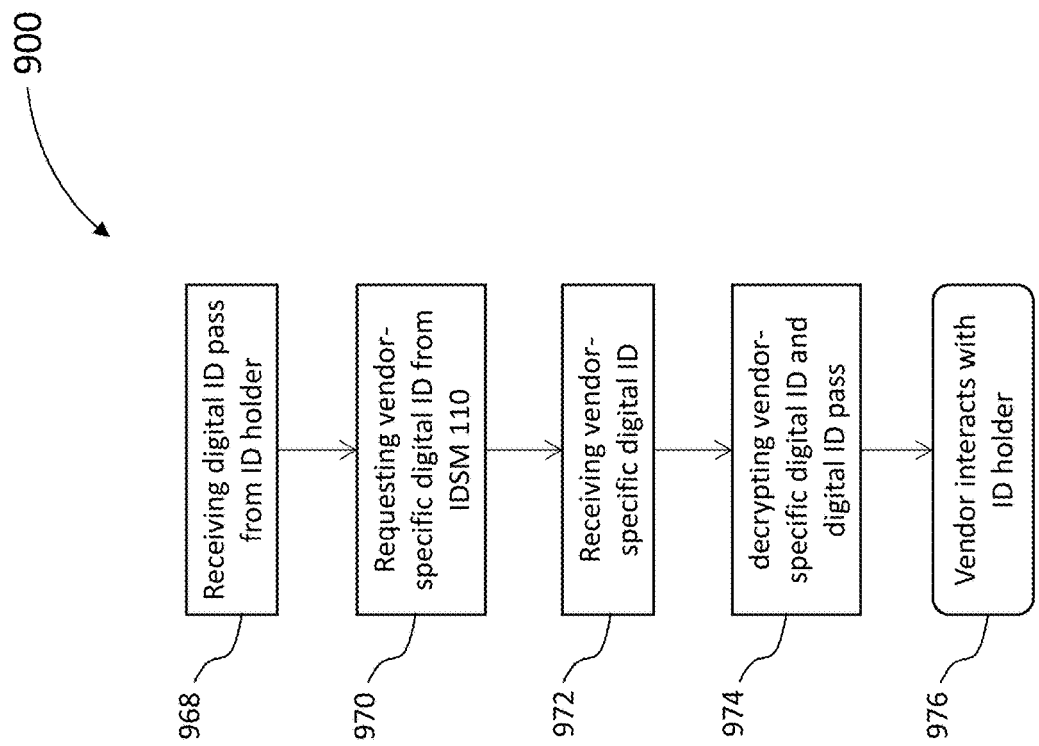
FIG. 12 is a flow diagram of a mutual identity verification and interaction process between an ID holder and a vendor, from the viewpoint of a vendor-computing-device that is associated with the vendor, according to aspects of the present disclosure.

FIG. 12 is a flow diagram of a mutual identity verification and interaction process between 900 an ID holder 20 and a vendor 50, from the viewpoint of a vendor-computing-device 150 that is associated with vendor 50, according to embodiments of the present disclosure. In order to invite an ID holder 20 to interact with vendor 50, vendor 50 publicly displays a unique vendor URI 328 near each entrance to the business location of vendor 50.

In step 968, vendor 50 receives a digital ID pass URI 570, represented as a QR code 600 that is QR code 600 is to be presented by ID holder 20 to the vendor 50.

In step 970, the vendor-specific digital ID code 568 extracted from the digital ID pass URI 570 is presented by to IDSM 110 so as to receive for download the vendor-specific digital ID 560.

In step 972, vendor app 152 receives the vendor-specific digital ID 560 from IDSM 110.

In step 974, vendor app 152 decrypts vendor-specific digital ID and digital ID pass to thereby extract the requested PII fields 230, facilitating ID holder 20 and a vendor 50 to interact (step 976).

Figure 13:
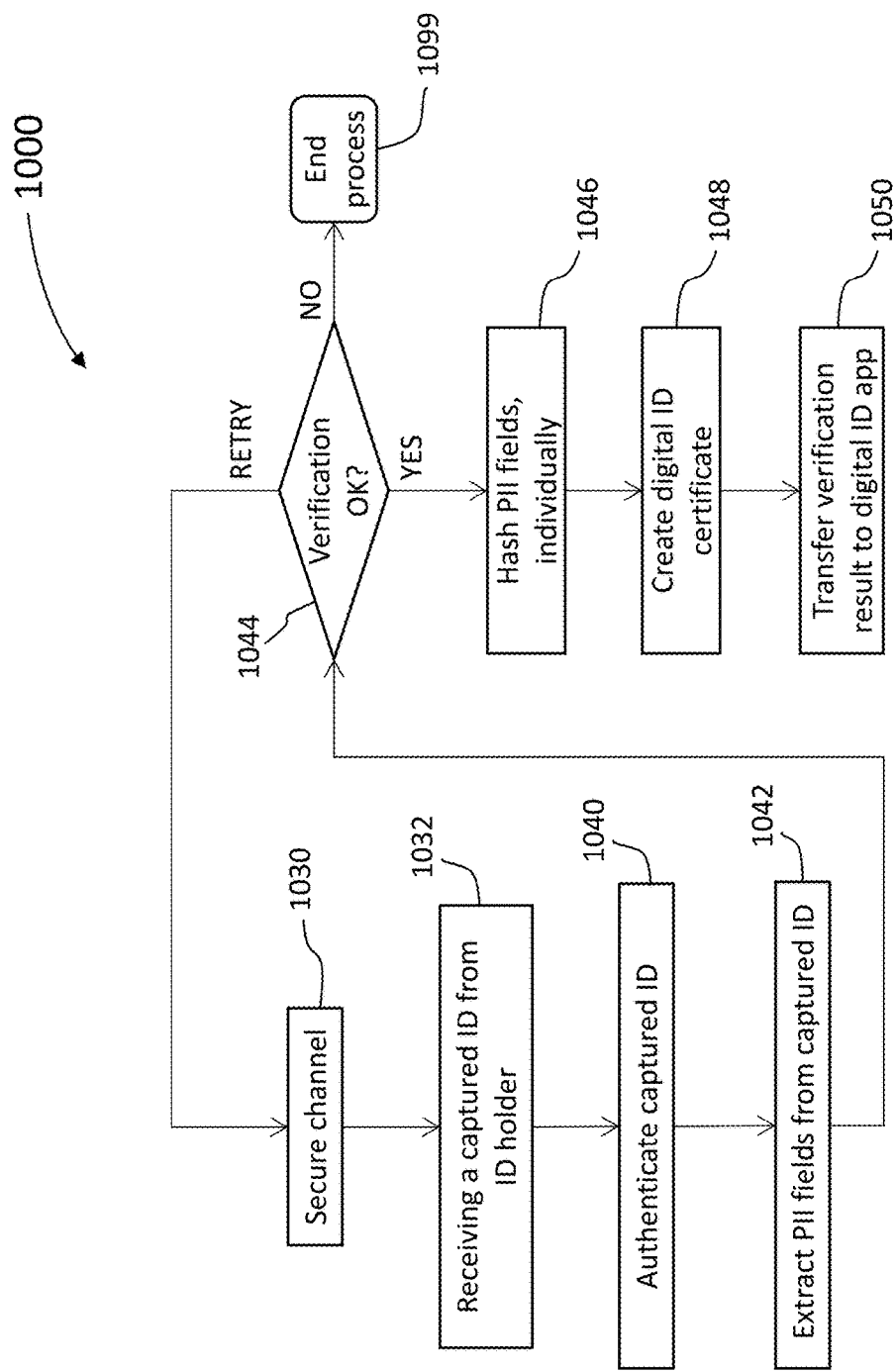
FIG. 13 is a flow diagram of a cryptographically protecting process of individually hashed PII fields and DIGID certificate, from the viewpoint of a verifier-server, according to aspects of the present disclosure.

FIG. 13 is a flow diagram of a cryptographically protecting process 1000 of individually hashed PII fields and DIGID certificate, from the viewpoint of a verifier-server 180, according to embodiments of the present disclosure.

In step 1030, a secure channel is established between ID-holder-computing-device 120 and a verifier-server 180.

In step 1032, verifier-server 180 receives a captured ID from digital ID app 122.

In step 1040, verifier server 180 analyzes the captured ID to extract and authenticate the included information. Additionally, verifier server 180 detects security features in the captured ID to determine if the ID is genuine, counterfeit or has been altered.

In step 1042, verifier server 180 extracts PII fields 510, each including PII field names (PII FN) 232 and corresponding PII field values (PII FV) 512, wherein PII fields 510 are extracted from alphanumeric text, barcodes, photographs, encoded biometric information including fingerprints, voice prints, and retinal scans (eyeprints), and other types of information in the captured ID.

If verifier server 180 fails (step 1044) process 1000 then terminates at step 1099.

In step 1046 the extracted-PII-fields 510 are each individually hashed by verifier server 180 to form hash values 522. Since many of the PII fields 510 are low entropy values, each of PII fields 510 are preferably hashed using HMAC (hash-based message authentication code) wherein the PII field 510 to be hashed is hashed with a respective server-generated nonce value 514 to form a hashed PII field 522. The nonce generation is preferably performed using a cryptographically secure pseudo-random number generator (PRNG). Optionally one nonce is generated and the others are derived using a hash tree (Merkel tree).

In step 1048 verifier server 180 assembles the contents for digital-ID-certificate 520 including: public key 524 of ID holder 20 known to correspond to the private key 129 stored in an addressable memory location in user secure element 127 on ID-holder-computing-device 120; and hash values 522 placed in a certificate extension. Verifier server 180 then digitally signs digital-ID-certificate 520 including the extension using verifier server 180 private key 189. The signed digital-ID-certificate 520 also includes certificate metadata 528 necessary for signature validation including but not limited to issuer name, serial number, validity period, and signature algorithm.

In step 1050 verification result 500 (FIG. 5A) is sent by verifier server 180 back to digital ID app 122 over the secured mutually authenticated connection set up in step 1030. Verification result 500 includes: the digitally signed digital-ID-certificate 520, and separately the complete collection of PII fields 510 each with corresponding nonce value 514 and the verifier name (VN) 231 of the verifier that verified the PII fields 510 forming verifier-PII-field-arrays 516. Once the verification result 500 has been sent by verifier server 180, verification result 500 is completely erased from verifier server 180. Thus, no PII fields, nonce values or any related data are stored in an addressable memory location on verifier server 180.

Parts of processes 400a and 400b may be implemented using alternative methods. Optionally the certificates issued to verifier servers 180 (alternative to step 214) and stored in an addressable memory location on IDSM 110 are not public internet TLS certificates, but are instead "ID-signing certificates" created using an arbitrary PKI run by the digital-ID provider, or independently by each verifier server 180. In such an arrangement:

ID holder 20 uses the public DNS and Internet PKI to establish a secure (one-way, server authenticated) connection to the IDSM 110 URL, and retrieve the verifier-profile 220 for the desired verifier server 180.

The verifier-profile 220 contains the ID-signing-certificates which declare the name 231 of the verifier that uses them. The verifier name may be a host name. As above, these ID-signing-certificates are not the certificates used to establish a secure channel.

It should be noted that in the method of the embodiment shown in FIG. 2B, the results in a smaller payload size, since it does not need to include certificates within the verifier-profile 220. However, that method has a lower level of assurance, because of the low bar ($0-$100) to chain into the Internet PKI, and there is an implicit trust in the DNS, which has yet meaningfully to transition to DNSSEC (Domain Name System Security Extensions). It should be noted that it also cannot be validated offline.

As an alternative to the HMAC of step 446 described above, simple or salted hashing may be used. however, the low entropy of the PII fields would allow a brute-force attack to disclose PII without the consent of ID holder 20. Another alternative to HMAC is to protect each PII field 510 using an independent asymmetric-key signature (IAKS), providing the confidentiality of HMAC with less overhead, as there is no need to for transmitting of a separate nonce 514 for each PII field 510. To use IAKS without potentially compromising the private key through a chosen plaintext attack, the signature algorithm must still be provided with an input of sufficient entropy (the common-claim-set), as described below.

Figure 14:
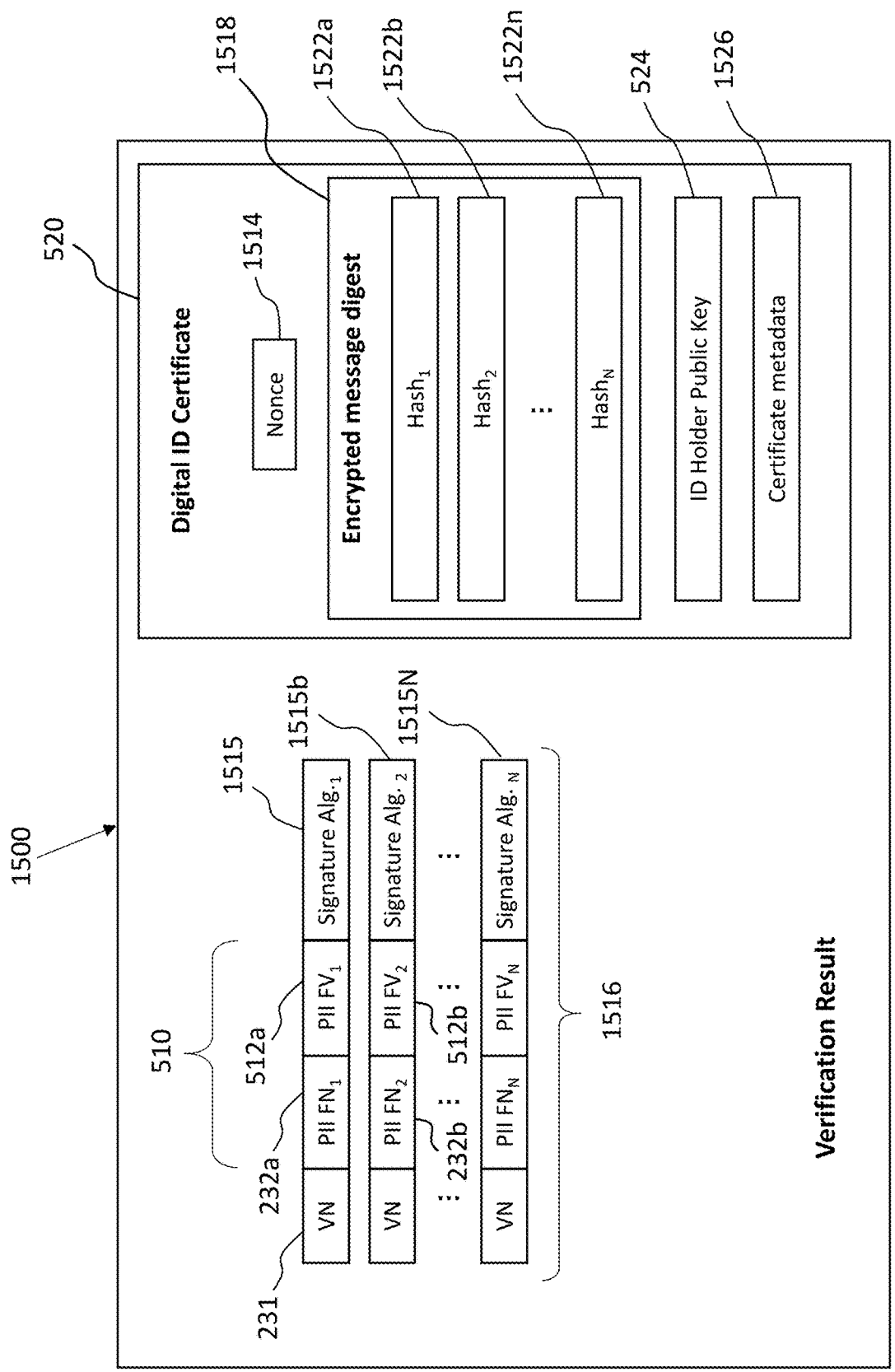
FIG. 14 is an example block diagram of a verification result, according to embodiments of the present disclosure, using an independent asymmetric-key signature (IAKS), according to aspects of the present disclosure.
Figure 15:
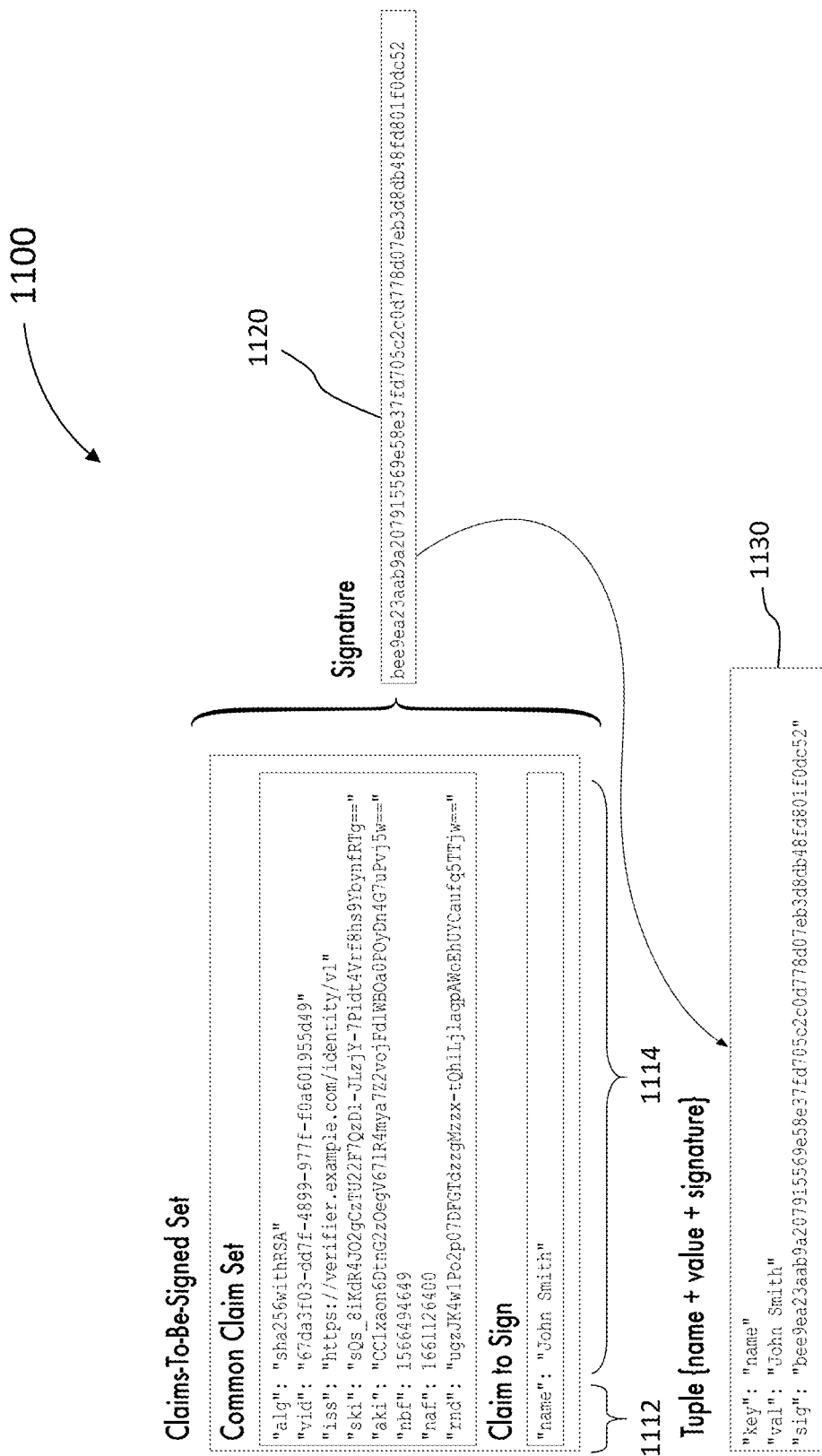
FIG. 15 depicts screen shots during an example creation of a tuple {PII-field-name+PII-field-value+signature} in a verification result container, according to aspects of the present disclosure.

FIG. 14 illustrates an example block diagram of a verification result 1500, according to embodiments of the present disclosure, using an independent asymmetric-key signature (IAKS). For use of independent asymmetric-key signatures, verifier server 180 may perform the following alternative steps (alternative to steps 446 and 448) during certification:

1. Certify steps:
   1.1. Prepare a high-entropy verification identification common-claim-set. This data is the serialization (e.g. JSON for JWT, or alternately DER ASN.1, or XML for XMLDSIG, etc.) of a combination of attributes (key-value pairs, properties, elements) unique to the issuance of a digital ID certification step 448), including:
      1.1.1. a description of the protecting algorithm (e.g. "RS256" or "Sha256withRSA" or "1.2.840.113549.1.1.11"),
      1.1.2. a description of the verification transaction (e.g. a transaction number),
      1.1.3. a description of the ID-holder 20 (e.g. a public-key fingerprint, SPKI, digital certificate);
      1.1.4. a description of the verification server 80 (public-key fingerprint, URL, IP address, etc.);
      1.1.5. validity period (not before, not after, next available),
      1.1.6. a timestamp;
      1.1.7. a common-to-all-PII-fields nonce 1514 (may be client-supplied, server supplied, or combination) to achieve suitable entropy.
   1.2. Create the verification result 1500 container (initially empty) and then, for each to-be-certified PII field:
      1.2.1. Create a "claims-to-be-signed-set" (CTBS) 1110 (see example in FIG. 15) that is the union of attributes from (i) the common-claim-set, and (ii) the singleton set of the attribute {current pair of PII-field-name 1112+PII-field-value 1114};
      1.2.2. Compute the digital signature 1110 over the CTBS 1110, as follows:
         1.2.2.1. Compute the cryptographic message digest over the canonicalization of the CTBS 1110;
         1.2.2.2. Perform private-key encryption over the message digest result using the verifier private key 1526;
      1.2.3. Store the tuple 1130 {PII-field-name 1112+PII-field-value 1114+signature 1120} in the verification result container.
   1.3. Complete the verification response, for example using JWT (for alternative methods: DER would use CMS/RFC5652, XML would use the XMLDSIG W3C Rec):
      1.3.1. The JWT header includes the signing algorithm and verification server certificate (i.e. with public key corresponding to the private key used in the signatures) in its entirety or by reference via a key identifier and JWKS URI;
      1.3.2. The JWT body includes the verification result, the common-claim-set, and other claims as needed to achieve compatibility with standards-interoperable systems (e.g. iss, sub, iat, aud, exp, etc., . . . as defined in RFC7523 for JWT);
      1.3.3. The JWT signature computed according to the standard specified by the signing algorithm;

Thus, with IAKS, the DIGID (alternative to step 448) does not require a DIGID certificate, since the DIGID is independently signed. Vendor-specific DIGID 560 is encrypted using the ID-signing-certificates from the verifier-profile 220. Regardless of the establishment of the secure channel (step 430), only private keys corresponding to public keys in the verifier-profile 220 may decrypt the request, which authenticates the verifier server 180 independently of the secure channel. The DIGID-certificate (step 448) may be a JOSE (JavaScript Object Signing and Encryption) object, CMS object, or XML file.

The ID verification result 1500, including the ID-holder-computing-device 120 public key 524 (step 450), is signed as above (step 452) using the ID-holder-computing-device 120 private key 129, allowing the verifier server 180 to authenticate the ID holder 20 and future verifiers (or vendors) to authenticate the vendor-specific DIGID 560. The verification result is then transmitted to the DIGID app 122 (step 450).

To transmit a subset-of-certified PII-fields to the vendor 50, where these have been hashed using IAKS (alternative to steps 460-474), DIGID app 122 performs the following steps:

2. Transmit steps:
   2.1. Creates a subset-of-verified-claims token, including:
      2.1.1. The common-claim-set;
      2.1.2. The reduction of tuples 1130 in the verification result container to a subset which includes only the elements with the requested PII-field-names, and the further reduction of each tuple {PII-field-name 1112+PII-field-value 1114+PII-field-signature 1120} in the subset to the attribute {PII-field-name 232+PII-signature 512};
      2.1.3. The user-device certificate identifier; {PII-field-name 232+PII-field-signature} attribute (if option 1.1.3 was exercised in the verification procedure as is preferable);
   2.2. Optionally: digitally signs this token using an external signature service, providing the claims and some other authentication (as, for example. in the OAuth 2 "/authorize" API) in exchange for the signature.
   2.3. Creates the vendor-specific DIGID (similar to 560):
      2.3.1. Concatenates:
         2.3.1.1. The subset-of-verified-claims token; and
         2.3.1.2. The PII-claims-subset, being the reduction of tuples in the verification result container to a subset of certified PII-fields, which includes only the requested PII-fields, (as in 2.1.2), and the further reduction of each tuple {PII-field-name 1112+PII-field-value 1114+PII-field-signature 1120} in said subset to the attribute {PII-field-name 232+PII-field-value 512};
      2.3.2. Digitally sign the result of 2.3.1 with the private key 129 of the ID-holder-computing-device 120;
      2.3.3. Appends:
         2.3.3.1. The user device certificate (of transmit step 2.3.2), and 2.3.3.2. The verifier certificate (certify step 1.3.1) or identifier to the result of 2.3.2; and 2.3.4. Encrypts the result of 2.3.3 using the certificates from the verifier-profile 220.

The resulting vendor-specific-digital-ID 560 may be transmitted and stored without additional protection, but it preferably should be transmitted over a secure channel. This channel does not require client (user device) authentication to maintain the integrity or security of the system.

To verify the received vendor-specific DIGID 560, the vendor app 152 will:

2.4. Extract the subset-of-verified-claims token and PII-claims-subset, using one private key, corresponding to one of N public keys stored in an addressable memory location in the vendor profile, to decrypt the vendor-specific-digital-ID;

2.5. If transmit option 2.2 was exercised, the subset-of-verified-claims token can be independently verified here using information added by the external signature/authorization service;

2.6. Verify the digital signature of transmit step 2.3.1 with the user device certificate of transmit step 2.3.3.1 to ensure that the ID-holder-computing-device 120 transmitted this vendor-specific digital ID 560;

2.6.1. Verify the user device certificate matches that to which the digital-ID was issued to (via identification of certification step 1.1.3);

2.6.2. Verify that the current time is within the validity period of user device certificate.

2.7. Verify each of the PII-fields 510 in the subset-of-verified claims (PII fields) by:

2.7.1. Verifying the current time is within the validity period of certification step 1.1.6;

2.7.2. Verifying the verifier identification of certification step 1.1.4 matches the verifier certificate (of transmit step 2.3.3.2);

2.7.3. Verifying that the verifier certificate (of transmit step 2.3.3.2) is trusted, through PKI, pinned-certificate list, revocation checks, etc.

2.7.4. For each {PII-field-name 232+signature} of subset-of-verified-claims (transmit 2.1.2), and corresponding {PII-field-name 232+PII-field-value 512} of PII-claims-subset (transmit 2.3.1.2):

2.7.4.1. Recreate the CTBS 1110 that, as above, is the union of attributes from (i) the common-claim-set, and (ii) singleton set of the current {PII-field-name 232+PII-field-value 512} attribute;

2.7.4.2. Compute the message digest of the canonicalization of the CTBS;

2.7.4.3. Verify the digital signature, i.e. perform public-key encryption over the message digest result using the verifier public key of transmit step 2.3.3.2, and compare it to the corresponding signature string of certify step 1.2.2 (via transmit step 2.1.2).

It should be appreciated that the IAKS format optionally enables the all data objects: the vendor profile, a verification request, the verification result, and the vendor-specific DIGID 560 to all utilize a common container profile—varying only by which attributes are required to be included and which certificate(s) are used for signing and encryption. This approach provides an advantage in implementation simplicity and interoperability, especially when said container follows an established standard (JWT, XML, or CMS).

Optionally each PII element is individually signed to create independently verifiable tokens that are bundled together as the verification result (for example, as an array of JWT). The ID holder 20 can then share any subset of PII fields by sending the tokens encapsulating the required data. Optionally, to reduce the DIGID size the public key 526 of the verifier certificate 520 could be eliminated using an issuer URI and key identifier (the key being looked up when necessary during verification).

Other methods for ensuring trust in the verifiers are contemplated herein. The methods described above for trust of the verifier servers 180 are based on PKI, or centralized trust. An alternative is to use a peer-to-peer consensus algorithm, such as a proof of work (POW) or proof-of-stake (PoS) blockchain to non-reputably declare mutual trust relationships for verification of verifier servers 180. In this method, two or more verifier servers 180 establish a trust agreement policy. Periodically, each participating verifier server 180 will publish a record (via a cryptographic digest) to the blockchain including a digital signature over the public keys (or key identifiers) of the other verifier servers 180 that are trusted. For example, the verifier server 180 could publish a list of digital certificates, signed within a CMS object.

Over time, these records of mutual trust accumulate in the distributed storage system associated with the blockchain. To validate that a given verifier server 180 is authentic, a client surveys the archive of peer-to-peer certifications over a specific time period, and determines if the majority of other verifier servers 180 trust the verifier server 180 in question. This methodology encourages bilateral and multilateral agreements amongst upstanding verifier servers 180, and reputation considerations incentivize an established institution to scrutinize a new verifier before adding it into their list of trusted verifier servers 180.

There are several advantages to using blockchain in this application. First, the approach is completely decentralized, there is no single point of failure. There is an inherent record of verifier server 180 trust, so heuristics may be applied to further determine the authenticity of a verifier server 180 by integrating records over time. Assuming that a ID holder 20 already trusts the first verifier server 180 that they come into contact with (presumably during the course of a physical interaction, e.g. QR code, or through an authenticated TLS web session), this system is immune to the swarm attack (where a large number of fake verifiers are created to project an illusion of interconnectedness) because an inspection of the swarm's acyclic directed trust graph will share no (or very few) interconnections with the original verifier server 180.

Alternatives for protecting and certifying an ID holder 20 identity are contemplated herein. As described herein, the ID holder's 20 identity is protected locally on the ID-holder-computing-device 120 by two or more authentication factors, and certified by one or more third-party verifier servers 180, such that they may produce a Vendor-specific Digital ID 560 containing any subset of certified PII; and proof that the ID holder 20 is in control over the cryptographic token (e.g. a digital signature) is sufficient to demonstrate an authenticated interaction. It would be desirable to have a broadly accessible method for linking identity to behavior over time, without centrally storing behavioral data where it could be misused to unmask an individual or compromised. Since a record in the blockchain is considered to be permanent record, unchangeable once the block has achieved consensus (mined, etc.), the blockchain represents a method for linking identity to behavior over time.

In this method, the ID holder 20 periodically creates a digital private-key 129 signature over an agreed text, and enters it into the next block, to prove that the ID holder 20 had control over their private key at the time the next block was accepted. However, because the signature is the result of private key encryption, it contains no PII (it looks like any other hash value). When a vendor is verifying an ID holder's DIGID, they can examine historical blocks and uses the ID holder's public key to verify the signature of each proof-of-possession, and thus, determine without a trusted $3^{rd}$ party the history of the ID holder's 20 control-of-key.

The agreed text may be well known (such as a hash of the previous block) which has the advantage of being more difficult to forge, or may be kept secret which has the advantage of concealing the history of an ID holder 20 should their public key become generally available. Secret text may be randomly generated for maximum security. Optionally, the secret agreed text may be a hash of their geo-location (with additional entropy, and optionally signed by a location verifier), enabling the ID holder 20 to share at their option either (a) just the hash values, to allow verification of temporal history, or (b) the plain-text locations, to enable a special-temporal history verification. Verification efficiency can be improved if the ID holder 20 provides a list of block locations along with the agreed text.

A further improvement involves establishing a behavioral verification server (in the IDSM or external) which can serve many ID holders 20, grouping proof-of-possession updates into a single "roll call" file which is then hashed and inserted into a single block-chain record. Advantages of this approach include: (1) decouple an individual ID holder 20 identity from the record-fee payment wallet-ID, providing identity obfuscation to prevent deanonymization; (2) reduce cost of the record-keeping, as the cost of a blockchain-protected record is typically higher than the cost to host (DHT or server-based) a roll-call file and allows the cost of history-keeping to be deferred to the merchants rather than to the individual ID holders 20; and (3) further reduce the verification search space to only the roll-call files, which can be indicated in the DIGID by the ID holder 20 (file identifier, rather than the block identifier). The behavioral verification server can also provide location verification services (either signing an ID holder 20 specified location or obtaining a wireless provider location through a side channel) and network address verification, as a condition of accepting the possession record. To further decrease cost or increase throughput capacity, said "roll call" files may form their own blockchain by including a hash of the previous file; "bootstrapping" to a primary blockchain (cryptocurrency based, for instance) with one published file digest being recorded in the primary after N un-recorded "roll call" blocks are published—the cost of each "roll call" file published with this method is divided by N (compared to directly recording each published "roll call" file in the primary block chain).

The same system may also be applied to vendor devices, as a supplement to the distributed trust model as described above.

While certain embodiments of the inventions have been described, wherein these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for creating of a verification-result that is a non-reputable digital record of an identification (ID) document (ID-document) of an ID-holder, by a verifier-server, the method comprising the steps of:
   a. securely receiving, at said verifier-server, from an ID-holder-computing-device of said ID-holder, a captured-ID of said ID document;
   b. authenticating said captured-ID, by said verifier-server;
   c. generating personally identifiable information (PII) fields, by said verifier-server, each PII-field respectively being a computer-readable representative of PII in said captured-ID;
   d. generating PII-hash-pairs, by said verifier-server, by pairing each one of said PII-fields with a respective hash;
   e. generating individually-hashed-PII-fields, by said verifier-server, by individually hashing each PII-field with its respective hash;
   f. generating a verifier-server-signature, by said verifier-server, said verifier-server-signature being a cryptographic signature over said individually-hashed-PII-fields;
   g. generating a verification-result comprising said PII-hash-pairs, said individually-hashed-PII-fields and said verifier-server-signature, by said verifier-server;
   h. transmitting said verification-result from said verifier-server to said ID-holder-computing-device; and
   i. deleting, from said verifier-server, said PII-hash-pairs, said verification-result upon transmission of said verification-result.

2. The method of claim 1, wherein each said respective hash is salted with a nonce.

3. The method of claim 1, wherein said generating the verifier-server-signature comprises the steps of:
   a. receiving, at said verifier-server, an ID-holder-public-key being part of an asymmetric key pair comprising an ID-holder-private-key on the ID-holder-computing-device; and
   b. encrypting, by said verifier-server, said individually-hashed-PII-fields through asymmetric encryption using a verifier-server-private-key and said ID-holder-public-key.

4. A method for generating and transmitting a vendor-specific-DIGID using a digital ID (DIGID) system manager (IDSM), the method comprising the steps of:
   in a registration stage,
   a. generating of a verification-result, by a verifier-server, comprising the steps of:
      i. securely receiving, at said verifier-server, from an ID-holder-computing-device of said ID-holder, a captured-ID of said ID document;
      ii. authenticating said captured-ID, by said verifier-server;
      iii. generating personally identifiable information (PII) fields, by said verifier-server, each PII-field respectively being a computer-readable representative of PII in said captured-ID;
      iv. generating PII-hash-pairs, by said verifier-server, by pairing each one of said PII-fields with a respective hash;
      v. generating individually-hashed-PII-fields, by said verifier-server, by individually hashing each PII-field with its respective hash;

vi. generating a verifier-server-signature, by said verifier-server, said verifier-server-signature being a cryptographic signature over said individually-hashed-PII-fields; and vii. generating the verification-result comprising said PII-hash-pairs, said individually-hashed-PII-fields and said verifier-server-signature, by said verifier-server; and b. receiving, at said ID-holder-computing-device, said verification-result, in a configuration stage, upon said ID-holder encountering a vendor, a. requesting, by said ID-holder-computing-device, from said IDSM, a vendor-profile for said vendor;

b. receiving, at said ID-holder-computing-device, said vendor-profile comprising a list of required-PII-fields-names;

c. displaying, on said ID-holder-computing-device, said list of required-PII-field-names; and d. providing, on said ID-holder-computing-device, a digital-ID-app configured to allow said ID-holder to provide consent to share, with said vendor, a subset of said PII-fields associated with said list of required-PIT-field-names, in a DIGID response generation and transfer stage, upon said ID-holder consenting to share said required-PII-fields with said vendor, a. selecting, by said ID-holder-computing-device, a subset of said PII-hash-pairs comprising said subset of PII-fields associated with said list of required-PII-field-names;

b. generating an ID-holder-signature, by said ID-holder-computing-device, said ID-holder-signature being a cryptographic signature configured for verification of said subset of said PII-hash-pairs;

c. generating a vendor-DIGID-response, by said ID-holder-computing-device, said vendor-DIGID-response comprising said subset of PII-hash-pairs, said ID-holder-signature, said individually-hashed-PII-fields, and said verifier-server-signature;

d. generating said vendor-specific-DIGID, by said ID-holder-computing-device, said vendor-specific-DIGID comprising said vendor-DIGID-response; and e. transmitting, from said ID-holder-computing-device, said vendor-specific-DIGID to said vendor-computing-device.

5. The method of claim 4 further comprising the steps for verifying and displaying said vendor-specific-DIGID on said vendor-computing-device:

in a DIGID transfer stage,
a. receiving said vendor-specific-DIGID at said vendor-computing-device of said vendor, in a DIGID validation stage,
a. validating, on said vendor-computing-device, said subset of PII-hash-pairs with said ID-holder-signature;

b. validating, on said vendor-computing-device, said individually-hashed-PII-fields with said verifier-server-signature;

c. validating, on said vendor-computing-device, each PII-field in said subset of PII-hash-pairs by hashing each PII-field in said subset with a respective hash in a respective PII-hash-pair and comparing results from said hashing with said individually-hashed-PII fields; and d. displaying, by said vendor-computing-device, the status of validation and a summary of PII-field names and values in said subset of PII-hash-pairs.

6. The method of claim 4, wherein said generating of said vendor-specific-DIGID, comprising said vendor-DIGID-response, further comprises the steps of:

a. encrypting, by said ID-holder-computing-device, with a symmetric-key, said vendor-DIGID-response;

b. receiving, at said ID-holder-computing-device, a vendor-computing-device-public-key being part of an asymmetric key pair comprising a vendor-computing-device-private-key on said vendor-computing-device;

c. generating a wrapped-key, by said ID-holder-computing-device, by encrypting said symmetric-key with said vendor-computing-device-public-key and said ID-holder-private-key;

d. generating said vendor-specific-DIGID, by said ID-holder-computing-device, such that said vendor-specific-DIGID comprises said vendor-ID-response only as encrypted with said symmetric-key; and e. generating said vendor-specific-DIGID, by said ID-holder-computing-device, such that said vendor-specific-DIGID further comprises said wrapped-key.

7. The method of claim 4, wherein said requesting and receiving said vendor-profile is performed only if said vendor-profile is not known to said ID-holder-computing-device.

8. The method of claim 4, wherein said transmitting of said vendor-specific-DIGID, by said ID-holder-computing-device to said vendor-computing-device, comprises anonymously transmitting said vendor-specific-DIGID to said IDSM.

9. The method of claim 4, wherein said vendor-specific-DIGID generation and transfer stage is performed immediately after said configuration stage.

10. A method for generating and transmitting a vendor-specific-DIGID-pass for a user having an identification (ID) document (ID document), the user being an ID-holder, by a digital ID (DIGID) system manager (IDSM), the method comprising the steps of:

a. generating and transmitting said vendor-specific-DIGID as in claim 4;

b. receiving, at said IDSM, vendor-specific-DIGID;

c. generating, by said IDSM, a vendor-specific-DIGID-pass based at least in part on said vendor-specific-DIGID;

d. transferring said vendor-specific-DIGID-pass from said IDSM to an ID-holder-computing-device of said ID-holder;

e. providing said vendor-specific-DIGID-pass, to said vendor-computing-device, by said ID-holder-computing-device; and f. requesting and receiving said vendor-specific-DIGID, from said IDSM, by said vendor-computing-device.

11. The method of claim 10, wherein said generating of said vendor-specific-DIGID-pass comprises the steps of:

a. transferring, from said IDSM, to said ID-holder-computing-device, a vendor-specific-DIGID-code comprising an IDSM-address, said vendor-specific-DIGID-code corresponding to said vendor-specific-DIGID; and b. combining said vendor-specific-DIGID-code and said IDSM address to form said vendor-specific-DIGID-pass.

12. The method of claim 11, wherein said vendor-specific-DIGID-pass is provided in the form of a digital ID pass URI (Universal Resource Identifier).

13. The method of claim 11, wherein said requesting said vendor-specific-DIGID comprises the steps of:
   a. extracting said vendor-specific-DIGID-code from said vendor-specific-DIGID-pass; and
   b. requesting said corresponding vendor-specific-DIGID from said IDSM by said vendor-computing-device.

14. The method of claim 11, wherein said vendor-specific-DIGID-code is a cryptographic digest of said vendor-specific-DIGID.

15. The method of claim 14, wherein said IDSM retains a mapping of said vendor-specific-DIGID-code to said vendor-specific-DIGID.

16. The method of claim 4, wherein said vendor is an authority, a provider of services or a provider of goods that requires that said ID-holder provides a form of identification to said vendor.

17. The method of claim 1, wherein said captured-ID includes ID data selected from a group including:
   a. a scan of an ID document associated with said ID-holder;
   b. digital elements of an ID document associated with said ID-holder;
   c. geolocation of said ID-holder;
   d. a liveness test of said ID-holder;
   e. verifier-specific-PII-fields; and
   f. PII fields that are entered by said ID-holder.

18. The method of claim 1, wherein said authenticating said captured-ID comprises the step of detecting security features of said captured-ID to determine that said ID document is genuine.

19. The method of claim 4, wherein said receiving of said vendor-profile further comprising receiving said vendor-profile such that said vendor-profile further comprises verifier-names, each associated with a respective required-PII-field-name of said list of required-PII-field-names, and wherein each verifier-name is associated with a respective verifier-server.

20. The method of claim 4, further comprising steps performed by said ID-holder-computing-device as follows:
   a. checking whether said subset of PII-hash-pairs comprising said subset of PII-fields, associated with said list of required-PII-field-names, is stored in an addressable memory location on said ID-holder-computing-device;
   b. when at least one PII-hash-pair in said subset of PII-hash-pairs is not stored in an addressable memory location on said ID-holder-computing-device, determining, based on at least in part on said list of required-PII-field-names, at least one missing PII field and a verifier-name associated with said at least one missing-PII-field;
   c. requesting from said IDSM, a verifier-profile of a verifier identifiable by said verifier-name;
   d. receiving said verifier-profile comprising verifier-PII-requirements and PII-field-capture-instructions, and wherein said verifier-PII-requirements comprises a list of verifier-required-PII-field-names required to be shared by said ID-holder with said verifier for the purpose of verification;
   e. when said ID-holder consents to share PII associated with said list of verifier-required-PII-field-names, forming a second-captured-ID according to said PII field-capture-instructions; and
   f. transmitting said second-captured-ID to a second-verifier-server of said verifier;
   g. receiving, from said second-verifier-server, a second-verification-result comprising second-PII-hash-pairs, second-individually-hashed-PII-fields, and second-verifier-server-signature; and
   h. following said receiving of said second-verification-result, repeating steps a-g until, at step a, each PII-hash-pair, associated with every required-PII-field-name of said list of required-PII-field-names, is stored in an addressable memory location on said ID-holder-computing-device.

21. The method of claim 4, wherein said requesting a vendor-profile for said vendor comprises the steps of:
   a. acquiring a vendor universal resource identifier (URI) associated with said vendor by said digital-ID-app activated on said ID-holder-computing-device; and
   b. requesting said vendor-profile associated with said vendor URI from said IDSM.

22. The method of claim 4, wherein said generating of said vendor-specific-DIGID comprises the step of forming a signed PII-field-nonce-value-pairs by signing a combination of said PII-hash-pairs and at least one digital-ID-certificate using a symmetric key, having a first part and a second part, generated by said digital-ID-app activated on said ID-holder-computing-device.

23. The method of claim 22, wherein said symmetric key is wrapped using the public key of said vendor-computing-device, wherein the public key corresponds to a private key of said vendor-computing-device.

24. The method of claim 23, further comprising the steps of:
   a. unwrapping said symmetric key by said vendor-computing-device using said private key of said vendor-computing-device; and
   b. decrypting said combination of said PII-hash-pairs and said at least one digital-ID-certificate using said symmetric key.

25. The method of claim 22, further comprising the steps of:
   a. wrapping said first part of said symmetric key using the public key of said vendor-computing-device, wherein said public key corresponds to a private key of said vendor-computing-device; and
   b. providing a digital-ID-pass in the form of a digital-ID-pass-URI, wherein said second part of said symmetric key included in said digital-ID-pass-URI.

26. The method of claim 25, further comprising the steps of:
   c. unwrapping said first part of said symmetric key by said vendor-computing-device using said private key of said vendor-computing-device;
   d. extracting said second part of said symmetric key by said vendor-computing-device from said digital-ID-pass-URI;
   e. combining said first and second parts of said symmetric key to form said symmetric key; and
   f. decrypting said signed PII-field-nonce-value-pairs being a combination of said PII-hash value pairs and said at least one digital-ID-certificate using said symmetric key.

27. The method of claim 1, further comprising the steps of:
   a. verifiably encapsulating, at said verifier-server, said individually-hashed-PII-fields, with said verifier-server-signature using an asymmetric key encryption, by said verifier-server, forming individually-signed-PII-fields;
   b. combining, at said verifier-server, said individually-signed-PII-fields, thereby forming a digital-ID-certificate; and c. generating, at said verifier-server, said verification result comprising said digital-ID-certificate, and said PII-hash-pairs.

28. The method of claim 4, wherein said IDSM comprises at least one said verifier-server.

29. The method of claim 4, wherein said vendor sells alcoholic beverages and said ID-holder is required to authenticate his age.

30. The method of claim 4, wherein said ID-holder is a credit cardholder, said vendor is a merchant and said IDSM is an acquiring bank.

31. The method of claim 4, wherein said ID-holder bank account holder making a payment, said vendor is a merchant, wherein said account holder wishes to execute the payment transfer to the receiving bank of the merchant, and wherein said account holder generates a vendor-specific-DIGID addressed to the merchant, who can verify that the balance in the account of the account holder is available.

32. The method of claim 4, wherein said ID-holder uses a digital wallet, said vendor is a merchant, and said verifier-server is a wallet-verifier-server.

33. The method of claim 4, wherein said ID-holder is a healthcare related patient having confidential medical records that are stored in an addressable memory location on the ID-holder-computing-device of the patient, and wherein the patient can securely share, at their will, any of said confidential medical records with a third party.

34. The method of claim 4, wherein said ID-holder is a healthcare related patient a first vendor is a doctor, who issues a tamper-proof prescription to the ID-holder-computing-device of the patient; and a second vendor is a pharmacy chosen by the patient, wherein the practice is certified by the healthcare ecosystem.

35. The method of claim 4, wherein said ID-holder is a healthcare related patient having a subset of critical medical records stored in an addressable memory location on the ID-holder-computing-device of the patient,
wherein said subset of critical medical records is securely archived by a vendor;
wherein the patient agrees to supply said vendor with a subset of their medical information for use only in emergencies; and
upon an emergency, said subset of critical medical records is provided to a first responder of said vendor via said vendor-specific-DIGID.

36. The method of claim 35, wherein said subset of critical medical records comprises blood type and food allergies.

37. The method of claim 4, wherein said ID-holder is a ticket holder to an event, and said vendor is the owner of the facility hosting the event.

38. The method of claim 4, wherein said ID-document is a passport, said vendor-specific-DIGID is a non-reputable digital record of said passport, wherein the passport control and customs authorities are a first vendor verified by a first verifier server.

39. The method of claim 38, further comprising the steps of:
a. generating a second-vendor-specific-DIGID that is a non-reputable digital record of said passport; and
b. providing second-vendor-specific-DIGID to an airline booking system that is a second-vendor verified by a second verifier-server having a verifier-profile different than that of the passport control and customs authorities.

40. The method of claim 4, wherein said vendor is a social media company, said ID-holder is a prospective user of the social media and said vendor-specific-DIGID is configured to link the ID-holder-computing-device to their social media account.

41. A system for creating of a verification-result that is a non-reputable digital record of an identification (ID) document (ID document) of an ID-holder, by a verifier-server, the system, being a digital-ID-management system, comprises:
a. an ID-holder-computing-device associated with said ID-holder; and
b. at least one trusted verifier-server,
wherein said ID-holder-computing-device comprises an ID-holder-processor and non-transitory computer-readable medium in communication with said ID-holder-processor and comprising ID-holder-device-instructions stored thereon, that when executed by said ID-holder-processor, cause the ID-holder-computing-device to securely transmit, a captured-ID of the ID document and a public key to said verifier-server; and
wherein said verifier-server comprises a verifier-processor and non-transitory computer-readable medium in communication with said verifier-processor and comprising verifier-instructions stored thereon, that when executed by the verifier-processor, cause the verifier-server to:
a. authenticate said captured-ID received from said ID-holder-computing-device;
b. generate personally identifiable information (PII) fields, each PII-field respectively being a computer-readable representative of PII in said captured-ID;
c. generate PII-hash-pairs, wherein by pairing each one of said PII-fields with a respective hash, wherein each said respective hash can be salted with a nonce;
d. generate individually-hashed-PII-fields by individually hashing each PII-field with its respective hash;
e. generate a verifier-server-signature, said verifier-server-signature being a cryptographic signature over said individually-hashed-PII-fields;
f. generate a verification-result comprising said PII-hash-pairs, said individually-hashed-PII-fields and said verifier-server-signature;
g. transmit to said ID-holder-computing-device said verification-result; and
h. delete said PII-hash-pairs, said verification-result upon transmission of said verification-result.

42. The digital-ID-management system of claim 41, wherein said verifier-instructions, when executed by said verifier-processor, further cause the verifier-server to verifiably encapsulate of said individually-hashed-PII-fields with a signature using an asymmetric-private-key encryption.

43. The digital-ID-management system of claim 41, wherein said verifier-instructions, when executed by said verifier-processor, further cause the verifier-server to verifiably encapsulate of said individually-hashed-PII-fields with a signature, jointly and severally, using an asymmetric key encryption.

44. The digital-ID-management system of claim 41, wherein said ID-holder-device-instructions, when executed by the ID-holder-device-processor, further cause the ID-holder-computing-device to transfer a mutually agreed subset of said individually-hashed-PII-fields to a vendor-computing-device associated with said vendor, to thereby facilitate secure interaction between said ID-holder and a vendor.

45. The digital-ID-management system as in claim 44, further comprising:
a digital ID (DIGID) system manager (IDSM); and
at least one said vendor-computing-device, wherein said ID-holder-device-instructions, when executed via a digital-ID-app by said ID-holder-processor, further cause the ID-holder-computing-device to:
   a. receive consent from said ID-holder to share required PII fields with said vendor;
   b. upon receiving consent, request a vendor-profile for said vendor from said IDSM;
   c. receive said vendor-profile, from said IDSM, at said ID-holder-computing-device, wherein said vendor-profile comprises:
      i. a list of required-PII-fields required to be shared with said vendor, in order to interact therewith; and
      ii. at least one public key of a vendor-computing-device associated with said vendor;
   d. upon receiving consent, generate and send a vendor-specific-DIGID to said IDSM, wherein said vendor-specific-DIGID comprises:
      i. a subset of said individually-hashed-PII-fields encrypted with the private key of said ID-holder-computing-device, wherein said subset of said individually-hashed-PII-fields is respectively compatible with said required-PIT-fields; and
      ii. a digital-ID-certificate encrypted with said at least one public key of said vendor-computing-device; and
   e. transfer said vendor-specific-DIGID to said vendor-computing-device, wherein said vendor-computing-device comprises a vendor-processor and non-transitory computer-readable medium in communication with said vendor-processor comprising vendor-instructions thereon, that when executed by said vendor-processor, cause the vendor-computing-device to:
      i. extract said subset of individually-hashed-PII-fields from said vendor-specific-DIGID, to form a temporary subset of individually-hashed-PII-fields; and
      ii. validate said selected subset of extracted PII-fields using said individually-hashed-PII-fields extracted from said digital-ID-certificate and said temporary subset of individually-hashed-PII-fields, to thereby facilitate secure interaction between said ID-holder and said vendor.

46. The digital-ID-management system as in claim 45, wherein said ID-holder-device-instructions, when executed by said ID-holder-processor, further cause the ID-holder-computing-device to request and receive said vendor-profile only if said vendor-profile is not known to said digital-ID-app.

47. The digital-ID-management system as in claim 45, wherein said ID-holder-device-instructions, when executed by said ID-holder-processor, further cause the ID-holder-computing-device to transfer said mutually agreed subset of said individually-hashed-PII-fields to said vendor as follows:
   a. request a vendor-profile for said vendor from said IDSM;
   b. receive said vendor-profile, from said IDSM, wherein said vendor-profile comprises a list of said subset of said PII fields required to be shared with said vendor;
   c. upon receiving consent, generate a vendor-specific-DIGID comprising said subset of individually-hashed-PII-fields;
   d. transmit said vendor-specific-DIGID to said IDSM;
   e. receive, from said IDSM, a digital-ID-pass corresponding to said vendor-specific-DIGID;
   f. provide said digital-ID-pass to said vendor-computing-device,
   wherein said vendor-instructions, when executed by said vendor-processor, further cause the vendor-computing-device to:
      i. request said vendor-specific-DIGID corresponding to said digital-ID-pass from said IDSM;
      ii. receive said vendor-specific-DIGID from said IDSM; and
      iii. extract said subset of individually-hashed-PII-fields from said vendor-specific-DIGID.

48. The digital-ID-management system of claim 47, wherein said vendor-specific-DIGID comprises:
   a. PII field-nonce value pairs each comprising:
      i. one of said PII fields; and
      ii. a nonce value; and
   b. at least one said digital-ID-certificate comprising said individually-hashed-PII-fields, each comprising a hash value of one of said PII field-nonce value pair.

49. The digital-ID-management system of claim 48, wherein said vendor-instructions, when executed by said vendor-processor, further cause the vendor-computing-device to calculate hash values of said PII field-nonce value pairs and compare each calculated hash value with each of said cryptographically certified hash values to thereby validate said subset of cryptographically protected PII fields.

50. The digital-ID-management system of claim 48, wherein said verifier-instructions, when executed by said verifier-processor, further cause the verifier-server to cryptographically protect by generating a different nonce value for association with each of said PII fields to form said PII field-nonce value pairs.

51. The digital-ID-management system of claim 41, wherein said captured-ID includes ID data selected from the group including:
   a. a scan of an ID document associated with said ID-holder;
   b. digital elements of an ID document associated with said ID-holder;
   c. geolocation of said ID-holder;
   d. a liveness test of said ID-holder;
   e. verifier-specific-PII-fields; and
   f. PII fields that are entered by said ID-holder.

52. The digital-ID-management system of claim 41, wherein said verifier-instructions, when executed by said verifier-processor, further cause the verifier-server to authenticate said captured-ID by detecting security features of said captured-ID to determine that said ID document is genuine.

53. The digital-ID-management system of claim 47, wherein said list of said subset of cryptographically protected PII fields in said vendor-profile further comprises a verifier-name associated with each PII field, wherein each verifier-name is associated with a respective verifier.

54. The digital-ID-management system of claim 53, wherein said ID-holder-device-instructions, when executed by said ID-holder-processor, further cause the ID-holder-computing-device to:
   a. check whether said subset of individually-hashed-PII-fields is stored in an addressable memory location on said ID-holder-computing-device;
   b. when at least one of said individually-hashed-PII-fields is not stored on said ID-holder-computing-device, define at least one missing PII field and determine the verifier-name associated with said at least one missing PII field;

c. request a verifier-profile for said determined verifier-name associated with said at least one missing PII field from said IDSM, wherein said verifier-profile comprises verifier-PII-requirements and PII fields capture instructions, and wherein said verifier-PII-requirements comprises a list of verifier-required-PII-fields required to be shared by said ID-holder with said respective verifier;

d. when said ID-holder consents to share said verifier-required-PII-fields, form a captured-ID according to said PII fields capture instructions;

e. transmit said captured-ID to said verifier-server for said authenticating, extraction, and cryptographic protection of said verifier-required-PII-fields; and f. following said transferring said cryptographically protected PII fields to said ID-holder-computing-device, repeat steps a-f until all required PII fields are authenticated, extracted, and cryptographically protected.

55. The digital-ID-management system of claim 45, wherein said ID-holder-device-instructions, when executed by said ID-holder-processor, further cause the ID-holder-computing-device to requesting said vendor-profile following the steps of:

a. acquiring a vendor URI associated with said vendor by said digital-ID-app; and b. requesting said vendor-profile associated with said vendor URI from said IDSM.

56. The digital-ID-management system of claim 47, wherein said ID-holder-device-instructions, when executed by said ID-holder-processor, further cause the ID-holder-computing-device to:

a. receive a vendor-specific-DIGID-code corresponding to said vendor-specific-DIGID from said IDSM; and b. create and providing said digital-ID-pass to said vendor, wherein said digital-ID-pass corresponds to said vendor-specific-DIGID-code.

57. The digital-ID-management system of claim 56, wherein said digital-ID-pass is provided in the form of a digital-ID-pass URI.

58. The digital-ID-management system of claim 56, wherein said ID-holder-device-instructions, when executed by said ID-holder-processor, further cause the ID-holder-computing-device to request said vendor-specific-DIGID following the steps of:

a. extracting said vendor-specific-DIGID-code from said digital-ID-pass; and b. requesting said corresponding vendor-specific-DIGID from said IDSM by said vendor-computing-device.

59. The digital-ID-management system of claim 56, wherein said vendor-specific-DIGID-code is a cryptographic digest of said vendor-specific-DIGID.

60. The digital-ID-management system of claim 48, wherein said ID-holder-device-instructions, when executed by said ID-holder-processor, further cause the ID-holder-computing-device to generate said vendor-specific-DIGID by further signing a combination of said PII field-nonce value pairs and at least one digital-ID-certificate using a symmetric key, having a first part and a second part, generated by said digital-ID-app.

61. The digital-ID-management system of claim 60, wherein said symmetric key is wrapped using the public key of said vendor-computing-device wherein said public key corresponds to a private key of said vendor-computing-device.

62. The digital-ID-management system of claim 60, wherein said vendor-instructions, when executed by said vendor-processor, further cause the vendor-computing-device to extract of said PII fields following the steps of:

a. unwrapping said symmetric key by said vendor-computing-device using said private key of said vendor-computing-device; and b. decrypting said combination of said PII field-nonce value pairs and said at least one digital-ID-certificate using said symmetric key.

63. The digital-ID-management system of claim 60, wherein said first part of said symmetric key is wrapped using the public key of said vendor-computing-device; wherein said public key corresponds to a private key of said vendor-computing-device; wherein said digital-ID-pass is in the form of a digital-ID-pass-URI and wherein said second part of said symmetric key is included in said digital-ID-pass-URI.

64. The digital-ID-management system of claim 63, wherein said vendor-instructions, when executed by said vendor-processor, further cause the vendor-computing-device to extract said PII fields following the steps of:

a. unwrapping said first part of said symmetric key using said private key of said vendor-computing-device;

b. extracting said second part of said symmetric key from said digital-ID-pass-URI;

c. combining said first and second parts of said symmetric key to form said symmetric key; and d. decrypting said combination of said signed PII field-nonce value pairs and said at least one digital-ID-certificate using said symmetric key.

65. The digital-ID-management system of claim 41, wherein said IDSM comprises at least one said verifier-server.

66. An ID-holder-computing-device associated with an ID-holder, wherein the ID-holder-computing-device is enrolled to a digital ID (DIGID) system manager (IDSM), wherein the ID-holder-computing-device is configured to interact with a vendor-computing-device, wherein the ID-holder-computing-device comprises an ID-holder-processor and non-transitory computer-readable medium in communication with the ID-holder-processor and comprising instructions stored thereon, that when executed by said ID-holder-processor, cause the ID-holder-computing-device to:

a. receive extracted-PII-fields and a digital-ID-certificate from a verifier-server, wherein said extracted-PII-fields and said digital-ID-certificate are generated by a verifier-server performing steps comprising:

i. authenticating a captured ID received from an ID holder, to yield an authenticated-captured-ID;

ii. extracting personally identifiable information (PII) fields from said authenticated-captured ID, to yield extracted-PII-fields;

iii. cryptographically protecting said extracted-PII-fields, wherein said cryptographically protecting comprises the steps of:

A. individually hashing each one of said extracted-PII-fields, forming respective individually-hashed-PII-fields; and B. verifiably encapsulating said individually-hashed-PII-fields, along with said ID-holder-public key received from the ID holder, with a signature, forming a digital-ID-certificate; and b. securely transferring a digital ID pass to said vendor-computing-device associated with the vendor, whereby said vendor-computing-device can extract said extracted-PII-fields, using said digital ID pass and said IDSM.

67. A verifier-server adapted to create of a non-reputable digital record of an identification (ID) document of a user, being an ID-holder, wherein said verifier-server comprises a verifier-processor and non-transitory computer-readable medium in communication with said verifier-processor and comprising verifier-instructions stored thereon, that when executed by the verifier-processor, cause the verifier-server to:
   a. receive a captured ID received from an ID-holder-computing-device associated with the ID-holder;
   b. authenticate said captured ID, to yield an authenticated-captured-ID;
   c. extract personally identifiable information (PII) fields from said authenticated-captured ID, to yield extracted-PII-fields;
   d. cryptographically protect said extracted-PII-fields, wherein said cryptographically protecting comprises the steps of:
     i. individually hashing each one of said extracted-PII-fields, forming respective individually-hashed-PII-fields; and
     ii. verifiably encapsulating said individually-hashed-PII-fields, along with said ID-holder-public key received from the ID-holder, with a signature, forming a digital-ID-certificate, yielding the non-reputable digital record; and
   e. transfer said extracted-PII-fields and said digital-ID-certificate to said ID-holder-computing-device.

68. A vendor-computing-device associated with a vendor, wherein said vendor-computing-device is enrolled to a digital ID (DIGID) system manager (IDSM);
wherein said vendor-computing-device is configured to interact with a digital-ID-app of an ID-holder; and
where said vendor-computing-device comprises a vendor-processor and non-transitory computer-readable medium in communication with said vendor-processor and comprising vendor-instructions thereon, that when executed by the vendor-processor cause the vendor-computing-device to:
   a. display a vendor universal resource identifier (URI) associated with said vendor;
   b. receive a digital-ID-pass from said ID-holder that agreed to share said subset of personally identifiable information (PII) fields, required to be shared with said vendor, said digital-ID-pass comprising a vendor-specific-DIGID-code;
   c. request a vendor-specific-DIGID from said IDSM, using said vendor-specific-DIGID-code, said vendor-specific-DIGID comprising a subset of said individually-hashed-PII-fields corresponding to said required PII fields, signed by a symmetric key, having a first part and a second part, generated by said digital-ID-app of said ID-holder;
   d. receive said vendor-specific-DIGID from said IDSM;
   e. extract said required of PII fields from said individually-hashed-PII-fields to thereby facilitate secure interaction between said vendor and said ID-holder.

69. The system of claim 68, wherein said vendor-instructions, when executed by said vendor-processor, further cause the vendor-computing-device to extract said subset of individually-hashed-PII-fields following the steps of:
   a. unwrapping said first part of said symmetric key by using said private key of said vendor-computing-device;
   b. extracting said second part of said symmetric key by from said digital-ID-pass-URI;
   c. combining said first and second parts of said symmetric key to form said symmetric key; and
   d. decrypting said combination of said signed PII field-nonce value pairs and said at least one digital-ID-certificate using said symmetric key.

70. The verifier-server of claim 67 further adapted to verify the identity of said ID-holder, wherein upon said ID-holder consenting to share a subset of PII-fields with said vendor, the verification of the identity of said ID-holder comprises the steps of:
   a. receive from an associated digital ID (DIGID) system manager (IDSM) a vendor-profile for said vendor, said vendor-profile comprising a list of required-PII-fields-names;
   a. receive from the ID-Holder a subset of PII-hash-pairs associated with said subset of PII-fields associated with said list of required-PII-field-names;
   b. generate an ID-holder-signature, said ID-holder-signature being a cryptographic signature configured for verification of said subset of PII-hash-pairs;
   c. generate a vendor-DIGID-response, said vendor-DIGID-response comprising said subset of PII-hash-pairs, said ID-holder-signature, said individually-hashed-PII-fields, and said verifier-server-signature;
   d. generate said vendor-specific-DIGID, said vendor-specific-DIGID comprising said vendor-DIGID-response; and
   e. transmit said vendor-specific-DIGID to said vendor-computing-device.

* * * * *